(12) United States Patent
Eggleston et al.

(10) Patent No.: US 7,054,830 B1
(45) Date of Patent: May 30, 2006

(54) SYSTEM AND METHOD FOR INCENTIVE PROGRAMS AND AWARD FULFILLMENT

(75) Inventors: York Eggleston, 301 S. Fremont Ave., Baltimore, MD (US) 21230; Andrey Ukhov, Bloomington, IN (US)

(73) Assignee: York Eggleston, Baltimore, MD (US)

( * ) Notice: Subject to any disclaimer, the term of this patent is extended or adjusted under 35 U.S.C. 154(b) by 0 days.

(21) Appl. No.: 09/412,147

(22) Filed: Oct. 5, 1999

Related U.S. Application Data

(63) Continuation of application No. 09/040,490, filed on Mar. 18, 1998.

(60) Provisional application No. 60/063,180, filed on Oct. 20, 1997, provisional application No. 60/067,776, filed on Dec. 10, 1997.

(51) Int. Cl.
*G06F 17/60* (2006.01)

(52) U.S. Cl. .......................... 705/14; 705/10

(58) Field of Classification Search ................. 705/7, 705/14, 10, 17, 26, 27; 707/100–104, 200
See application file for complete search history.

(56) References Cited

U.S. PATENT DOCUMENTS

| | | |
|---|---|---|
| 3,697,729 A | 10/1972 | Edwards et al. |
| 3,698,718 A | 10/1972 | Kuhn |
| 3,790,070 A | 2/1974 | Schnitzer et al. |
| 3,941,388 A | 3/1976 | Isaac et al. |
| 4,140,319 A | 2/1979 | Aycock et al. |
| 4,194,242 A | 3/1980 | Robbins |
| 4,321,672 A | 3/1982 | Braun et al. |
| 4,346,442 A | 8/1982 | Musmanno |
| 4,378,941 A | 4/1983 | Derby |
| 4,385,285 A | 5/1983 | Horst et al. |
| 4,554,446 A | 11/1985 | Murphy et al. |
| 4,561,658 A | 12/1985 | Peterson |
| 4,566,066 A | 1/1986 | Towers |
| 4,585,160 A | 4/1986 | Fiske, II |
| 4,597,046 A | 6/1986 | Musmanno et al. |
| 4,601,490 A | 7/1986 | Brandon |
| 4,619,457 A | 10/1986 | Small |
| 4,634,147 A | 1/1987 | McClure |
| 4,694,397 A | 9/1987 | Grant et al. |
| 4,711,454 A | 12/1987 | Small |
| 4,722,554 A | 2/1988 | Pettit |
| 4,723,212 A | 2/1988 | Mindrum et al. |
| 4,725,719 A | 2/1988 | Oncken et al. |

(Continued)

FOREIGN PATENT DOCUMENTS

WO      WO 96/36926      * 11/1996

(Continued)

OTHER PUBLICATIONS

Michael, Judd H et al disclose an article entitled "Information sources used by furniture retailers: The importance of furniture markets", Forest Products Journal, Madison: Apr. 1995, vol. 45, Issue 4, p. 25, 6 pages.*

(Continued)

*Primary Examiner*—Frantzy Poinvil
(74) *Attorney, Agent, or Firm*—Ralph P. Albrecht; Venable LLP

(57) ABSTRACT

A method and system for providing incentive programs over a computer network is provided in which a host may provide sponsoring companies with the capability to buy prepackaged or self-built incentive programs, offer such incentive programs to consumers, provide sponsoring companies and retailers with the capability to associate prizes with incentive programs, provide sponsoring companies, retailers and consumers with convenient fulfillment of prizes, and store and manipulate databases regarding all of the foregoing.

37 Claims, 23 Drawing Sheets

U.S. PATENT DOCUMENTS

| | | |
|---|---|---|
| 4,739,478 A | 4/1988 | Roberts et al. |
| 4,742,457 A | 5/1988 | Leon et al. |
| 4,775,154 A | 10/1988 | Clinnin et al. |
| 4,781,378 A | 11/1988 | Clinnin et al. |
| 4,902,020 A | 2/1990 | Auxier |
| 4,908,761 A | 3/1990 | Tai |
| 4,982,346 A | 1/1991 | Girouard et al. |
| 5,009,429 A | 4/1991 | Auxier |
| 5,018,975 A | 5/1991 | Todd |
| 5,025,372 A | 6/1991 | Burton et al. |
| 5,053,955 A | 10/1991 | Peach et al. |
| 5,056,019 A | 10/1991 | Schultz et al. |
| 5,074,566 A | 12/1991 | Desbiens |
| 5,085,470 A | 2/1992 | Peach et al. |
| 5,197,884 A | 3/1993 | Roemer, Jr. et al. |
| 5,207,792 A | 5/1993 | Anderson |
| 5,249,807 A | 10/1993 | Peterson |
| 5,255,456 A | 10/1993 | Franklin |
| 5,292,133 A | 3/1994 | Alexander |
| 5,321,604 A | 6/1994 | Peach et al. |
| 5,342,056 A | 8/1994 | Ajaji |
| 5,393,964 A | 2/1995 | Hamilton et al. |
| 5,435,565 A | 7/1995 | Benaderet |
| 5,482,139 A | 1/1996 | Rivalto |
| 5,537,314 A * | 7/1996 | Kanter |
| 5,572,005 A | 11/1996 | Hamilton et al. |
| 5,576,951 A | 11/1996 | Lockwood |
| 5,636,346 A | 6/1997 | Saxe |
| 5,664,115 A | 9/1997 | Fraser |
| 5,699,310 A * | 12/1997 | Garloff et al. |
| 5,774,870 A * | 6/1998 | Storey |
| 5,794,210 A | 8/1998 | Goldhaber et al. |
| 5,855,008 A * | 12/1998 | Goldhaber et al. |
| 5,915,243 A * | 6/1999 | Smolen ................. 705/14 |
| 5,916,024 A * | 6/1999 | Von Kohorn ............ 463/40 |
| 5,970,469 A * | 10/1999 | Scroggie et al. ........ 705/14 |
| 5,996,007 A * | 11/1999 | Klug et al. |
| 6,014,634 A * | 1/2000 | Scroggie et al. ........ 705/14 |
| 6,278,980 B1 * | 8/2001 | Wendkos ................ 705/14 |

FOREIGN PATENT DOCUMENTS

| | | |
|---|---|---|
| WO | 9723838 | 3/1997 |
| WO | 9722058 | 6/1997 |

OTHER PUBLICATIONS

Carl G. Kline, MBA, "Virtual Store-Using Contests for Promotions . . . Exclusive to Smart Business Supersite," http://www.smartbiz.com/sbs/columns/kline 15.html., 1997.

"Cybercash Sweepstakes", Interactive PR & Marketing News, http:/prizelink.com/cc-press.html, 1997.

* cited by examiner

| GENERAL TYPE | TARGET OF INCENTIVE EFFORT | COMMON DESCRIPTIVE LANGUAGE | DESCRIPTIVE TYPE | SHORT-TERM | LONG-TERM | IMPLEMENTATION VISUAL MECHANISMS (USED TO DISPLAY RESULT) | PRIZE TYPES |
|---|---|---|---|---|---|---|---|
| WITHIN FIRM | EMPLOYEES | *INCENTIVE PROGRAMS *EMPLOYEE MORALE PROGRAMS | *ONLINE TESTING *ATTENDANCE MONITORING *GAMES OF SKILL (TRIVIA) *GAMES OF CHANCE (PRESS TO WIN) | INSTANT-WIN | *SWEEPSTAKES *PERFORMANCE REWARDS *EMPLOYEE LOYALTY | BUTTONS BANNERS SCRATCH & WIN PUZZLES PIN-BALL OTHER TEXTS GRAPHICS | MERCHANDISE SERVICES DISCOUNTS COUPONS POINTS |
| | SUPPLIERS (EX. VIA EXTRANETS, OR PRIVATE INTERNETS) | | | | | | |
| OUTSIDE FIRM | CUSTOMERS | PROMOTIONS SWEEPSTAKES GIVEAWAY EFFORTS COUPONS | *GAMES OF SKILL (TRIVIA, "SURVEY MATCH"), PUZZLES, SCRATCH & WIN) *GAMES OF CHANCE (PRESS TO WIN) *CUSTOMER SERVICE (SURVEY, QUESTIONNAIRE COMPLETION) | INSTANT WIN | *SWEEPSTAKES *CUSTOMER LOYALTY | BUTTONS BANNER SCRATCH & WIN PUZZLES PIN-BALL | MERCHANDISE SERVICES DISCOUNTS COUPONS POINTS |
| | | | | | *CUSTOMER LOYALTY | SCRATCH & WIN PUZZLES PIN-BALL | POINTS |

Fig. 20

SYSTEM AND METHOD FOR INCENTIVE PROGRAMS AND AWARD FULFILLMENT

CROSS REFERENCE TO RELATED APPLICATIONS

This is a continuation of application Ser. No. 09/040,490, filed Mar. 18, 1998.

This application is based upon U.S. Provisional Patent Application No. 60/063,180, entitled SYSTEM AND METHOD FOR INCENTIVE PROGRAMS AND AWARD FULFILLMENT, filed Oct. 20, 1997, naming Eggleston and Ukhov as inventors, and U.S. Provisional Patent Application No. 60/067,776, entitled METHOD AND SYSTEM FOR INCENTIVE PROGRAMS AND AWARD FULFILLMENT, filed Dec. 10, 1997, naming Eggleston as inventor. The entirety of both such provisional patent applications is incorporated by reference herein.

BACKGROUND OF THE INVENTION

1. Field of the Invention

The present invention relates to systems and methods for conducting incentive programs and systems and methods for fulfilling awards and prizes won in incentive programs.

The present invention relates more particularly to systems and methods for conducting incentive programs over computer networks, such as the Internet.

2. Description of Related Art

Incentive award programs, in which incentive companies contract with sponsoring companies for programs to promote sales of the sponsoring companies' products or services, are well-known. Incentive programs include discount coupon programs; customer loyalty programs, such as frequent flyer programs, and promotional games, such as sweepstakes prizes, scratch-and-win games, and the like, in which a sponsoring company's products or services are won by successful participation in the incentive program.

Incentive programs offer awards and incentives to modify behavior of individual consumers and to direct the consumers to some pre-determined action, such as purchase of products or services upon visiting a retail site, viewing advertising, testing a product, or the like. Companies use awards and incentives to increase awareness of product offerings, to launch new products, to attract the attention of a newly identified audience, to differentiate products to encourage certain behavior, to obtain information, and for other purposes.

Traditional incentive programs systems suffer drawbacks in terms of convenience of tracking data, changing promotions, and the like. For example, for a consumer who participates in multiple incentive programs it may take time and effort to track his or her participation in each program. For example, time is required to keep track of loyalty points earned in each separate incentive program. Therefore, when a consumer receives an offer to participate in an incentive program, the consumer may decide against participating in it, not because the incentive program is not attractive, but because the cost to the consumer, in terms of the time and effort to tracking another incentive program, exceeds the expected benefit of the incentive program. Accordingly, a consumer need has arisen for a streamlined system and method for tracking consumer participation in a variety of incentive programs from different sponsors.

A similar problem exists for sponsoring companies who wish to offer promotions. The collective costs of generating incentive programs, administering the incentive programs, tracking the participation of consumers in the incentive programs and fulfilling the awards or prizes won in such incentive programs may exceed the benefits of offering the incentive program. These costs may be particularly high in instances where the activities associated with an incentive program must be carried out by different companies, or by different organizations within the same company. Accordingly, a need has arisen for a unified system that provides for program generation and administration, data tracking and award fulfillment.

Existing incentive programs do not meet all of the consumer and sponsor needs associated with incentive programs. One form of incentive program that is used extensively is that of promotional mailings. The processing of promotions, i.e., providing the appropriate check or discount coupon to the customer as a reward for the initial purchase, involves high volume and labor intensive activity, including collection, verification and organization of initial proofs of purchase and related information, preparation of the checks, coupons or other items using preprinted stock provided by the sponsor in connection with the particular promotion, and finally the sorting of individual items based on their mailing destinations.

At any given time, a typical provider of promotion services is involved with many different promotions of various sponsoring manufacturers. Preprinted forms, when provided by different sponsors, can vary in size and shape, thus creating the need to handle individual promotions separately. This increases handling expense, not only in added labor, but also in the mailing cost, as it is difficult with a single promotion to accumulate a volume of items sufficient to qualify for certain reduced postage rates, e.g. the reduced rate available for mail presorted by zip code of the destination. Manual recombination and sorting of items for multiple promotions would be prohibitively expensive.

Another form of promotional program is coupon distribution and redemption. Many problems exist with the coupon distribution and redemption system. For example, few consumers will go through all the steps necessary to redeem their coupons. More commonly, many consumers forget to bring coupons that they have clipped and saved to the store. Thus, consumer reluctance to take all necessary steps partially defeats the manufacturer's purpose for offering the purchase incentive. A manufacturer distributes coupons with the expectation that the coupons will induce sales of its product by offering a discount. However, when the coupon is forgotten or disregarded, the consumer is usually not aware of the incentive when he is selecting a product among different brands at the retail store.

Another problem with coupon redemption systems is verification. Because the verification of redemption conditions is performed by a check-out clerk, a consumer can in some instances present so many coupons that it is impractical to verify the required purchases for all of them. As a result, some coupons are redeemed without the required purchase.

The introduction of the digital computer and the computer network eliminates some of the inconveniences of conventional incentive programs, particularly those that relate to data tracking and manipulation. The digital computer is a powerful data processing tool that allows a user to organize, store and analyze data at volumes and rates that would be impossible by any prior known techniques.

Computers have been used in connection with incentive programs and other programs that have characteristics in common with incentive programs, but known computer incentive programs address some, but not all of the drawbacks of traditional promotions. For example, U.S. Pat. No. 5,053,955 to Peach et al. discloses an improved process of printing and assembling coupons. Peach et al. discloses a computer-based system for merging certain information for various promotions, so that a single stream of data can be used as a source for printing and mailing coupons for multiple promotions. Thus, the system of Peach et al. reduces some of the paperwork associated with a single-promotion systems, but it merely mitigates, rather than solves, the problems inherent in paper-based promotions.

Computer-based promotional games are also known. Such games include scratch-and-win games, treasure hunts, video pinball and the like. Such incentive programs have advantages over paper promotions, in that data regarding participation is easily stored and manipulated. However, existing incentive programs do not solve all consumer and sponsor needs. In particular, such promotional games do not assist consumers in tracking participation in multiple promotions and do not assist sponsors in generating incentive programs, tracking participation in incentive programs and fulfilling awards and prizes.

Computer-based systems exist for tracking some aspects of consumer participation in incentive programs. For example, U.S. Pat. No. 5,056,019 to Schultz et al. discloses an automated purchase reward accounting system and method. In particular, Schultz et al. discloses a marketing method for providing manufacturer purchase reward offers by automatically tracking the purchases of member consumers through the use of bar-coded membership cards and using the purchase records in a data processing system to determine if the required purchases have been made to earn a reward. Each member consumer receives a reward booklet disclosing the available reward offers, a periodic status report indicating the member consumer's progress toward earning rewards, and a reward certificate for those rewards earned. The card-based system of Schultz takes advantage of certain data processing capabilities of computer systems and certain data storage capabilities of electronic card technologies; however, among other drawbacks, the system of Schultz does not address the need for a system that assists sponsor companies in generating incentive programs, in tracking participation of consumers in multiple incentive programs, or in fulfilling awards.

The computer network offers the possibility of improved systems for offering incentive programs and for tracking participation in an incentive program. By linking together several computers and by providing shared resources and cross-platform communications, the computer network provides improved access to sophisticated applications by users at remote locations.

One of the most widely accepted and heavily used networks is the Internet. The Internet is a global system of interconnected computer networks formed into a single world wide network. A user, through the Internet, can interactively transmit messages with users in different countries. Similarly, a user in the U.S. connected to files and libraries and other jurisdictions such as Europe and Asia, can download files for personal use. Accordingly, the Internet computer network provides strong communications functions similar to the communications functions provided by ham radio operators. Moreover, the Internet computer network acts like a universal library, providing electronic access to resources and information available from Internet sites throughout the world.

Various systems and methods are known which permit a sponsor to track data of multiple parties in databases and to update information in the databases based on transactions entered into by the parties to the transactions. For example, U.S. Pat. No. 5,664,115 to Fraser discloses an interactive computer system to match buyers and sellers of real estate using the Internet. Similarly, banks, credit card companies, and other financial institutions have developed computer-based systems that track client account information and update the information upon entry of various transactions. Some such systems involve use of electronic cards and operate over computer networks. Such systems have requirements peculiar to their respective industries, and none of the existing systems address all of the problems inherent in known incentive programs, particularly the problem of the need for an incentive program system that conveniently tracks participation while offering automated generation of incentive programs and automated fulfillment of awards won in incentive programs.

Computer incentive programs are offered on the Internet; however, such systems are generally offered by a single sponsor and are generally limited to offering consumers the ability to participate in incentive programs. Known systems do not offer sponsors the ability to conveniently generate incentive programs, to track participation of consumers in multiple incentive programs, or to provide for automated fulfillment of awards.

Another important drawback of known computer incentive program systems is that the obligation to fulfill the awards promised in a promotional campaign is often a logistically difficult and expensive task. The coordination of delivering or arranging for the retrieval of the awards for the specified winner, in volumes that permit successful incentive programs, requires coordination of prize inventory, systems and information.

One system that addresses award fulfillment is disclosed in U.S. Pat. No. 5,025,372 to Burton, et al. Burton et al. discloses a system and method for administration of incentive award programs through letters of credit. In the Burton et al. system, a computer system for an incentive award program allocates monetary amounts available for expenditure through credit instruments issued to program participants when the participants perform to a designated level of achievement. Participants' identifying information and credit instrument account numbers are stored in memory. Levels of performance are calculated and assigned for each participant in order for a monetary amount to be available for expenditure through the participant's credit instrument. Calculations, adjustment and reporting concerning amounts allocated for instrument use, withheld amounts, instrument transactions and account balances are made. Calculations and printed invoices for payment by a financial institution to an incentive company based on the credit instruments issued under the incentive program are made and are dependent upon the monetary volume of expenditures through the credit instruments, the total interest income on the credit instruments, and the number of instruments issued.

The system of Burton et al. takes some advantage of a computer system for tracking data, but it has a number of drawbacks. Among other things, Burton et al. offers no advantage to a company sponsoring an incentive program in terms of the investment of skill and labor in developing an incentive program. Further, the complex letter of credit scheme of Burton et al. is likely to require participation of other entities, such as banks and attorneys in order for it to operate properly. Also, Burton et al. does not provide for tracking of data for participation of a given consumer in incentive programs of multiple program providers. Finally, Burton et al. does not provide a system for automated generation of incentive programs.

Many existing promotional systems are also subject to the drawback that they require specific computer software or computer hardware to be purchased in order to participate in the incentive program. Historically, computer promotional games were of limited utility, because in order to participate the user was required to purchase specific software to participate in the incentive program, and no convenient mechanism existed to convey the information that the customer had won a prize to the party who was required to fulfill the prize.

Computer networks, such as the Internet, offer a convenient solution to some of these problems, permitting easy transmission of such computer software for promotional games and easy transmission of information about the success of the consumer to the sponsoring company. However, current incentive program and award systems available over the Internet are quite limited. First, most such systems are limited to a specific type of incentive program or to products and services of a single sponsoring company. Also, most such systems require a sponsoring company to use an independent contractor to code the computer software necessary for running the incentive program. Further, most such systems rely on conventional mechanisms for award fulfillment, such as issuing a paper certificate to the customer by mail that is redeemable at a retail location of the sponsoring company.

Computer systems and methods for generation of computer software programs based on underlying data are also known. For example, U.S. Pat. No. 5,576,951 to Lockwood discloses an automated sales and services system that composes individualized sales presentations from various textual and graphical information data sources to match customer profiles entered into the system. However, known computer systems do not provide for automatic generation of incentive programs based on parameters entered by a sponsor company.

Accordingly, a need has arisen for an incentive program and award fulfillment system that provides easy access to consumers who have standard computer hardware and software, that permits sponsors to build or purchase incentive programs easily and efficiently, and that provides for convenient tracking of participation and convenient, automated award fulfillment.

SUMMARY OF THE INVENTION

The present invention provides a new incentive program and award system for using a computer network, preferably the Internet, to provide consumer access to expanded incentive programs using a conventional computer, to permit sponsors to build, buy, store, modify, offer, track and administer incentive programs and to permit sponsors and retailers to offer improved award fulfillment for participants in incentive programs.

The increased processing power and ability to access remote users of the Internet and other computer networks offer substantial opportunities for improved award fulfillment systems and incentive program systems. In particular, the Internet offers access to consumers who have standard equipment such as a personal computer, without requiring specific hardware or software. The Internet also offers free communications, in contrast to traditional communications channels, such as mail, in which Promotional materials are sent. The Internet also offers dynamic opportunities to transmit, store and retrieve data, so that new or different incentive programs may be conducted on a much more frequent basis than is the case with traditional paper systems.

Systems and methods according to the present invention allow a consumer who has access to a computer, the computer typically referred to as a "client," to connect to a web site located on a server of a host system for participating in incentive programs. The consumer may, through the graphical user interface of the consumer's computer, participate in incentive programs by logging-in to a site, spending a certain amount of time on the site, entering data, clicking on pre-determined icons in a pre-determined order, or other activities involving use of the computer. If the consumer satisfies certain pre-determine a criteria, the consumer can win promotional prizes.

Systems and methods of the present invention also permit sponsors to list incentive programs on an Internet site, to obtain pre-packaged incentive programs from a host, to build incentive programs using computer software provided by the host, to associate prizes with incentive programs offered through the site, and to fulfill awards won by consumers.

Systems and methods of the present invention further permit retailers to make retail items in their inventory available to sponsors for association with incentive programs as prizes.

Systems and methods of the present invention further provide for the creation of databases of retail, catalog, sponsor and other items that permit automated fulfillment of specific items. The systems and methods of the present invention are accomplished by use of a computer network, which may be the Internet.

In particular, without limitation, systems and methods of the present invention comprise a host computer connected to a network, a client computer of a consumer connected to the network, a sponsor computer of a sponsor connected to the network, an incentive participation application program for participation by the consumer in an incentive program, wherein the participation may be in incentive programs of a plurality of sponsors, a server of the host computer, a web site, located on the server of the host computer, wherein the consumer may participate in an incentive program via the web site, a database of the host computer of awards associated with the incentive participation application programs, an award association application program for associating an award with an incentive program and a fulfillment automation application program for associating a fulfillment method with an award.

Systems and methods of the present invention further comprise an electronic card for fulfillment of an award, having memory for storing information associated with the consumer, wherein the information may be a personal identification number or information associated with the consumer's participation in an incentive program.

Systems and methods of the present invention further comprise an incentive builder application program, running on the server of the host computer, wherein the sponsor may build an incentive program by interacting with the incentive builder application program, wherein the incentive builder application program comprises a database of objects associated with incentive programs, wherein each object is associated with an action that is associated with the incentive program, an interface for permitting a sponsor to enter parameters associated with an incentive program, an object association application for associating objects with the parameters entered by a sponsor and building a file comprising the objects associated with all of the parameters entered by a sponsor, an editor for generating an electronic file containing code for the incentive program, a classifying application program for classifying the code in numbers that represent the elements of the code, a generator application program for generating tables of the numbers that represent the code for the incentive program, and an executor application that is capable of interpreting the tables and executing the code.

Systems and methods of the present invention further comprise a graphical image file that is displayed in connection with an object, wherein the graphical image file is a branded image, wherein the object is a game piece in an incentive program, wherein the object is displayed upon winning an incentive program, wherein the graphical image file may change, and wherein the graphical image file that is displayed depends on characteristics of the user.

The present invention may be better understood by reference to a number of commonly used terms, definitions of which are as follows:

The term "client," as used herein, encompasses any data processing systems suitable for operating a processor according to the invention and for establishing a communication link to an Internet site. An Internet site can be any program running on a data processing platform that connects to the Internet and that receives access requests, whether under HTTP, FTP or any other conventional or proprietary transfer protocol.

The term "application program," as used herein, encompasses any computer file that contains data in a format for being accessed and processed by the processing unit of a computer.

The term "disk," as used herein, encompasses any memory device that can store computer data and that provides an interface for accessing the stored data.

The term "network," as used herein, encompasses any system comprising a series of computers linked by telecommunications networks and may include the Internet, intranets, or other computer networks.

The term "Internet" means the largest global computer communications network.

The phrase "incentive program" should be understood to include any program for creating incentives, including programs within a sponsoring firm, such as employee incentive programs, and outside the firm, such as customer promotions. The term "promotion," as used herein should be understood to encompass all types of incentive programs.

The term "prize" and the term "award" should be understood to be synonymous and to encompass all types of incentives, including merchandise, coupons, points, cash, services and other forms of incentives.

The term "World Wide Web" means a large global computer communications network that comprises a significant part of the Internet.

The term "sponsor," as used herein, encompasses any individual or company that wishes to offer an incentive program or promotion.

The term "retailer," as used herein, encompasses any individual or company that wishes to provide awards and prizes to be associated with incentive programs. The term "retailer database" should be understood to encompass a database of awards and prizes for fulfillment to consumers who have successfully won or completed incentive programs. Thus, the retailer database should be understood to include awards and prizes provided by sponsors, by the host, or by other parties, not only retailers. The terms "retailer database" and "award database" should be understood to be synonymous.

The term "consumer," as used herein, encompasses any individual or user who wishes to participate in awards or incentive programs offered by sponsors. Consumers may be third parties, such as partners or suppliers, may be employees of sponsors, or may be customers of the sponsor's merchandise or the merchandise of third parties; thus, the present invention is intended to encompass systems and methods by which a company offers incentive programs to individuals within its organization, such as via a computer intranet, as well as systems and methods for providing incentive programs to third parties via external computer networks.

The term "host," as used herein, encompasses any individual or company who wishes to provide a system for permitting sponsoring companies to offer incentive programs to consumers, employees, suppliers, partners and the like of the individual or company, and for creation of databases of retail, catalog, sponsor and other items that permit automated fulfillment of specific items listed in computer inventory systems of retailers at a retail location.

The term "server," as used herein, encompasses any data processing system on which application programs and Internet sites may be stored for access and processing by client computers.

The term "web browser," as used herein, encompasses any application program which allows for multimedia presentation of information, including text, images, sound and video clips. A web browser 50 allows the user to connect by the Internet to different sites on the Internet.

The term "hypertext link" as used herein, encompasses any graphical icon, button, highlighted text or other symbol that permits a client computer to direct a server to display a page of an Internet site which is associated with the hypertext link.

The term "URL" means "uniform resource locator" and means the address of an Internet site that is accessed by clicking or initiating a hypertext link that is associated with the URL.

The term "HTML" means hypertext markup language, which refers to a language for the creation of pages of Internet sites on the World Wide Web.

The term "HTTP" as used herein, shall encompass the "HyperText Transfer Protocol", which shall mean a protocol under which messages are sent over the Internet from client computers to server computers in the client server model of distributed computing.

The term "CGI" shall mean "Common Gateway Interface," which shall refer to a specification for communication between a server computer and an application program.

The term "EDI", or "electronic data interchange" shall mean a protocol for the transfer of data between an application program and a proprietary computer system, such as an inventory system.

BRIEF DESCRIPTION OF DRAWINGS

FIG. 20 is a table depicting classifications of incentive programs that can be used to establish parameters for building an incentive program.

DETAILED DESCRIPTION OF THE PREFERRED EMBODIMENT(S)

The present invention is a system for building and conducting incentive programs over computer networks, such as the Internet, for tracking and administering participation in such incentive programs and for fulfilling awards won in such incentive programs. The present system includes participation of a host, who manages the system, one or more consumers, who participate in incentive programs and in certain instances win awards, one or more sponsors, who offer incentive programs through the host system, and one or more retailers who provide awards for the incentive programs and who fulfill delivery of awards to customers.

Figure 1:
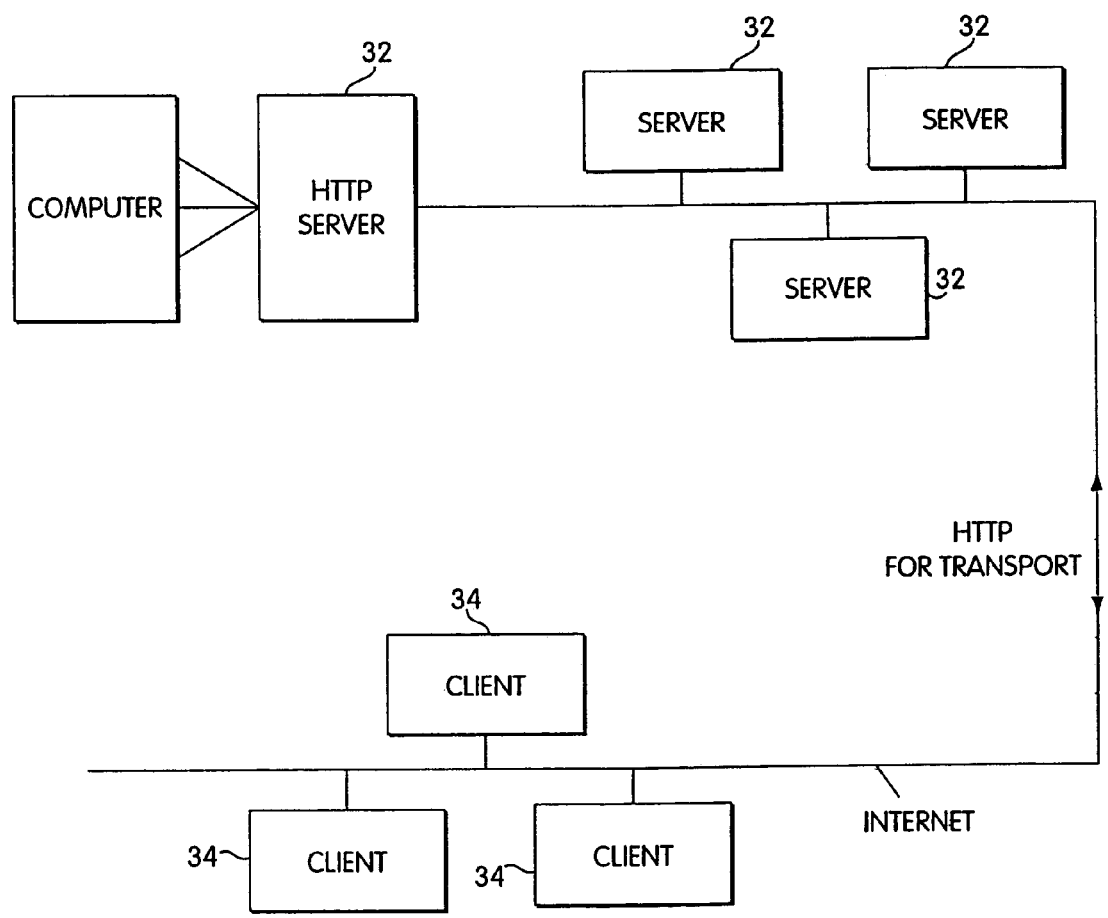
FIG. 1 is a schematic diagram illustrating the basic components of the World Wide Web.

FIG. 1 is a schematic diagram illustrating the basic components of the World Wide Web. FIG. 1 depicts client computers 34 which are connected by telecommunications links 38 to one or more server computers 32. The client computers 34 are equipped with web browsers 50 that permit the client computers 34 to view HTML pages. The HTML pages are preferably displayed in graphical format. Well-known web browsers 50 such as NetScape navigator and Microsoft Explorer automatically format data that is programmed in the HTML language according to well-known protocols. Information is transported back and forth between the client computer 34 and one or more servers 32 according to a well-known protocol known as the HyperText Transport Protocol. The messages sent according to the HTTP are addressed according to Uniform Resource Locators, or "URLs", which determine where the Internet resource is and which protocol to use to access the resource. Other protocols, such as FTP, are also available.

In the so-called "client-server" model of distributed computing, messages are sent from client computers to one or more servers. Servers that use the World Wide Web are typically called "HTTP servers" or "web servers." "A web server may have installed on it files that include HTML documents that can be displayed on a client's computer screen when accessed from a client computer. Also, web servers may include or provide access to other servers that include Common Gateway Interface ("CGI") programs that permit access to other resources on the web server, such as application programs and databases. Thus, without the need for any hardware or software, other than a standard personal computer and a common web browser 50, a consumer can access dynamic applications and content that are stored on the web server.

Figure 2:
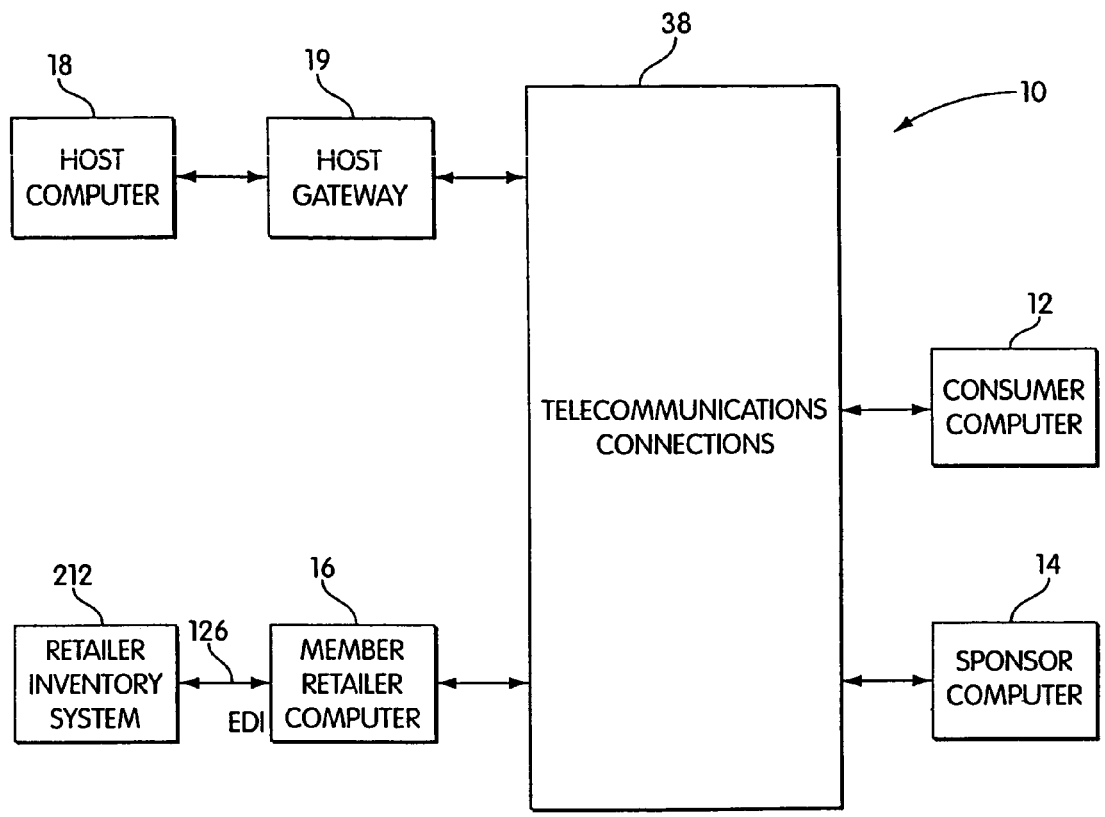
FIG. 2 is a schematic diagram of the primary hardware components of the host system of the present invention.

Referring to FIG. 2, the particular systems necessary for operation of the present invention are depicted. Thus, a consumer computer 12, a sponsor computer 14, and a retailer computer 16 are connected by a telecommunications connection 38 over the Internet to a host computer 18. The host computer 18 may include a gateway computer 19, or may be configured to provide a direct connection to the telecommunications connection 38. The system may further include an electronic data interchange 126 from the retailer computer 16 to a retailer inventory system 212, which permits access between the retailer components and the host computer 18 over the Internet.

Figure 3:
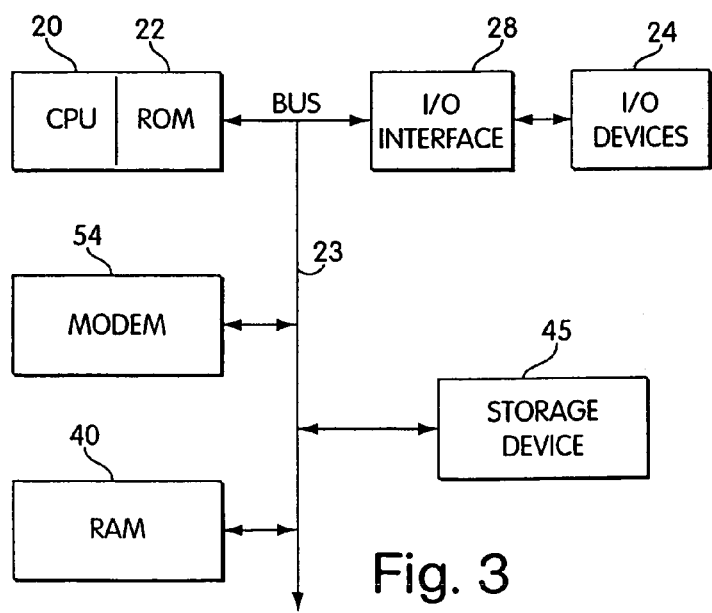
FIG. 3 is a schematic diagram of a consumer computer 12 in accordance with an embodiment of the present invention.

Referring to FIG. 3, a client computer may include various standard components, including a central processing unit (CPU) 20 and associated read-only memory ("ROM") 22, both of which are connection along data and address bus lines 23 to a random access memory 40. The consumer computer 12 may be such a "client" computer. Also connected to the RAM 40, the CPU 20 and the ROM 22 via the bus 23 are an input/output interface ("I/O") 28 and I/O device 24. The CPU 20 is operatively connected to the I/O interface 28 to control any corresponding I/O devices 24. Typical I/O devices may include a video display, a keyboard, a scanner, a mouse or joystick or other input or output devices. The consumer computer 12 may also include a storage device 45, which may be any conventional device for storing data, such an external hard disk. The consumer computer 12 may further include a system for connection to telecommunications links, which may be a modem 54. The consumer computer 12 is thus equipped similarly to any typical personal computer that is capable of playing graphical computer games.

Figure 6:
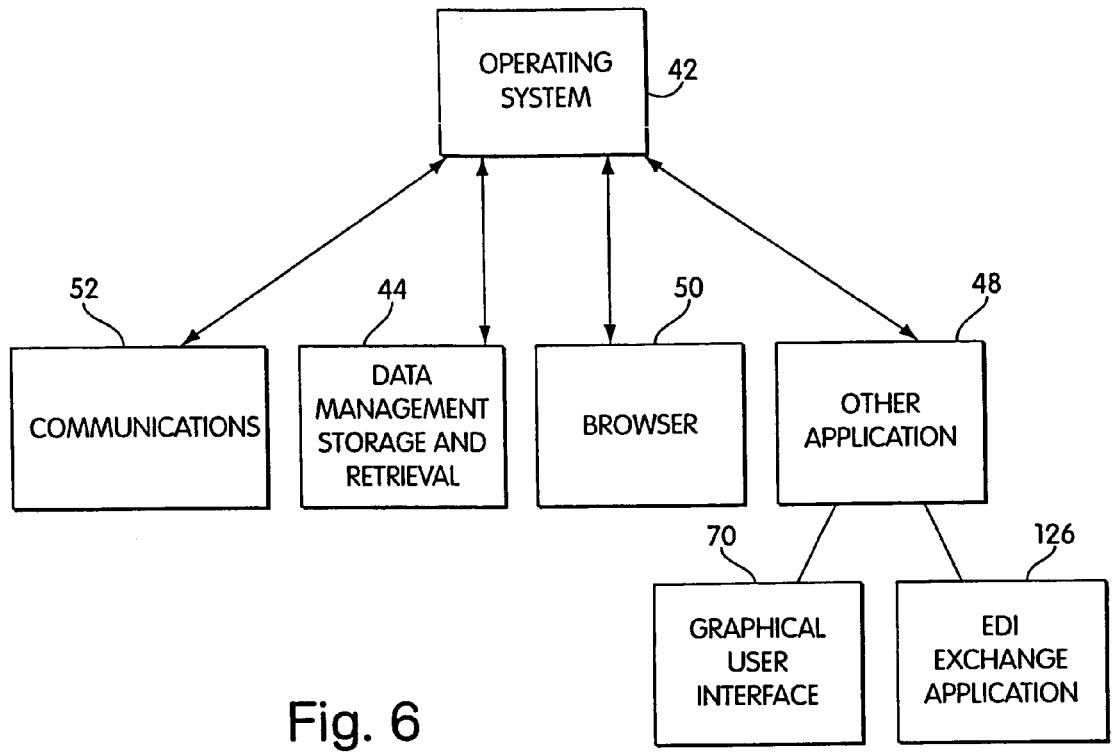
FIG. 6 is a schematic diagram of an operating system and related applications of a consumer computer 12, a sponsor computer, or a retailer computer in accordance with an embodiment of the present invention.

Referring to FIG. 6, installed on the consumer computer 12 is an operating system 42 that controls various applications of the consumer computer 12. Applications include applications for data management, storage and retrieval 44, a web browser application 50 that is capable of formatting HTML documents, a communications application 52 capable of controlling communications between the consumer computer 12 and other computers over the Internet, and other applications 48. The operating system 42 may be any standard operating system, but is preferably an operating system capable of providing a graphical user interface, such as the Windows95 operating system or the MacIntosh operating system.

Figure 4:
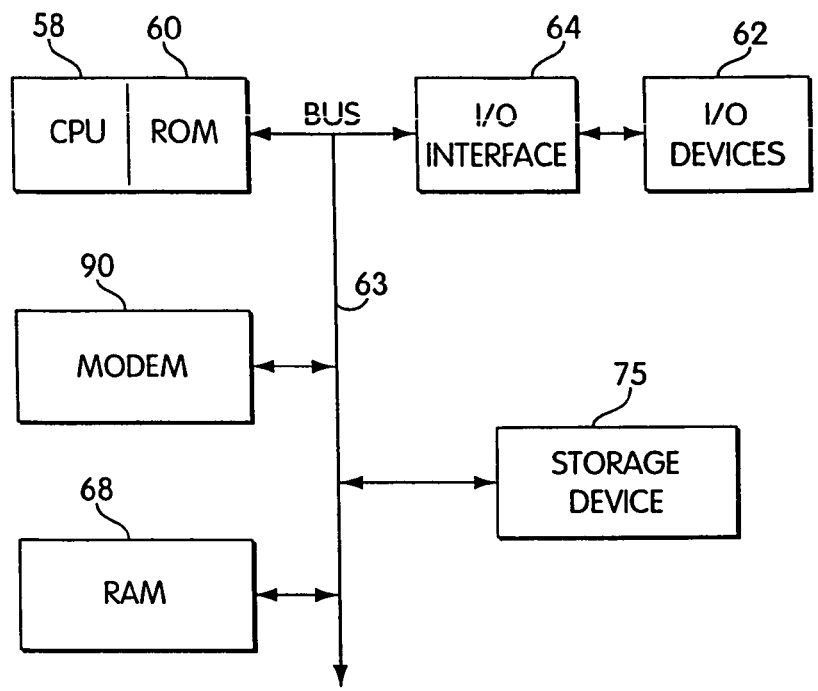
FIG. 4 is a schematic diagram of a sponsor computer in accordance with the present invention.

Referring to FIG. 4, the sponsor computer may also be client computer comparable to the consumer computer 12. The sponsor computer 14 may also include a CPU 58, ROM 60, I/O device 62, I/O interface 64, RAM 68, bus 63, and modem 90. Thus, the configuration of the sponsor computer 14 is similar to the consumer computer 12. The sponsor computer 14 may also include an operating system 42 for control of various applications, including applications for data management, storage and retrieval 44, a web browser 50, a communications application 52 and other applications 48. The operating system 42 is preferably capable of providing a graphical user interface 70 with graphical icons. Thus, the operating system may be in a system such as Windows95. The sponsor computer 14 may also include a storage disk 75 for storing data, such as an external hard disk.

Figure 5:
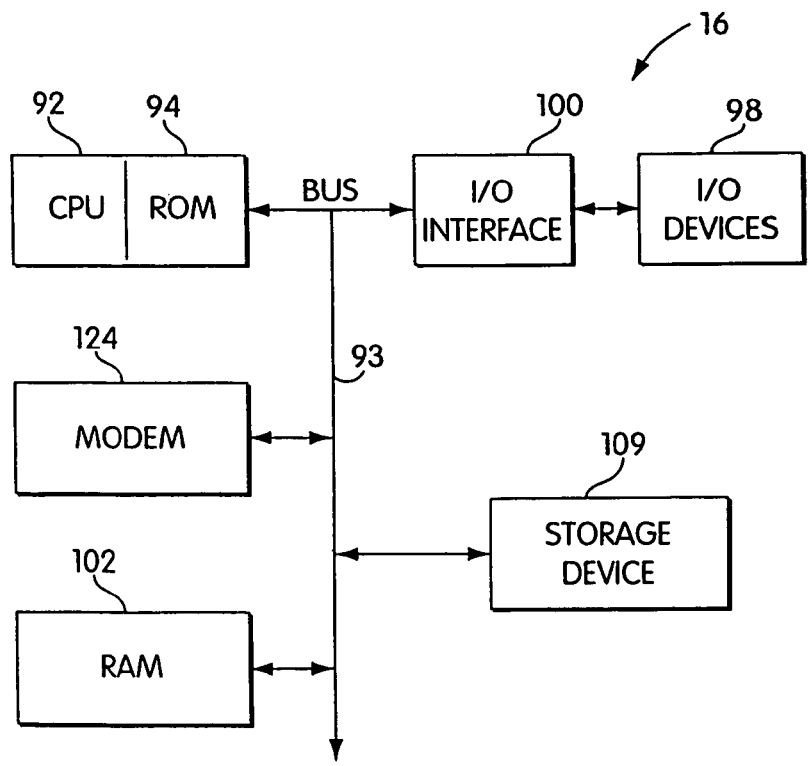
FIG. 5 is a schematic diagram of a retailer computer in accordance with an embodiment of the present invention.

Referring to FIG. 5, a retailer computer 16 is provided. The retailer computer 16 may also be a client computer of configuration similar to the consumer computer 12 and the sponsor computer 14. The retailer computer 16 may thus include a CPU 92, ROM 94, I/O device 98, I/O interface 100, RAM 102, BUS 93, modem 124 and storage device 109. The retailer computer 16 is also controlled by an operating system 42 which governs various applications, including an application program for data management, storage and retrieval 44, a web browser 50, a communications application 52 and other applications 48. The retailer computer 16 also preferably includes a graphical user interface 70 capable of viewing HTML documents that include graphical icons. The retailer computer 16 further includes an application for controlling an electronic data interchange connection ("EDI") 126. The EDI connection 126 is to a proprietary retailer inventory system 212. Thus the retailer computer 16 is configured to query and retrieve information from the retailer inventory system 212 regarding the exact products in the retailer inventory system 212.

It should be noted that although the Internet is the preferred embodiment of the present invention, the invention may be operated over an intranet within a corporation or may include an ATM, or KIOSK, which could include a dedicated terminal that is capable of an online connection to a host computer and capable of executing commands through an input/output device. Also, in an embodiment of the invention, certain aspects of the invention may be completed through stand-alone software, which may be downloaded by the user to a disk.

Figure 7:
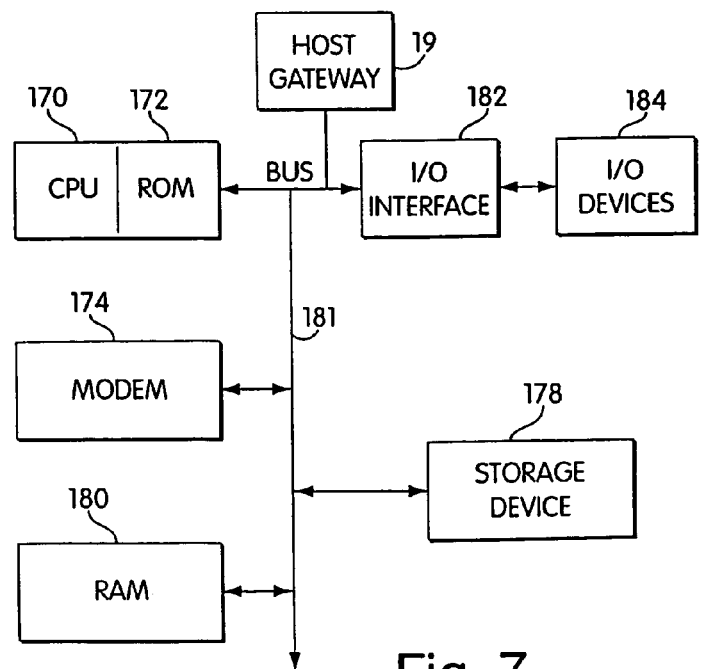
FIG. 7 is a schematic diagram of a host computer 18 of the present invention.

Referring to FIG. 2, the host system 10 may further include a host computer 18. Referring to FIG. 7, the host computer 18 may include a CPU 170, ROM 172, modem 174, a host gateway 19, a data storage device 178, RAM 180, I/O interface 182 and I/O device 184. The host system 10, in particular, may include an HTTP server 188, or web server, and may optionally also include a separate application server capable of communication to the HTTP server 188. The host computer 18 may be any conventional server, such as a DEC server, with a conventional operating system, such as UNIX. The host computer 18 must be capable of receiving messages according to standard Internet protocols, such as HTTP.

Figure 15:
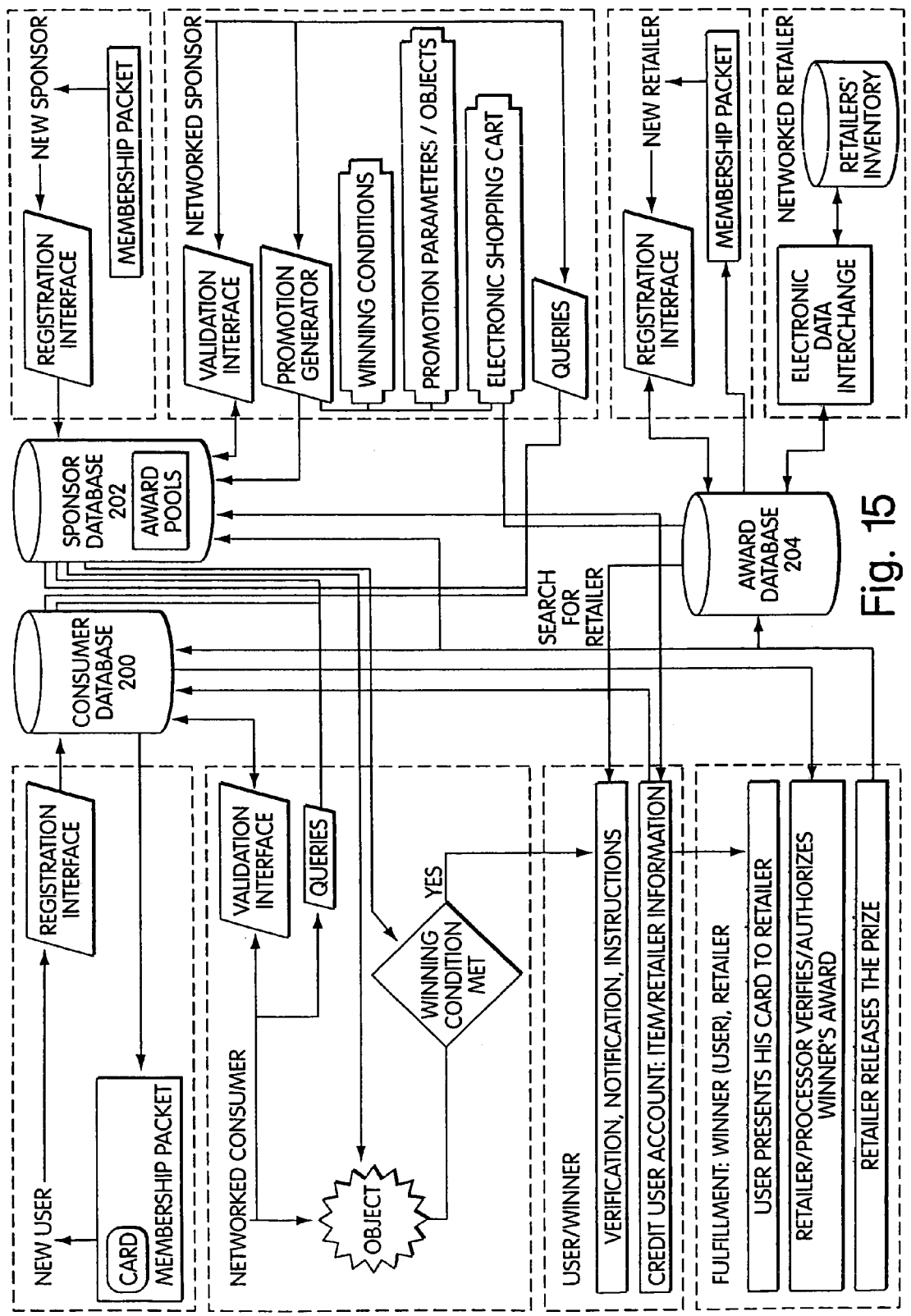
FIG. 15 is a schematic diagram depicting the logical connections of the consumer database, the sponsor database and the award database of the present invention with the consumer site, the sponsor site and the award site of the present invention.

Referring to FIG. 15, the data storage device 178 of the host computer 18 stores files containing code for implementing a consumer site 192, a sponsor site 194 and an award site 198. In addition, the data storage device 178 stores a consumer database 200, a sponsor database 202, and an award database 204. The databases may be of common database types, such as Oracle databases.

An overview of the functions accomplished by the system and method of the present invention is as follows.

A consumer operating on a consumer computer 12 uses the web browser 50 to locate the consumer site 192 of the host computer 18. Once the consumer has located the consumer site 192, the consumer is given various options. The consumer may register to become a member of the host incentive program system by entering various information in a pre-determined format. If the consumer registers, the consumer is then issued an identification number and an associated password. Registration may also be completed through stand-alone computer software, in which case the consumer is issued a disk on which a program is stored that, when installed, prompts the consumer to complete the information necessary for registration. In the case of the software version of registration, the consumer downloads the software to a disk and can send it to the host system by electronic mail.

In addition to registration, the consumer site 192 includes hypertext links or other connections to various other sites, applications, and information. Thus, the consumer can link to information pages that describe the host incentive program system, that describe particular incentive programs, or that provide other information related to the system. Also, the consumer may link to incentive programs that are provided in a directory of incentive programs. The incentive programs may be incentive programs provided by the operator of the host system, or third party incentive programs that have been identified by the host for listing on a directory.

The consumer web site 192 also permits the consumer to search for information or for particular incentive programs by topic or keyword; for example, the consumer may search for incentive programs by company, by type of incentive program, by type of prize, or the like. The consumer site 192 also includes a link to the sponsor site 194, so that a consumer may also consider whether the consumer wishes to provide incentive programs for the consumer's own products or services.

The consumer site also permits the consumer to query a database that provides status information for the consumer regarding participation in host incentive programs. Thus, the consumer can determine the number of points awarded for participation in past incentive programs, the prizes won in past incentive programs, and similar information regarding incentive program activities using the host system. Among other things, the consumer may download rules and directions for participation in the incentive programs that have been registered by the sponsors as incentive programs of the host system. Included in the rules may be information on the specific prizes to be awarded, the odds of winning, and the like. Consumer participation in incentive programs results in the automatic updating of the consumer database 200 and the sponsor database 202, which contain such information in records associated with the consumer.

Figure 17:
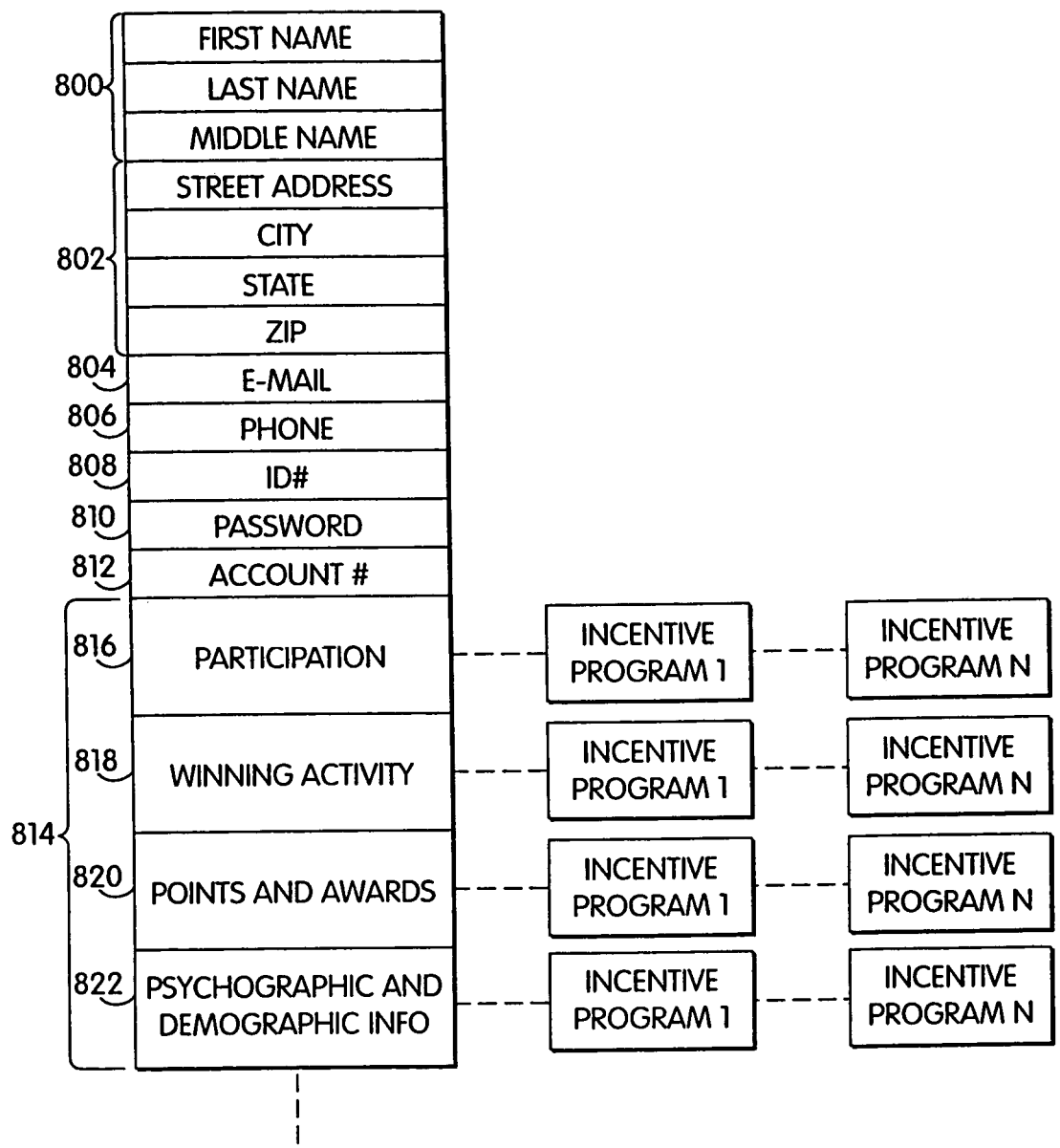
FIG. 17 is a schematic diagram depicting the data structures of the consumer database 200.

When the consumer registers, a record is created in the consumer database 200 reflecting the registration of the consumer and including the personal associated identification number, password, or the like. Referring to FIG. 17, the consumer database 202 includes records that may include the name 800, address 802, e-mail address 804, phone number 806, identification number 808, password 810, and account number 812. Other database records of the consumer database 200 may include sub-records 814 recording various data. A set of participation sub-records 816 may record historical participation in each of the incentive programs by the consumer. A winning sub-record 818 may record information regarding winning activities by the consumer. An award or points sub-record 820 may record loyalty points or prizes won by the consumer. A psychographic or demographic sub-record 822 may include information obtained through consumer responses to inquiries answered by the consumer during participation in incentive programs. Any number of other sub-record containing information about the consumer or about the consumer's participation in incentive programs should be understood to be encompassed within the present system. Once the consumer registers, the registration may be transmitted to any third party provider of electronic cards. The electronic card provider then may issue a card to the consumer that reflects the consumer's identification number and password, so that the consumer can be verified to be the particular consumer who has won a particular incentive program for the fulfillment stage of the present method and system. The card may be any type of electronic payment card, such as a card with a magnetic stripe, similar to an ATM card or credit card, or a microchip-embedded smart card. In the smart card embodiment of the present invention, the smart card may store additional information from the consumer database 200, such as prizes won, points awarded through loyalty programs, or the like.

Thus, a typical consumer may log on to the web site, register as with the host system, and participate in one or more incentive programs. The incentive programs could include, for example, scratch-and-win games, sweepstakes games, treasure hunt games, or computer games. Participation in the incentive programs could include entering data, completing surveys, clicking on one or more icons in a pre-determined manner, or other "win eligible" activities, such as answering questions. When the consumer wins an incentive program, the incentive program software algorithm indicates that a "win" has been accomplished and informs the consumer of the appropriate prize. The databases are then updated to reflect that the consumer has won the prize. The prize could include not only retail merchandise, but loyalty points, discounts, coupons, and the like. Thus, for example, a consumer participating in a scratch-and-win game for a rental car company might receive, upon winning the scratch-and-win game, a number of loyalty points in the rental car loyalty program. Incentive program award techniques for all types of incentive programs can be embodied in the present invention. Thus, loyalty points can be awarded for participation with respect to multiple retailers, and merchandise can be awarded by the sponsor offering the incentive program or by third party retailers. Further, incentive programs can include additional benefits to the retailer, such as including advertising or product logos as part of the graphical object viewed by the consumer when playing an incentive program; thus, a scratch-and-win game could, for example, include a branded product logo that appears when the product is won.

Further functions of the present invention may be accomplished by participation of a sponsor. A sponsor initiates participation through the sponsor computer 14 by accessing a web browser 50 and entering the URL of the sponsor site 194. The/sponsor site 194 then displays a sponsor home page 195, which provides various options for the sponsor. The sponsor, for example, may register as a sponsor in the host system. The registration process includes identification of the sponsor and various information about the sponsor, including the sponsor's mailing address, web address, contact information, types of incentive programs, and other information relevant to the sponsor. The information is then stored in a sponsor database 202 that includes records associated with the particular sponsor.

Once a sponsor is registered, and a verification of the information submitted by the sponsor is conducted, the sponsor site 194 is updated to reflect any incentive programs that the sponsor wishes to include on the sponsor site 194. Thus, the sponsor database 202 is updated, as is the sponsor site 194, upon registration of a sponsor.

A sponsor, in addition to providing a link to a preexisting incentive program site, may purchase an incentive program from the host. Incentive programs available from the host may be pre-packaged incentive programs that are computer software applications of pre-determined incentive program types, such as scratch-and-win games, treasure hunts, sweepstakes games, or the like. The host may include third party incentive programs, such as computer games, for purchase by sponsors. The sponsor can view samples of different incentive programs and select incentive programs based on review of the samples. Selection of the incentive program prompts the sponsor to define certain parameters relative to the incentive program, such as the starting date and duration of the incentive program. The sponsor may also choose to build an incentive program. A sponsor may build an incentive program through interaction with the host system's computer automated incentive program building capability. A sponsor who wishes to build an incentive program is asked to select among various types of incentive programs or combinations of incentive programs and to enter parameters that are associated with those types of incentive programs, so that an application program of the host computer 18 can generate an incentive program that has the characteristics selected by the sponsor.

Whether the sponsor purchases a pre-packaged incentive program or chooses to build an incentive program, the completed incentive program is downloaded to the sponsor for installation on a web site of the sponsor. The sponsor database is updated to reflect the presence of the new incentive program, and the sponsor site 194 is updated to include a link to the new incentive program. There several ways in which the online code can be embedded into the website of the sponsoring firm, as follows. The sponsoring firm may receive instructions on how to the place of HTML tags in desired locations throughout the site. The tags would serve as addresses for the code to be embedded. The sponsor or the sponsor's webmaster could leave a port open through which the incentive firm could embed the code in designated areas. A set of files could be mailed to the sponsoring firm for their placement and incorporation into their site.

Once a new incentive program is installed, the sponsor is prompted to select prizes for the incentive programs. The prizes may be fulfilled by the sponsor, in which case the sponsor simply enters the prizes into the sponsor database as being associated with the incentive program. The sponsor may also select prizes from the award database 204 of retailer merchandise, catalog company merchandise, sponsor merchandise, and other prizes and awards provided by the host system, described more particularly below, for prize fulfillment. The sponsor may pay for the selected prizes, if the sponsor does not wish to self-fulfill, and the sponsor may pay for the incentive program, through electronic payment channels, such as entering a credit card number over the Internet. Once the payment has been verified, the code for the incentive program is generated and transmitted to the sponsor. The code includes registration information, including an identification number for the sponsor.

The sponsor may also link from the sponsor site 194 to pages that contain various information about the host incentive program method and system, about the host, and about opportunities to participate in incentive programs. The sponsor site 194 also permits the sponsor to link directly to the consumer site 192 and to query the consumer database 200 to obtain information regarding consumer participation in that sponsor's incentive programs. Thus, the sponsor can obtain psychographic, demographic, or other information relevant to the participation of consumers in sponsor's incentive programs.

The participation of retailers in the present method and system is also by an Internet connection of a personal computer or similar computer to an award site 198. The retailer initiates the connection by entering the URL for the award site 198 in the web browser 50. The award site which is a collection of files on the host system, displays information and links that permit the retailer to accomplish various functions. The retailer may, among other things, register as a retailer, in which case a retailer data base 204 is updated to reflect the presence of the retailer and to include records that reflect the name of the retailer, the mailing address of the retailer, the web address of the retailer and other related information. After registration the retailer may participate in various activities; however, the primary function of the award site 198 is to permit the retailer to list information regarding prizes the retailer wishes to include in a menu of various prizes offered by the retailer. Thus, the retailer can list prizes for selection by sponsors. The award database 204 that is created by participation by the retailer is also connected via an electronic data interchange 126 to the retailer's proprietary inventory system 212. Thus, the award database 204 can be automatically updated to reflect the retailer's current inventory according to inventory numbers, such as SKUs, type of inventory, or the like. Thus, the system automatically permits sponsors to enter the award site 198 to search the site via topic or keyword to obtain particular prizes, to select the prizes and to update the sponsor database to reflect the association of a particular prize with a particular incentive program. The award site 198 also includes links to the consumer site 192 and the sponsor site 194.

The function of the present method and system may be further understood by reference to the flow charts depicted in the figures.

Figure 8:
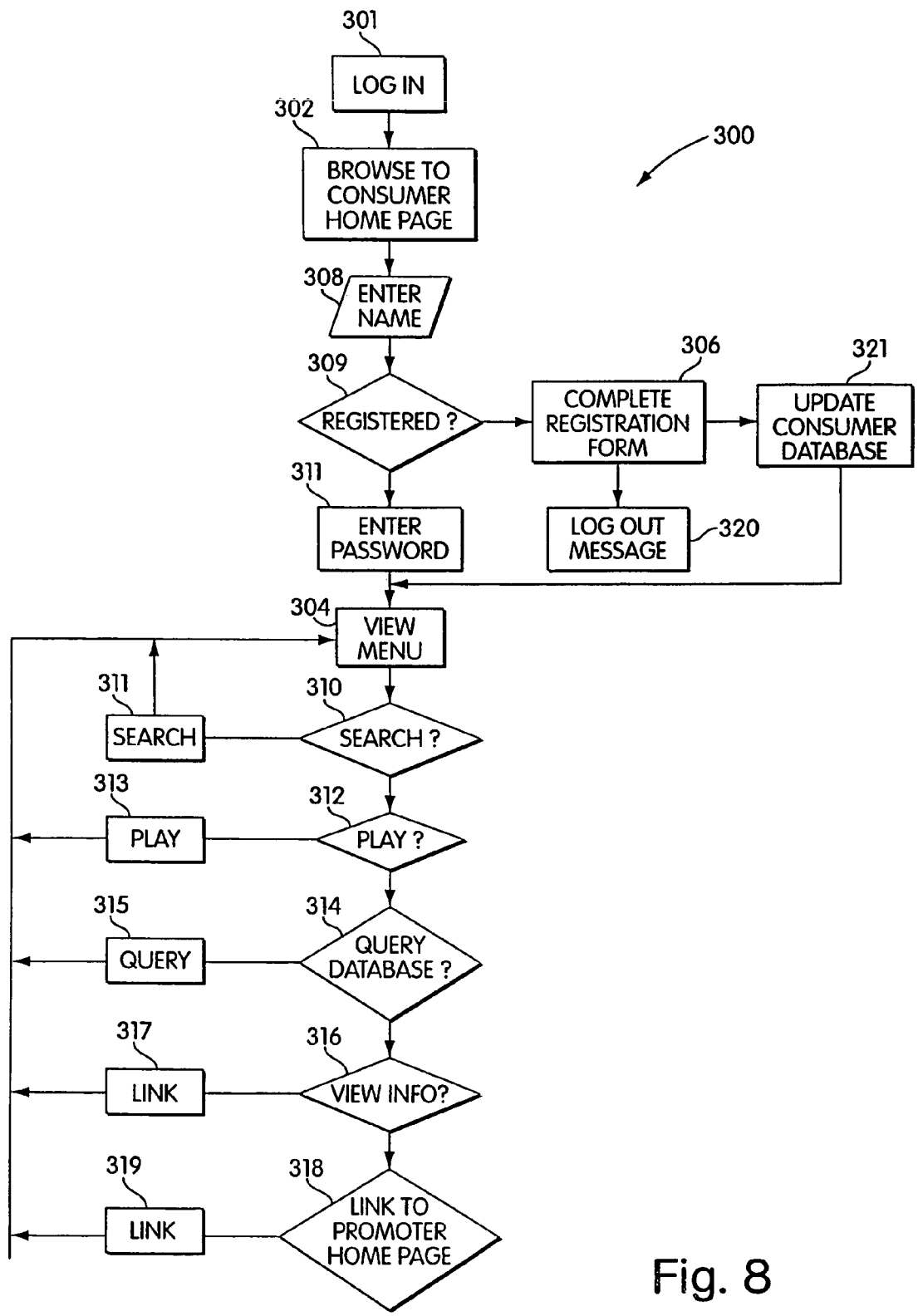
FIG. 8 is a flow chart depicting the steps by which a consumer may participate in incentive programs and win awards in accordance with an embodiment of the present invention.

Referring to FIG. 8, a flow chart 300 is depicted describing the steps by which a consumer participates in incentive programs via the consumer web site 192. First, at a step 301 the consumer logs into the consumer computer 12. The consumer then uses the web browser 50 in a step 302 to browse to the consumer site 192, at which point the consumer views a consumer home page 193. The consumer home page 193 includes a directory of links to other pages within the consumer site 192, as well as links to incentive programs offered by third parties. Further, the consumer home page 193 offers various options to the consumer. At a step 308 the consumer is prompted to enter the consumer's name. Next, at a step 309 the host computer 18 searches the consumer database 200 to determine whether the consumer is listed in the consumer database 200. If the consumer is found in the consumer database 200 at the step 309, the consumer is prompted to enter the consumer's password at a step 311, and, upon confirmation of the password with a conventional password utility, the consumer is sent to a step 304 which the consumer can view the various options available at the consumer home page 193.

If the consumer is not found in the consumer database 200 at the step 309, then the consumer is prompted to respond whether the consumer wishes to register as a member of the host system at a step 306. If the consumer wishes to register at the step 306, then the consumer is prepared to complete a registration process at the step 306. If at the step 306 the consumer declines to register, then the consumer is returned at a step 320 to a message informing the consumer that the host system's capabilities require registration and that the consumer may log out by using the back key of the consumer's browser.

Once the consumer is registered via the registration process, the consumer database 200 is updated at a step 321 and the consumer returned to a page at a step 304 reflecting the directory of options available to the consumer. Thus, the consumer at a series of steps may determine whether the consumer wishes to conduct various options. At a step 310, the consumer may choose to search the sponsor database for incentive programs. The search may be by topic, keyword, company or other parameters. If the consumer wishes to search, then the consumer is transferred to a search algorithm in a step 311.

Once the search is complete, or if the consumer does not wish to search, then at a step 312 the consumer chooses whether the consumer wishes to link to an incentive program. If the consumer wishes to link to an incentive program, then the consumer is linked by a hypertext link to the incentive program in a step 313. Upon completion of the incentive program, or upon execution of the back key of the consumer's web browser 50, the consumer is returned to the directory at a step 304, at which point the consumer has the various steps and options available.

If the consumer does not wish to search, or to link to an incentive program, at the steps 310 and 312, then the consumer may elect to query the consumer database 200 at a step 314. At a step 315, the consumer may, in querying the database, determine information about the consumer's participation in past incentive programs, the status of the consumer's participation in such incentive programs, including whether the consumer has won prizes and the nature of the prizes, and the number of points the consumer has accumulated in loyalty programs offered by sponsoring companies. Upon completion of the query, the consumer is returned to the directory at the step 304 and is offered the various options again. If the consumer does not wish to search, link to an incentive program, or query a database, the consumer may also, at a step 316, elect to view information regarding incentive programs. If so, at a step 317 the consumer is linked to pages containing information, including the rules of participation in incentive programs, a description of the consumer site, and other information regarding the host system. At a step 318, the consumer may also choose to link to the sponsor site 194 by responding affirmatively to a prompt that queries whether the consumer wishes to become a sponsor in the host system. Upon the completion of each of the steps 310, 312, 314, 316 and 318 the consumer is returned to the directory at the step 304 and offered all of the options again. If the consumer does not select any of the options, then the consumer may log out at a step 320, which may be completed by use of the back key in the consumer's browser, or by entering a URL for a different site in the browser.

Figure 23:
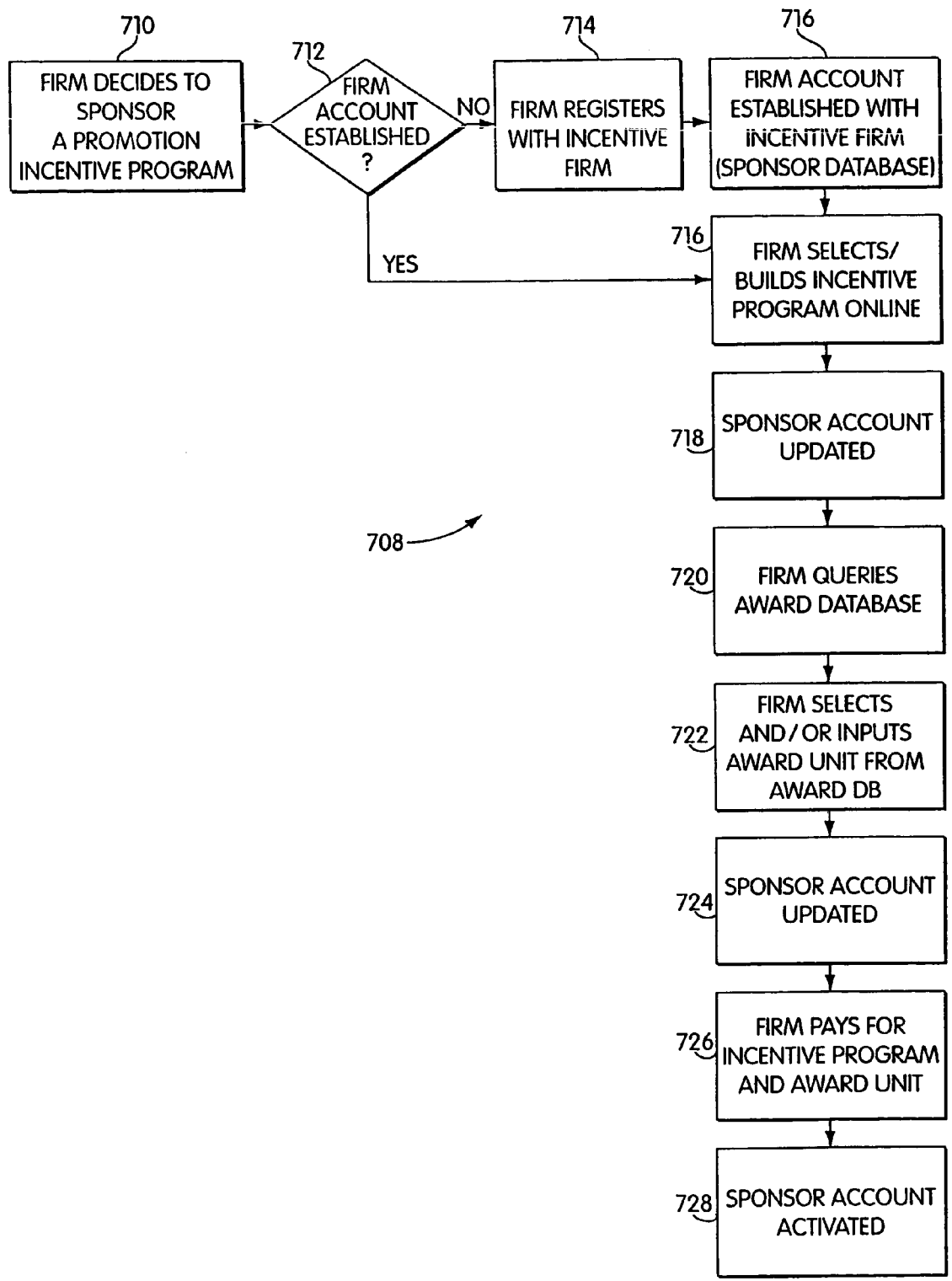
FIG. 23 is a flow chart depicting the participation of a sponsor in the present invention.

Referring to FIG. 23, participation of the sponsor in the present system may be understood by reference to a flow chart 708. At a step 710 a sponsor decides to sponsor an incentive program. The host system determines whether the firm has established an account at a step 712. If not, the sponsor registers at a step 714 and an account is created at a step 716. Once an account is established, at a step 716 the firm selects or builds an incentive program online. The sponsor account is updated in the sponsor database at a step 718. The sponsor then queries the award database 204 at a step 720. The sponsor selects the award at a step 722. The sponsor account is updated at a step 724 to associate the award with the incentive program. The sponsor pays for the incentive program and any award units, as described more particularly below at a step 726. The sponsor account is then activated to reflect a new promotion at a step 728.

Figure 9:
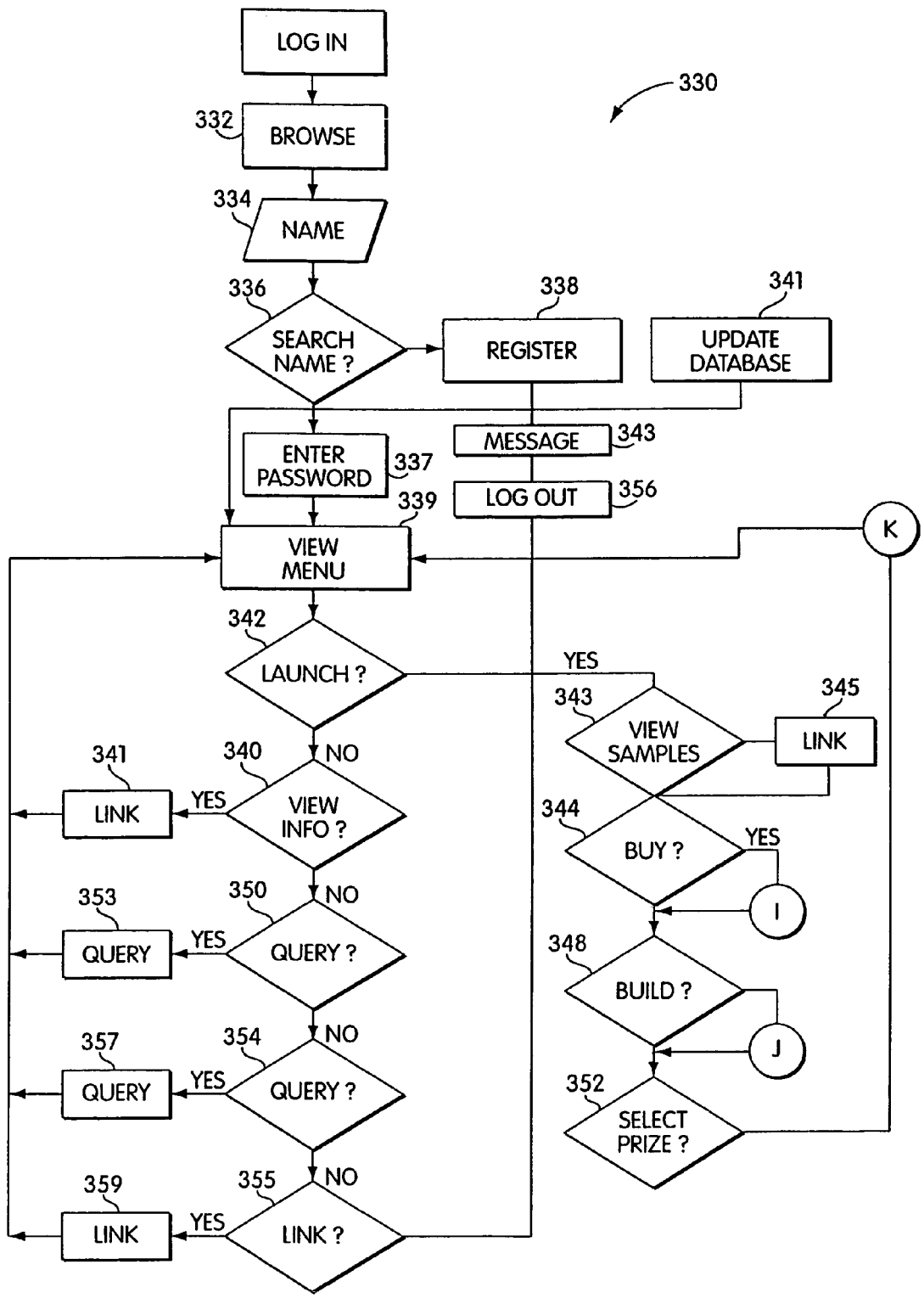
FIG. 9 is a flow chart depicting the steps by which a sponsor may offer incentive programs, select prizes, and participate in related incentive program activities in accordance with an embodiment of the present invention.

Referring to FIG. 9, participation of a sponsor in the method and system of the present invention may be further depicted by a flow chart 330. First, at a step 332 the sponsor locates the sponsor site 194 at which time a sponsor home page 195 is depicted, which is a series of home pages, which may be HTML pages stored in the data management, storage and retrieval application 44 of the sponsor site 194 located on the host system and dedicated to sponsor activities. Upon entering the home page, the sponsor is prompted at a step 334 to enter the sponsor's name. Next, at a step 336 the host computer 18 conducts a search of the sponsor database 202 to determine whether the sponsor is registered as a member of the host system. If at the step 336 the sponsor is found to be in the database, then the sponsor is prompted at a step 337 to enter the sponsor's password, using a conventional password utility. Upon entering the password at the step 337, the sponsor is sent to a directory at a step 339. If the sponsor is not found in the database at the step 336, then the sponsor is sent to a step 338 at which the sponsor is prompted to register as a member of the host system. If, at the step 338, the sponsor wishes to register, then the sponsor is sent to a registration algorithm at the step 341. Upon completion of the registration algorithm 341 the sponsor is returned to the step 339 at which point the system displays the directory. If at the step 338 the sponsor does not wish to register, then the sponsor is prompted in a message at a step 343 to log out of the system at a step 356.

At the step 339 the sponsor is prompted with various options reflected by the steps 340, 342, 344, 348, 350, 352, 354 and 355. Upon completion of any of these steps, the sponsor is returned to the directory at the step 339 so that any step may be repeated as desired by the sponsor.

Options available to the sponsor are as follows. At a step 340 the sponsor may choose to review information regarding the host system, including information regarding rules and regulations of incentive programs, the requirements for the sponsor to participate in the host system, and the like. At a step 342, the sponsor may choose to launch an incentive program. If the sponsor chooses to launch an incentive program, the sponsor is prompted to indicate whether the sponsor wishes to view samples at a step 343. If the sponsor wishes to view samples, the sponsor is given the opportunity at a step 345 to view sample incentive programs of various types, such as scratch-and-win games, treasure hunts, sweepstakes and the like.

Once the sponsor has viewed samples, or if the sponsor does not wish to view samples, the sponsor is prompted to indicate whether the sponsor wishes to purchase a prepackaged incentive program of the type displayed in the samples at the step 344. If at the step 344 the sponsor wishes to purchase an incentive program, then the sponsor is transferred to the algorithm for purchase of an incentive program which is reflected by off-page connector "I" in FIG. 9. Off-page connector "I" connects to similar off-page connector "I" in FIG. 10, which depicts the algorithm for buying a prepackaged incentive program.

Upon completion of buying a prepackaged incentive program, or if the sponsor does not wish to buy a prepackaged incentive program, the sponsor is prompted at a step 348 to indicate whether the sponsor wishes to build a new incentive program. If the sponsor wishes to build a new incentive program, then the sponsor is transmitted to a set of algorithms that permit the sponsor to build an incentive program or programs. The connection to the incentive program builder function is depicted by off-page connector "J" in FIG. 9 which connects to connector "J" of FIG. 11, which depicts the incentive program building function.

Figure 12:
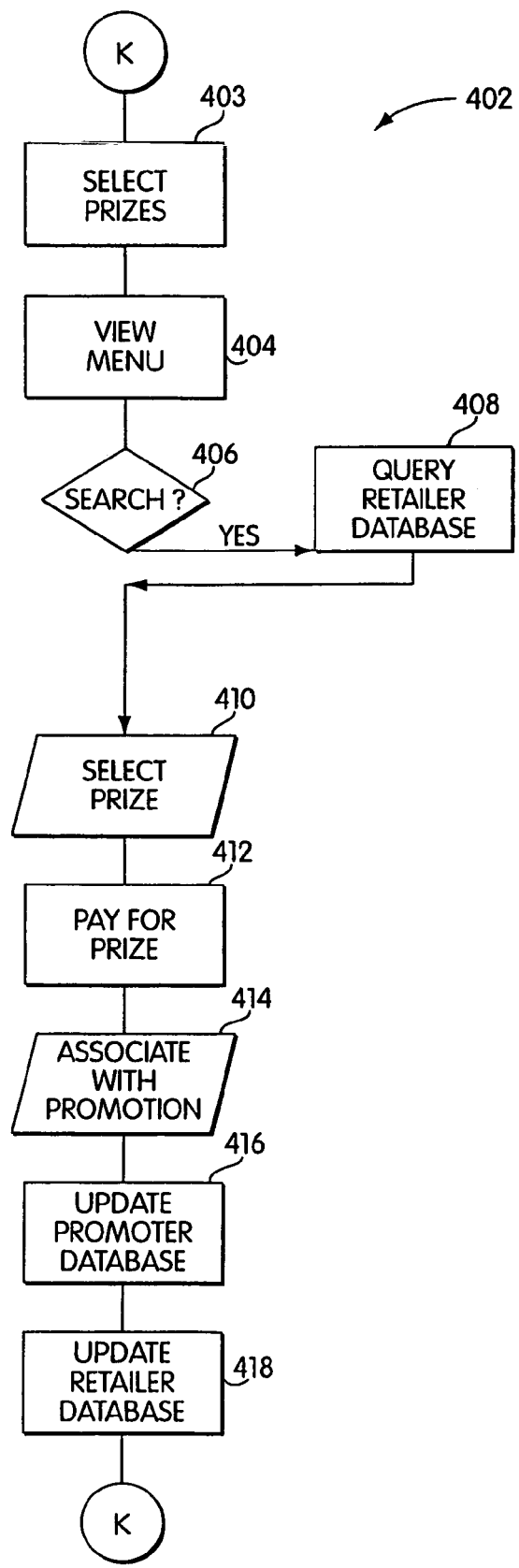
FIG. 12 is a flow chart depicting steps by which a sponsor may select and purchase prizes in accordance with an embodiment of the present invention.

If the sponsor has bought an incentive program at the step 344 or built an incentive program at the step 348 then the sponsor is prompted at a step 352 to select a prize or group of prizes. Selection of a prize is depicted in a flow chart 402 in FIG. 12. The connection between FIG. 9 and FIG. 12 is depicted by off-page connector "K".

Upon completion of the prize selection function, the sponsor is returned to the directory of the step 339 and may choose again to view information or launch an incentive program at steps 340, 342. If the sponsor wishes to view information the sponsor may link to HTML pages containing such information at a step 341. If these steps are not desired, another option is to choose at a step 350 to query the sponsor database. If at the step 350 the sponsor chooses to query the database, then at a step 353 the host-computer 18 conducts a search of the sponsor database for various information, such as the nature of incentive programs offered by the sponsor, the participation of the consumers in the incentive programs, the prizes associated with each incentive program, and the like.

Next, at a step 354, the sponsor may choose to query the consumer database 200. If the sponsor wishes to query the consumer database 200 at the step 354, then at a step 357 the host computer 18 conducts a search of the consumer database 200 for various information relating to consumer's participation in the sponsor's incentive programs. For example, such information may include demographic or psychographic information about the types of consumers who are participating in the sponsor's incentive programs. For example, the sponsor may be able to determine the median age of consumers who are participating in the sponsor's incentive programs. Upon completion of a query, or if the sponsor does not wish to execute a query at the steps 350 or 354, the sponsor may, at a step 355, link at a step 359 to the consumer site 192. Again, upon completion of each of the steps 340, 342, 350, 354 and 355, the sponsor is offered all of the options again. If none of the options are selected, then the sponsor is prompted to log out at the step 356.

Figure 10:
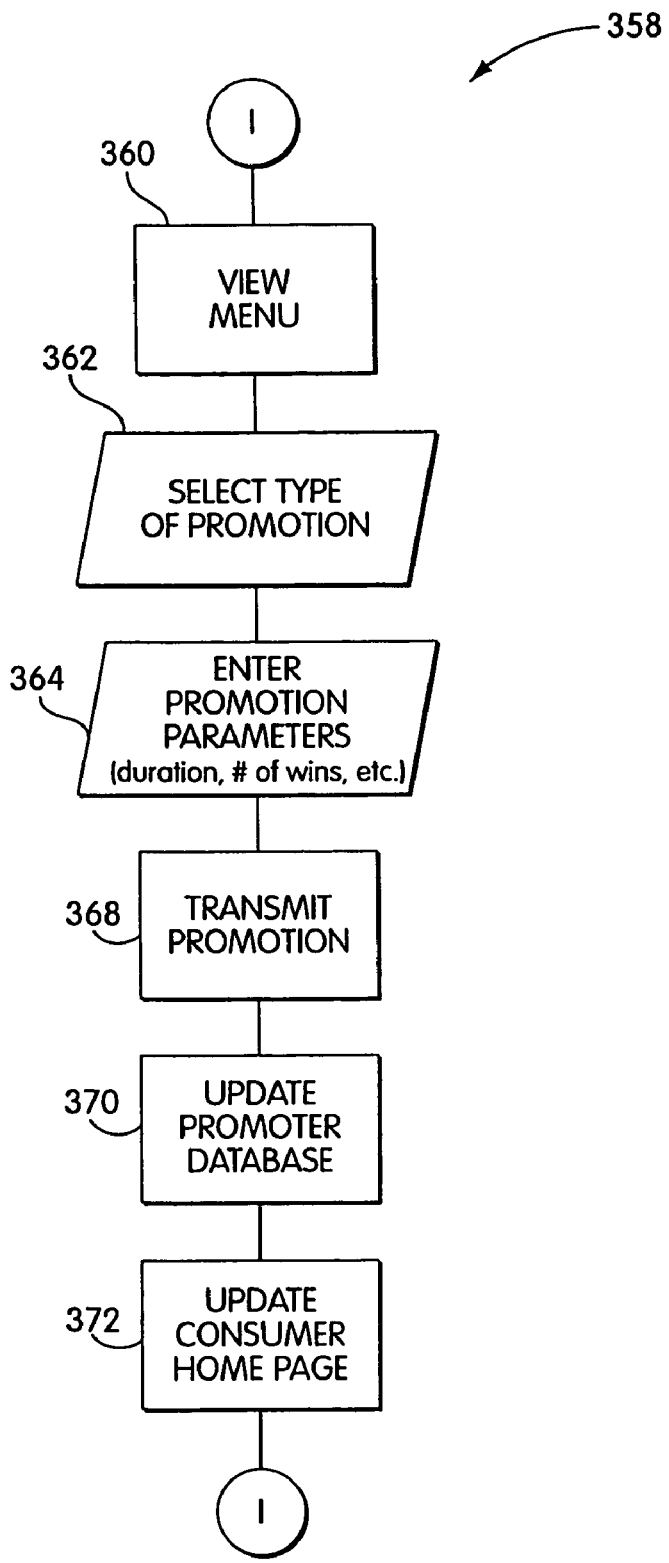
FIG. 10 is chart depicting steps by which a sponsor may purchase a pre-packaged incentive program from the host of the system of the present invention.

Referring to FIG. 10, the steps by which a sponsor may buy a pre-packaged incentive program are included in a flow chart 358. Upon choosing to buy a prepackaged incentive program at the step 344 of FIG. 9, the sponsor is presented with a menu at a step 360 of FIG. 10. Next, at a step 362 the sponsor is prompted to select a type of incentive program. Incentive programs may classified into different types, such as intra-firm or inter-firm, games or chance or games or skill, etc. Incentive programs may also have different implementations. Implementations include conventional incentive program games such as bingo, scratch-and-win, treasure hunt, sweepstakes, and the like, other computer games, such as Tetris or pinball, or surveys or questionnaires. On selecting a type of incentive program, the sponsor is prompted at a step 364 to enter parameters that are associated with that type of incentive program, such as the duration of the incentive program, the number of winners who may participate in the incentive program, the frequency of winning, and the like. Next, at a step 368 the pre-packaged incentive program is transmitted to the sponsor by electronic mail or other file transfer protocol, so that the sponsor can download the incentive program on the sponsor's own server. Alternatively, the code could be mailed on a disk with instructions for downloading into the sponsor's own site. The sponsor can be sent instructions on creating an HTML tag to the sponsor site, informing the host of the tags. The host can then add the incentive program to the consumer site with a hypertext link to the incentive program on the site. Next, the sponsor database is updated at a step 370 reflecting the presence of a new incentive program for that sponsor. Next, at a step 372, the host computer 18 updates the consumer home page 193 of the consumer site 192 to reflect the presence of a new incentive program and a link to the new incentive program. Upon completion of the purchase the sponsor is returned by off-page connector "I" to the step 339 of FIG. 9.

Figure 11:
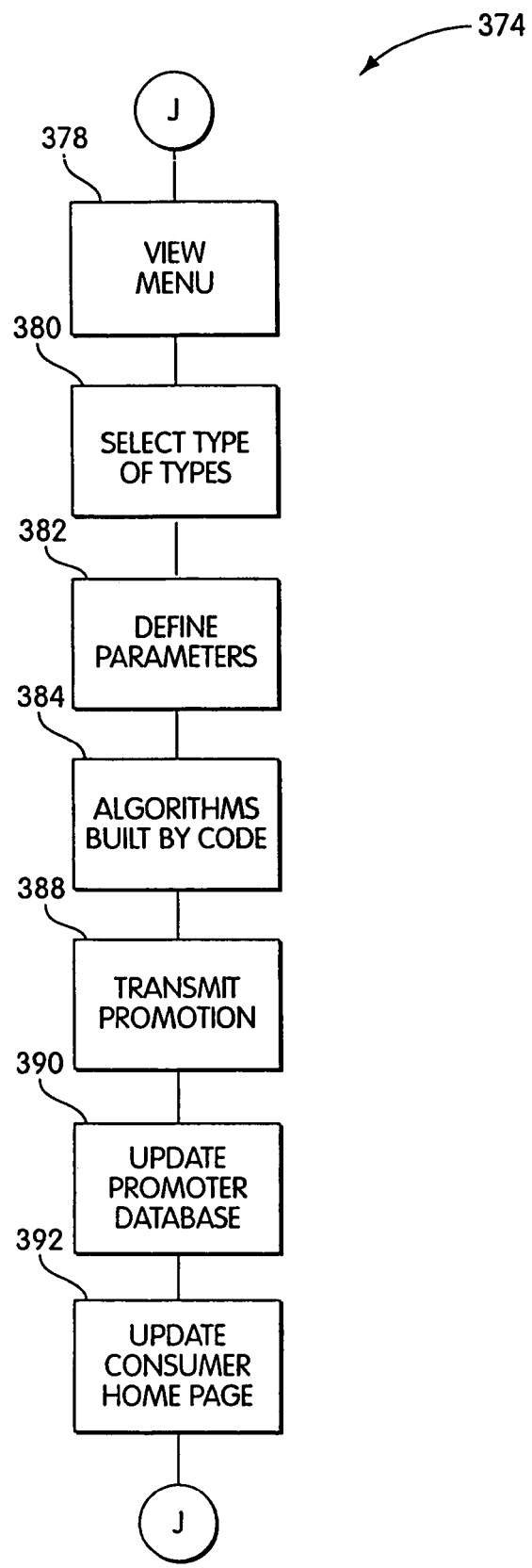
FIG. 11 is a flow chart depicting steps by which a sponsor may build an incentive program in accordance with an embodiment of the present invention.

Referring to FIG. 11, the steps for building a new incentive program are depicted in a flow chart 374 which is connected by off-page connector "J" to FIG. 9. The sponsor is first prompted to view a menu of incentive program at a step 378. Next, at a step 380, the sponsor is prompted to select a type of incentive program or a combination of types of incentive program. Next, at a step 382 the sponsor is prompted to define parameters for the incentive program or combination of incentive programs. Next, at a step 384, an incentive program builder function of an application program running on the host computer 18 builds an application program that executes an incentive program of the type defined in the step 382. Next, in a step 388 the incentive program that was built is transmitted to the sponsor by conventional means such as electronic mail, disk or file transfer, so that the sponsor can install the new incentive program on the sponsor's server for the sponsor's own site. Next, the sponsor database is updated to reflect the presence of a new incentive program at a step 390. Next, at a step 392, the consumer home page 193 of the consumer site 192 is updated to reflect the presence of the new incentive program. Upon completion of the incentive program building functions of the flow chart 374, the sponsor is returned to the flow chart of FIG. 9, as reflected by off-page connector "J."

Referring to FIG. 12, a flow chart 402 depicts the prize selection process. If a sponsor has either bought an incentive program at the step 344 of FIG. 9 or has built a new incentive program at the step 348 of FIG. 9, then the sponsor is prompted to select prizes for the incentive program at a step 352. FIG. 12 is connected to FIG. 9 by off-page connector "K". Referring to FIG. 12, at a step 404 the sponsor is prompted to view a menu of available prizes. The menu may be divided by types of prize, companies offering the prize, or other categories. The sponsor may find an appropriate prize by choosing at a step 406 to conduct a search.

If the sponsor chooses to search at the step 406, then the sponsor is transferred at a step 408 to the award database 204 and provided with conventional search algorithms for searching the award database by type of prize, retailer, party offering the prize, mode of fulfillment, or other topics or keywords. Upon completion of the search, or if the sponsor wishes to select the prize directly from the menu, the sponsor is then prompted at a step 410 to select a prize by clicking on the appropriate prize. Prize selection requires the sponsor to enter various data for each incentive program, including the number of prizes, the frequency of winning, relative prize weighting (e.g., grand prize, second prize, etc.). When a consumer wins, then the prize is selected based on an algorithm that depends on the selected prize frequency. Each prize also must have a selected mode of fulfillment, which is entered by the sponsor at the step 410 through a menu, a set of icons, or the like. Next, at a step 412 the sponsor is prompted to pay for the prize. Payment may be by any conventional means, such as electronic transmission of the sponsor's credit card number. Next, the sponsor is prompted to associate the prize with the appropriate incentive program at a step 414, identifying the frequency of winning, type of prize and other information for the incentive program. Once purchase is made, the award database is updated to reflect that the prize has been purchased. Next, the sponsor database is updated by the host computer 18 to reflect the association of the prize with the incentive program at a step 416. Next, the award database is updated by the host computer 18 at a step 418 to reflect the purchase of the prize by the sponsor. Upon association of the prize and updating of the databases, the sponsor is returned to the directory at the step 339 of FIG. 9.

Figure 13:
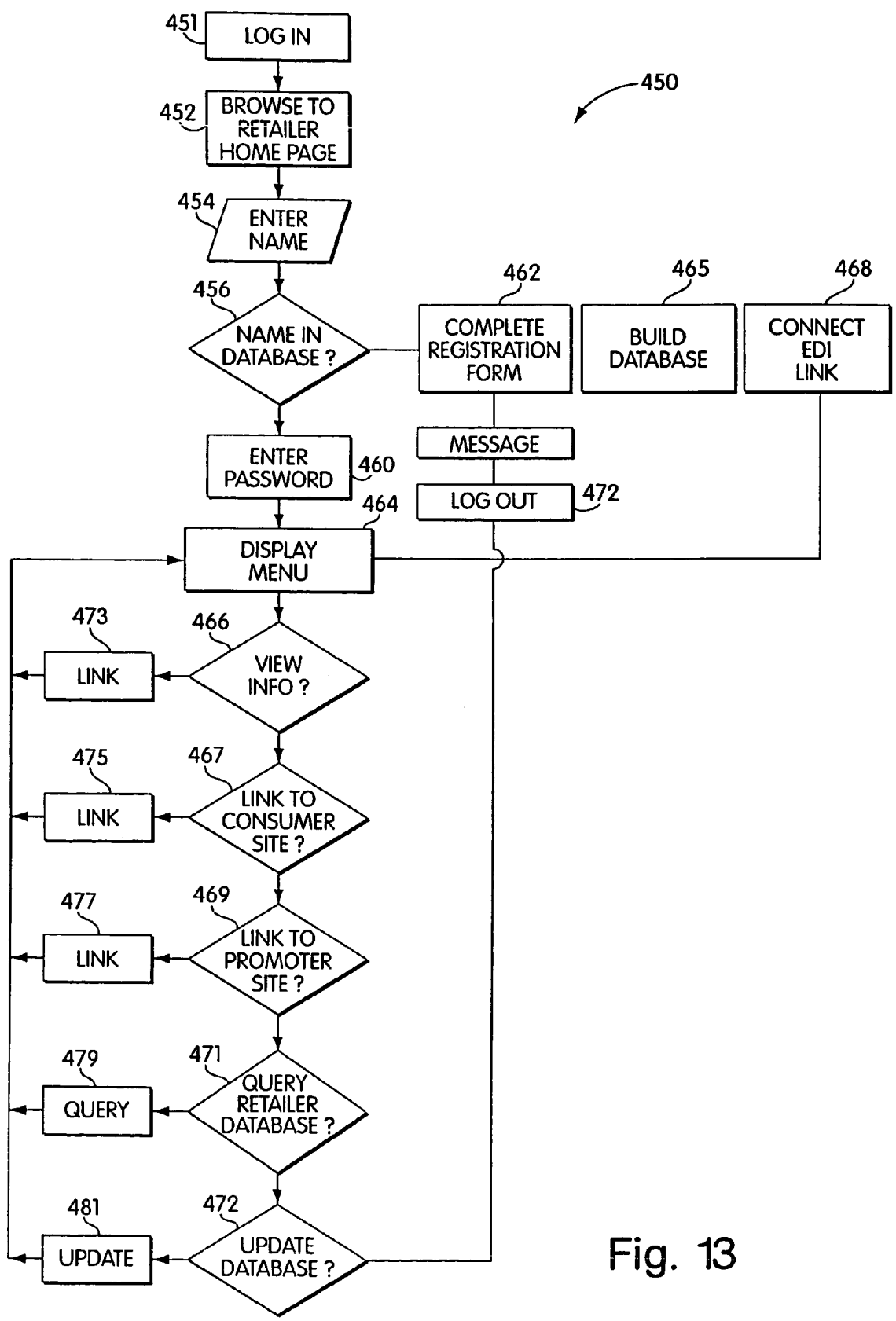
FIG. 13 is a flow chart depicting the steps by which a database of awards is established and maintained in accordance with an embodiment of the present invention.

Referring to FIG. 13, the steps necessary for retailer participation in the method and system of the present invention are described in a flow chart 450. Sponsors, the host, catalog companies and other parties may also participate in the system according to these steps. To participate in the method and system of the present invention, the retailer first logs in at a step 451 and locates the award site 198 in a step 452, at which point the retailer home page 197 is displayed offering various options to the retailer. The retailer is then prompted at a step 454 to enter the retailer's name. Next, at a step 456, the host computer 18 searches the award database to determine whether the retailer's name is included in the database. If at the step 456 the retailer's name is in the database, then the retailer is prompted at a step 460 to enter the retailer's password, after which the retailer is sent to a step 464 at which a directory of options is displayed to the retailer.

If the retailer's name is not in the award database 204 at the step 456, then the retailer is sent to a step 462 at which the retailer is prompted to register. Upon registration, the award database 204 is updated to reflect the presence of the retailer. The retailer is assigned a unique identification number and is permitted to select a password with a conventional password utility. Next, the retailer is sent to the step 464 at which a directory of options is available. The primary option available to the retailer is at the step 465 in which the retailer builds the award database 204. The award database 204 is built by the retailer's entering data regarding retailer inventory available for selection as prizes into the award database 204. The data may be entered by the retailer by an input/output device, or through a direct link to the retailer inventory system and through gateway programs and application programs that may be customized to update the award database automatically upon updating of the retailer inventory system at a step 468. The award database 204 includes information regarding prizes, such as the prices of prizes and the geographic location of individual prizes that are available for incentive programs.

Once the retailer has completed any changes to be made to the award database 204 at the steps 465 and 468, the retailer may also select other options at the steps 466, 467, 469, 471 and 472. Upon completion of any of the steps 465, 466, 467, 468, 469, 471 or 472 the retailer is returned to the step 464, at which the retailer may again select any of these steps. At the step 466 the retailer may choose to view information regarding participation in the host system and other information regarding incentive programs in which case a link is made to HTML page with the information in a step 473. At the step 467, the retailer may elect to link in a step 475 to the consumer's site to participate in incentive programs. At the step 469, the retailer may elect to link in a step 477 to the sponsor's site to act as a sponsor in addition to being a retailer. At the step 471, the retailer may elect to query the award database 204 in a step 479 to determine the current status of the prizes in the database. At a step 472, the retailer may elect to update the award database 204 in a step 481 by adding or deleting prizes or changing prices or fulfilment options; however, these activities may also be controlled by the host of the host system. If the retailer does not wish to execute any further steps among the steps 465–472, the retailer may log out, which may be accomplished by entering the back key on the retailer's web browser 50.

Figure 14:
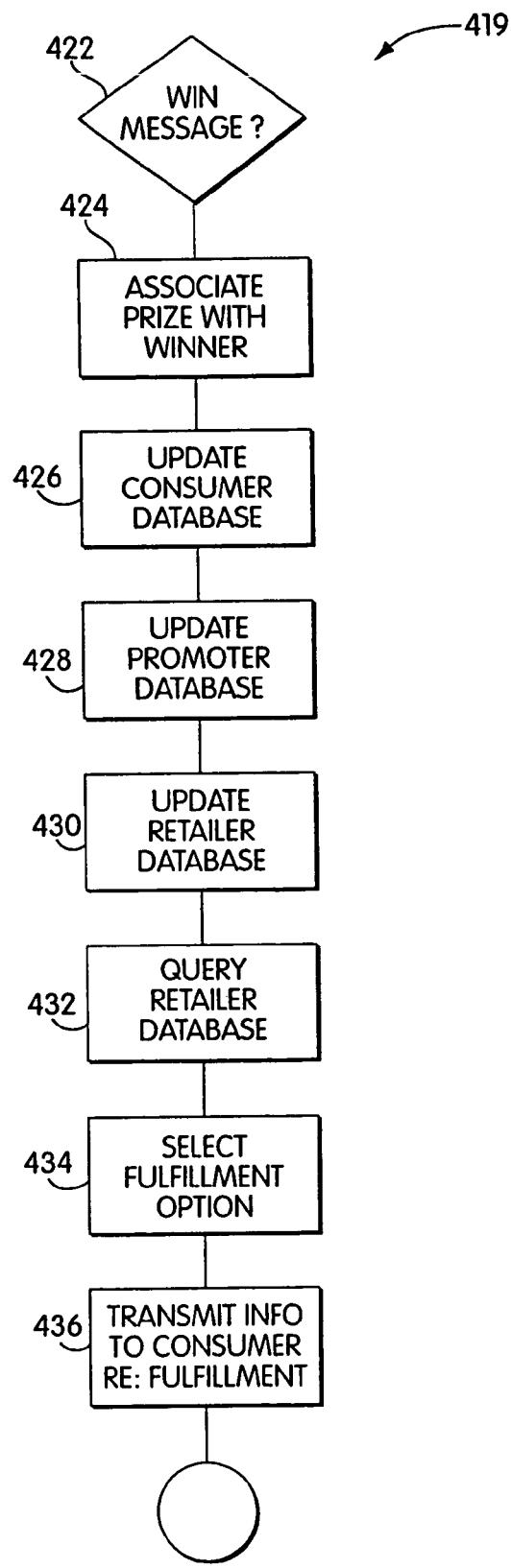
FIG. 14 is a flow chart depicting steps by which an award or prize is fulfilled in accordance with an embodiment of the present invention.

Referring to FIG. 14, a flow chart 419 depicts the steps by which a prize is awarded upon successful completion of an incentive program. When the consumer participates in an incentive program, as depicted in FIG. 8, successful participation in the incentive program, which may be accomplished by clicking on icons in a pre-determined order, or other "win-eligible" activities, as defined by the parameters of the incentive program, results in a "win" message being sent by the application program of the incentive program to the consumer database 200. At a step 422 the host computer 18 queries the consumer database 200 to determine whether a "win" message is associated with the consumer's name in the consumer database 200. After a win message is determined, an algorithm queries the sponsor database to determine the promotion implementation method and to determine the form of win message, if any, that is required. Next, at a step 424, the host system determines via a query to the sponsor database 202 what prize or group of prizes has been purchased for the particular incentive program won by the consumer, given what prizes have been won and the predetermined frequency of winning particular prizes. If a particular prize cannot be fulfilled without undue burden; that is, if no retail location is near enough to the consumer's address, then a catalog prize may be automatically substituted. Next, in a step 426, the consumer database 200 is updated to reflect the association of the prize or group of prizes with the name of the consumer and the consumer database 200. Next, at a step 428 the sponsor database 202 is updated to reflect the association of the prize with the consumer and the fact that the prize should be removed as an eligible prize from the sponsor database 202. Next, at a step 430, the award database 204 is updated to reflect the association of the prize with the particular consumer who has won the prize. Next, at a step 432, the award database 204 may be queried to determine the available geographic locations of prizes of the type won by the consumer.

Next at a step 434, the host computer 18 executes an algorithm that selects the appropriate fulfillment option for the prize. In particular, by comparing the geographic information of the consumer in the consumer database 200 and the information in the award database 204, the host computer 18 identifies the nearest retail location for fulfillment of the prize or, if no location is suitable, the prize may be mailed to the consumer. The unique prize information is uploaded from a sub-segment of the award database 204 to a card processor, who may be a third party, which permits the prize to be cleared via a card network, such as a credit card network. Alternatively, prize winners and the amounts or prizes won by the winners may be uploaded to the card processor, and the prize or award could be verified by a verification process whereby the retailer or merchant can query the award database 204 online or by phone and receive a confirmation number for the prize for auditing purposes. Verification can also take place via the upload to a network with card processing and verification built in. Next, at a step 436, the information regarding a retailer location for purchase of the prize is transmitted to the consumer. Finally, when the consumer goes to the retail location, the consumer displays the consumer's electronic card 11 which includes the personal identification number that permits the retailer to confirm that the consumer is the consumer who has participated in the incentive program and has won the prize. Confirmation is obtained by a query of the award database 204 that is conducted by the retailer, either by telephone to the host, or by a computer query to the award database 204. Confirmation may come from a processor verifying the amount and particular item (e.g., SKU or product number match) at the particular store associated with the winning consumer with credit on a credit or debit account. Thus, the merchandise won by the consumer is easily obtained by the consumer at the most convenient retail location.

A more detailed description of the system for an embodiment of the present invention is set forth below, including a description of computer systems and code that may be used to accomplish the functions described herein.

Once a consumer has registered as a consumer member of the host system, the consumer's name, address, password, and PIN may be sent to a third party provider of electronic payment cards. The electronic payment card provider may then issue the card 11 to the consumer. The card 11 may have a magnetic strip coded for the PIN number or password that links the consumer to the consumer's entry in the consumer database 200. The card 11 may be any conventional electronic payment card, or may be a microchip-embedded smart card, in which case additional data selected from the consumer database 200 may be included for access by retailers verifying prize information.

Referring again to FIGS. 2, 3 and 8, the apparatus and method that permits a consumer's participation in the host system is described in more detail. In order to participate in the system, the consumer logs on to the consumer computer 12, which may be any "client" computer in a client/server system. The consumer computer 12 includes the CPU 20, ROM 22, I/O interface 28, I/O Device 24, RAM 40, modem 54, and storage device 45. The consumer computer 12 further includes the operating system 42, which controls the applications running on the consumer computer 12, such as the data management, storage and retrieval application 44, the web browser 50, the communications application 52 and the other applications. The consumer computer 12 is preferably equipped with a graphical user interface, permitting the user to click on icons, buttons, highlighted text, or the like in order to initiate functions. References in this application to "icons," "buttons" or "links" should be understood to include any mechanism that permits the user to initiate a function by locating the cursor at an associated screen location and clicking a mouse, striking the "ENTER" key, or otherwise selecting the function. Thus, the operating system 42 is preferably an operating system capable of supporting such an interface, such as WINDOWS 95, UNIX or the MacIntosh. The consumer computer 12 is connected by the modem 54 to the telecommunications connection 38 of a network, which may be the Internet, an intranet, or any other computer network. The consumer computer 12 may, in an alternative embodiment, constitute a dedicated terminal, such as an ATM or kiosk, that is capable of inputting of data and connecting to the consumer site 192. References to the Internet in this application should be understood to cover embodiments of the invention using any computer network.

In order to participate, the consumer logs onto the consumer computer 12 and initiates the web browser 50, which may be any conventional browser, such as NetScape Navigator, Microsoft Explorer, or the like. Due to the graphical nature of many incentive program games, the browser is preferably one that supports a graphical user interface.

The browser 50 permits the consumer computer 12 to connect to the host gateway 19 over the telecommunications connection 38. Thus, the consumer may locate the consumer site 192 by entering the URL for the consumer site 192 in the browser 50. The browser then transmits a message, in the form of a package of data according to a network protocol, such as the HTTP protocol or the FTP protocol, to the host computer 18. The host gateway 19 of the host computer 18 is capable of receiving messages according to the HTTP protocol. Thus the host gateway 19 may be an HTTP server. The host computer 18 may be an HTTP server, or may be another server linked to an HTTP server. The host computer 18 may thus be any conventional server, such as DEC server with a UNIX operating system. The host computer 18 and the browser 50 permit communication between the computers in the form of data transmitted according to the HTTP protocol (or other conventional protocol). Data may be transmitted in various forms. One important form of transfer is pages of data coded in the HyperText Mark-up Language ("HTML"). HTML is the language used to prepare hypertext documents for distribution on the World Wide Web for viewing by client computers, such as the consumer computer 12. HTML contains commands, known as "elements" or "tags", to mark text as headings, paragraphs, lists, quotations, and the like. HTML also has tags for including images within documents, for including fill-in forms that accept user input, and for including hypertext links connecting documents being viewed to other HTML documents or other resources on the web, such as databases or FTP sites. The hypertext link feature allows the user to click on a string of highlighted text and access a new document, an image, a film clip or other resource from a computer located at a remote location. HTML specifies the location of other resources through URL's, which instruct a browser to find the designated resources. Conventional web browsers 50 are all equipped with the capability of reading and executing hypertext links coded in HTML documents.

Referring to FIG. 8, the consumer links to the consumer site by entering the URL for the consumer home page 193 into the consumer's browser 50. The consumer site 192 consists of a set of pages coded in the HTML language. The browser interprets and displays graphical and text images from the HTML pages on the consumer's personal computer. The pages are linked by hypertext links so that pointing and clicking on the hypertext link in the consumer home page 193 connects the client to a page associated with the hypertext link, so that the computer displays a new HTML page to the consumer. Thus, each of the functions accomplished in the flow chart 300 of FIG. 8 may be selected by initiating a hypertext link, button, or graphical icon that describes the link. For example, a consumer may choose to search by clicking a button labeled "search", or a line of highlighted text with the word "search." Similarly, the consumer may execute the step 312 of linking to an incentive program by clicking on the text string describing the incentive program. When the consumer logs on to the consumer home page 193, the consumer is initially prompted to enter the consumer's name. This may be accomplished by displaying an HTML page that includes a table on which the consumer's name is entered through the input/output device of the client computer. A JAVA applet or application may also provide this function. Once the consumer presses "Enter" or "submit" to execute the entering of the name, the program calls a program that searches the consumer database 200 for the consumer's name.

While HTML is suitable for preparing documents to be reviewed by the client computer and for accepting user input, such as the consumer's name, additional software is necessary or desirable in order to process information entered through the HTML page. Interactive HTML-based applications are typically prepared through use of a program according to the common gateway interface "CGI" specification, or a "CGI script." The CGI specification defines the mechanisms by which HTTP servers communicate with gateway programs. Gateway programs such as CGI scripts essentially transfer processing of data that is inputted through HTML documents to application programs running at a particular site. These application programs typically include specific functionality that is not easily incorporated into a universal server, such as an HTTP server, although application programs can be run on the HTTP server itself. Thus, when an application program is required to process data entered through the HTML page, it is typically done through a gateway program such as a CGI script. For example, when the user name is entered in the step 308 of the flow chart 300 of FIG. 8, the HTTP server calls a CGI script which instructs an application program to search the consumer database 200 to determine whether the consumer is listed in the database.

Consumer database 200 searching is accomplished through any common search application, which may be included within the database program used to build the consumer database 200. For example, the consumer database 200 may be an Oracle database with an Oracle application which permits searching of the Oracle databases. If at the step 309 the name is found in the consumer database 200, then the HTTP server is instructed by the application program to display an HTML page that prompts the user to input the user's password at the step 311. If the user's name is not found on the consumer database 200 at the step 309, then the HTTP server causes the system to display an HTML page that queries whether the consumer wishes to register as a member of the host system in a step 306. The HTML page includes a "yes" button and a "no" button, or similar ability to respond in the affirmative or negative to the query. Such buttons may be graphical objects coded by an application suitable for running in a web page, such as a Java applet. When the user responds with a "no", the HTTP server displays an HTML message that indicates that registration is required in order to participate in the site, and the user is logged out of the site at a step 320.

If the user indicates the desire to register, then the HTTP server displays an HTML page that may include a table format for input of data by the consumer necessary for registration. Upon registration via the inputted data on the HTML page, the HTTP server calls a CGI script which calls an application program to update the consumer database 200 to add the consumer to the consumer database 200 and to add records in the database that reflect the data entered through the HTML page at registration step. Once the consumer has entered a name and password, or a new consumer has registered, the consumer is sent to step 304 of FIG. 8. The step 304 of viewing a directory is accomplished by the HTTP server of the host computer 18 displaying an HTML page that displays various icons that permit the user to select available options. Thus, the steps 310, 312, 314, 316 and 318 may be selected by clicking a hypertext link that is associated with a string of text or icon that reflects the desired step.

Upon registration, the information entered by the consumer is stored in the consumer database 200 for retrieval and updating, and the information is also sent, by conventional means, such as electronic mail, file transfer protocol or the like, to a provider of electronic cards. The electronic card provider then issues a card 11 containing the identification of the consumer that is associated with the password assigned to the consumer by an application program that is called by the CGI script upon completion of the registration process. It should be noted that the application program may be an application in any programming language, such as C++ initiated by CGI script, or may be a program such as a Java applet, designed to run within a web page. The application code for the registration process may also register the user for a global pool of incentive programs stored on the sponsor database 202 and record the consumer's participation in the global incentive program pool. It should be noted that the incentive programs that are built or purchased through the sponsor system as described elsewhere herein are coded to permit a consumer to enter an incentive program at a different site without requiring additional registration or additional entering of a name or password. That is, the registration routine of the incentive program running on a sponsor's site automatically initiates, by a CGI script or similar application, a query to the consumer database 200 to confirm that the user is a registered consumer. Upon receiving confirmation that the user is a consumer of the host system, the application program automatically registers the consumer for the incentive program, avoiding unnecessary multiple registrations for different incentive programs by the same consumer. Alternatively, the consumer may initially register at a particular sponsor's site, in which case registration is effective for all sites, because the registration routine automatically updates the consumer database 200.

Referring still to FIG. 8, the step 310 of searching the sponsor database 202 for incentive programs by topic or by keyword may be accomplished by initiating a hypertext link designated as "search" or the like that appears as a graphical icon or button on the Consumer Home Page. Selecting the "search" function initiates a link to the HTTP server 188, at which time a gateway program, which may be programmed according to the common gateway interface (CGI) specification, via a CGI script, turns over processing to an application program running on the server for conducting a search. The application program is a conventional search engine, such as those available on the World Wide Web. The search engine permits the user to search the sponsor database 202 for incentive programs by company, type of prize, type of incentive program or other parameters of the user's choosing.

A directory of sites appears in graphical format on the consumer home page 193, in the form of hypertext links to selected sites that have Incentive program games. Sites include sites of sponsor members of the host system, as well as third party sites. The directory may be an HTML page, with the links listed as unordered list elements within the page, and with each element of the list comprising a hypertext link identifying the URL to a site associated with the link. Thus, a string of text describing or naming a particular incentive program may be included within a hypertext link coded in HTML, so that clicking on the description or name causes the HTTP server 188 of the host computer 18 to call the site associated with the URL. The directory can also consist of a series of linked HTML pages in menu format, so that the consumer can select categories, such as types of prizes, types of incentive programs, directory topic, such as industry, or specific sponsoring companies, by clicking on associated strings of text or icons that cause the HTTP server to display other HTML pages that display further menu items, down to the level of the individual incentive program. The incentive programs displayed on the consumer site 192 are automatically updated by application programs that update the sponsor database 202 to reflect new Incentive programs and changes in Incentive program offerings.

Incentive programs other than host incentive programs may consist of application programs of any type such as computer games and may be accessed through a gateway program, such as a CGI script. A consumer would typically return to the consumer site 192 after participating in such an incentive program by using the "Back" function of a browser.

The consumer site may include graphical icons, buttons, and highlighted text strings that permit the user to select current incentive programs of the host, which are designated as host incentive programs by any convenient means, such as association with an asterisk or formatting as "<STRONG>" elements within HTML. The icons may be HTML hypertext links or may be programmed through the use of embedded programs that can run inside World Wide Web pages, such as Java applets. Selection of the icon initiates a link that causes the server to display a new HTML page for the relevant incentive program. The relevant incentive program may be programmed in any language suitable for building incentive programs, such as Java, C++, or the like. A CGI Script may be used as a gateway to connect to the application program for the incentive program. Host incentive programs may be of a wide variety of types, but have common characteristics of defining "win-eligible" activities for the user and being capable of transmitting the message that a consumer has won a particular incentive program. Win-eligible activities are coded in the application program of the incentive program, so that predetermined user input results in a win or loss for the consumer. Various implementations may exist to reflect the underlying algorithm to determine a win or loss. For example, a scratch-and-win game may be coded so that a prize is displayed if the user clicks on the correct icon, or a message to try again is displayed if the user selects another icon. Any host incentive program is required to include, as part of the program, an algorithm that instructs the HTTP server to send a message to the consumer database 200 that updates the consumer database 200 to reflect that the consumer has won that incentive program.

In order to participate in an incentive program, the consumer simply selects the incentive program by searching or by initiating the hypertext link associated with the incentive program on the directory on the consumer site 192. The incentive program resides on the incentive program developer's server and may be an application program in any of a variety of programming languages, such as C++ or Java.

The link to the application program may be accomplished by a gateway program, such as a CGI script. Participation in the incentive program may include entering information, clicking on predetermined icons in a predetermined order, or simply visiting a site. A variety of incentive programs are known, such as conventional "scratch-and-win," "treasure hunt," sweepstakes," "tic-tac-toe" and the like.

Consumers may also choose, in the step 314, to obtain information about their status by initiating a link entitled "Query," or the like, which may be an icon programmed by a Java applet, a hypertext link, or similar application capable of running within a web page. Upon the consumer's initiating a query, the HTTP server displays a new HTML page that includes a table of defined search fields that can be completed by the consumer, such as name, password, incentive program status, and the like. Upon completion of desired search fields, the initiation of the query calls a gateway application, such as a CGI script, which runs an application program that searches the consumer database 200, retrieves the information in response to the searched fields, and displays a new HTML page reflecting the updated information. For example, the consumer may wish to know the number of points achieved in a loyalty program of a particular sponsoring company or sponsor between two dates. The table would permit entry of two dates and the name of the sponsoring company, and the application program would search the consumer database 200 for points awarded to the identified Consumer between the designated dates. The search program and database may be implemented by any conventional database program, preferably a program capable of dynamic data structures, such as an Oracle database program. The system would then display a new HTML page with the searched information in a predetermined graphical format.

At the consumer site 192, the consumer may also link to various information through hypertext links that appear as graphical icons or highlighted text, as reflected by the step 316 of FIG. 8. The information may be contained in HTML pages and may include information about the host system, information about membership, information about the rules for various incentive programs, and the like. If the consumer wishes to become a sponsor, the consumer may link, at the step 318, to the sponsor site 194.

Referring still to FIG. 8, the step 310 of searching the sponsor database 202 for incentive programs by topic or by keyword may be accomplished by initiating a hypertext link designated as "search" or the like that appears as a graphical icon or button on the Consumer Home Page. Selecting the "search" function initiates a link to the HTTP server 188, at which time a gateway program, which may be programmed according to the common gateway interface (CGI) specification, via a CGI script, turns over processing to an application program running on the server for conducting a search. The application program is a conventional search engine, such as those available on the World Wide Web. The search engine permits the user to search the sponsor database 202 for incentive programs by company, type of prize, type of incentive program or other parameters of the user's choosing.

Incentive programs other than host incentive programs may consist of application programs of any type and may be accessed through a gateway program, such as a CGI script. A consumer would typically return to the consumer site 192 after participating in such an incentive program by using the "Back" function of a browser.

A more detailed description of the participation of a sponsor in the method and system of the present invention may be accomplished by reference to FIGS. 2, 9, 10, and 11. Referring to FIG. 4, the sponsor computer includes the CPU 58, ROM 60, I/O device 62, I/O interface 64, RAM 68, bus 63, data storage device 75, and modem 90. As with the consumer computer 12, the sponsor computer 14 further includes the operating system 42, which controls the applications running on the consumer computer 12, such as the data management, storage and retrieval application 44, the web browser 50, the communications application 52 and the other applications. The sponsor computer 14 is preferably equipped with a graphical user interface, permitting the user to click on icons, buttons, highlighted text, or the like in order to initiate functions. Thus, the operating system 42 is preferably an operating system capable of supporting such an interface, such as WINDOWS 95, or the MacIntosh. The sponsor computer 14 is connected by the modem 90 to the telecommunications connection 38 of a network, which may be the Internet, an intranet, or any other computer network.

Referring to FIG. 2, the sponsor site 194 is preferably a site located on the World Wide Web. Thus, as is the consumer site, the sponsor site 194 is located as a series of files stored on the HTTP server 188 of the host computer 18. The sponsor home page 195 is an HTML document stored on the server 188, which is linked to a network, preferably the Internet. The sponsor home page 195 maybe reached by message packets from a browser of the sponsor computer 14, a hypertext link from consumer home page 193 or other web site, or on-line connection from dedicated terminal, such as kiosk or ATM. The message may be sent according to standard protocols, such as FTP or HTTP protocols.

The sponsor home page 195 displays an HTML page that graphically displays a list or directory of hypertext links, graphical icons, or buttons that represent actions that can be taken or that consist of links to other web pages containing information of the type indicated by the links. The sponsor site 194 may include a series of HTML pages linked by hypertext links in a menu format, so that clicking on a link associated with particular subject matter causes the HTTP server to display HTML pages that have further information or links regarding that subject matter.

Referring to FIG. 9, upon entering the site, sponsors are prompted to enter a name in an HTML page at the step 334. The HTML page then calls a gateway program, such as a CGI script, to call a database program, such as an Oracle database program, to search the sponsor database 202 for the sponsor's name at the step 336. If the name is found, then the HTTP server is instructed by the application program to display an HTML page prompting the sponsor to enter the sponsor's password at the step 337. Upon entry of the correct password, the user is transmitted to the step 339 at which the sponsor may view a directory of options in the form of an HTML page. If the sponsor's name is not found at the step 336 in the sponsor database 202, then the HTTP server 188 is instructed by the application program to display an HTML page querying the sponsor at a step 338 whether the sponsor wishes to register and providing "yes" and "no" icons or buttons permitting the sponsor to answer in the affirmative or negative. If the sponsor indicates "no" by clicking on the appropriate icon, then the HTTP server 188 is instructed to display an HTML page containing a message informing the sponsor that registration is required and to transfer the sponsor to the log-out step 356.

If, at the step 338, the sponsor wishes to register and indicates so by clicking the "yes" icon as similar indication of assent, the HTTP server calls an application program via a CGI script or similar gateway program that displays an HTML page, Java applet, or the like containing a table for input of data necessary for incentive program, such as sponsor name, the contact person, the addresses of existing sites desired to be listed, descriptions of the sites, description of incentive program, awards, and other information relating to the incentive program. Completion of the table initiates an application program, such as a Java applet or HTML document, that updates the sponsor home page to include any listed incentive programs among those listed in the site and to place a hypertext link to the incentive program on the sponsor home page. Completion of the table also initiates an application program, such as an Oracle program, to update the sponsor database 202, which may be an Oracle database, to reflect the information provided by the sponsor.

In an alternative embodiment, the sponsor may also register by completing a table generated by an application program supplied on a disk or on-line, in which case the information may be downloaded to a disk and sent by electronic mail to the host computer 18 for manual input of the information necessary to list the incentive program in the sponsor home page.

Once a sponsor has entered the sponsor's password at the step 337, or a sponsor has registered at the step 341 of FIG. 9, the sponsor may select various options that are associated with icons or buttons, which may be hypertext links or Java applets, or displayed as an HTML page, at the step 339. The sponsor may choose, at the step 342, to launch an incentive program by clicking on a link associated with the option to launch an incentive program, which causes the HTTP server 188 to display a new HTML page containing text that offers the sponsor the choice, in the form of additional hypertext links, graphical icons, or buttons to view samples of prepackaged incentive programs, to buy a prepackaged incentive program, or to build an incentive program using the host system's incentive program building application. These choices may be initiated by clicking on the icon or link associated with the choice and are reflected in steps 344, 348 and 352 of FIG. 9. The icon or link may be coded by a JAVA applet or similar application running within a web page.

If the sponsor elects to view samples of an incentive program by selecting the appropriate icon in the step 343, the HTTP server 188 displays an HTML page that lists a menu of types of available sample incentive programs in the form of hypertext links. Clicking the hypertext link for a sample causes the HTTP server to access samples. Samples may be displayed in the form of HTML pages. Interactive samples may be programmed in the form of Java applets or application programs that are accessed through a gateway application, such as a CGI script. Upon completion of viewing, the sponsor is returned to the step 339 and may select other options from the directory.

If the sponsor wishes to buy a prepackaged incentive program, the sponsor may initiating a link that causes the HTTP server 188 of the host computer 18 to display an HTML page, Java applet, or the like that includes icons, buttons or links associated with each incentive program. Upon selecting an incentive program, a hypertext link is initiated that calls an HTML page that provides a table for completion by the user through the keyboard or mouse. The user is asked to complete the table by defining various predetermined parameters that depend on the incentive program. Parameters may include start date, eligibility parameters, duration of the incentive program, and the like. Once an incentive program is selected by clicking on an icon, button, or the like, which may be programmed by a Java applet or similar method, the sponsor is prompted to pay for the incentive program by credit card or electronic funds transfer. Once payment is confirmed, an application program sends a file containing the incentive program by electronic mail to the sponsor, who can then download the incentive program at the sponsor's site. The application program may also be used to update the sponsor database 202 to reflect the new incentive program via the HTTP server 188. The application program also updates the sponsor home page 195 at the sponsor site 194 to list the incentive program and to provide a link to the URL for the incentive program.

The incentive programs are prepackaged application programs, typically written in languages suitable for conventional, graphics-based, on-line computer games, such as Java or C++. Incentive programs may be any type of program that results in a "winning" activity. Typical incentive programs include scratch-and-win, sweepstakes, treasure hunt, instant win, and loyalty programs. Incentive programs may include question and answer formats, such as trivia games, or may involve completion of a survey. Incentive programs may also include proprietary computer games, such as TETRIS, pinball, or the like. Any computer program that results in a successful outcome can serve as an incentive program, as long as the program is capable of generating a "win" statement after successful completion of a predefined activity. In addition, prepackaged incentive programs may be customized by permitting the sponsor to select from a menu of available icons; for example, a scratch-and-win incentive program may include the logo or trademark of a company, including the sponsor company, which permits an advertising function directly within the incentive program. The logo may be downloaded by the sponsor to a disk and sent to the host computer 18 by electronic mail, in which case the operator of the host computer 18 may insert the logo as a graphical image file, such as a JPEG or GIF image, into the code for the incentive program via a standard routine, such as a C or C++ image insertion routine. Alternatively, the sponsor may select a logo from a menu generated by the incentive program application. It is also possible to include JPEG or GIF images or logos to replace parts of the graphics of third party computer games for inclusion in incentive programs. Images may also be rotated periodically via an image server, so that different images appear in the same graphical portions from time to time. Incentive programs may also be computer games licensed from third party game providers. The incentive programs are preferably designed to obtain and hold close attention of the consumer to the information on the screen.

If the sponsor chooses, at the step 339 of FIG. 9, to build an incentive program by clicking the appropriate icon, the HTTP server 188 of the host computer 18 displays an HTML page in which the sponsor is prompted to input parameters for the incentive program, which may be accomplished by data entry in an HTML table format, or may be accomplished through a Java applet or Java application. Sponsors may select from a menu of different incentive program types by clicking on icons associated with the incentive programs. Types of incentive programs are predetermined by the operator of the host system. As with prepackaged incentive programs, the incentive programs that are build by the host system may be of any type, ranging from computer games, such as TETRIS and pinball, to question and answer or trivia games, to surveys, to scratch-and-win, treasure hunt, sweepstakes, customer loyalty programs and other typical incentive programs. Combinations of different types of incentive programs may be selected; for example, an incentive program may be built in which the consumer plays a pinball game in which the consumer is eligible to win customer loyalty points, and upon winning enough points, the consumer is eligible for a sweepstakes prize. Alternatively, a consumer could complete a survey in order to become eligible to play a scratch-and-win game.

Once sponsors select the incentive program type or combination of types, by initiating Java applets or link for each type or types, the HTTP server 188 may cause the host computer 18 to display HTML pages that prompt the sponsor to enter, in table format, the parameters for the incentive program. The tables may be generated as HTML pages, with each incentive program or combination or incentive programs being associated with a different HTML page that displays a table requesting information relating to predefined parameters that are necessary to generate the incentive program. For example, if the sponsor selects a sweepstakes incentive program, the sponsor is prompted to indicate the number of winners, and the frequency of winning. Once the parameters are entered at the step 382 of FIG. 11, the HTTP server 188 updates the sponsor database 202 via a gateway program, such as a CGI script, to a database application program, such as an Oracle database program, to reflect the presence of the new incentive program. The HTTP server 188 also updates the sponsor home page by providing a new hypertext link or icon permitting the consumer to link to the incentive program.

The parameters that may be selected by the sponsor can be categorized by a number of different characteristics, as more particularly set forth on the table of FIG. 20. Incentive programs may be divided into a number of different classifications, which can be associated with pull-down menus, icons, tables or other formats for selection or data input by the sponsor building the incentive program. Thus, the sponsor may select the general type of incentive program, which may be within the sponsor's firm or outside the sponsor's firm. Inside the firm, employees are typically rewarded for certain actions by winning prizes or points. Outside the firm, consumers typically earn rewards or win or earn awards or prizes by playing games of chance or games of skill. The sponsor can select the target of the incentive program, which can, for example, be employees, suppliers, or customers of the sponsor. The sponsor can select from a set of common descriptions of incentive programs from a list including employee morale programs, promotions, incentive programs, sweepstakes, giveways, games, and coupons. The sponsor can select from a selection of descriptive types of incentive programs, such as online testing, attendance monitoring, games of skill, such as trivia, games of chance (submit to win), and customer services (surveys, questionnaires, and the like). Games of skill are embodied by an algorithm that determines whether a "win" has occurred based on the play of the game by the consumer. Games of chance are typically embodied by algorithms that determine, based on a random number generator or similar algorithm, whether the consumer has won before the consumer plays. The sponsor can select whether the incentive program is short-term, such as with an instant win incentive program, or long-term, such as in a sweepstakes, performance reward program, employee loyalty program, or customer loyalty program. The sponsor can select from a wide variety of visual or graphical implementations for incentive programs, including, without limitation buttons, hypertext links, banners, scratch-and-win games, puzzles, pinball, text games, and other text and graphics. Any text or graphical element that can appear in a computer game or text screen could be implemented as part of the selected graphics of an incentive program. The graphical or text implementation objects can also constitute individual incentive programs themselves. Single incentive program types can also be combined to build larger, combined incentive programs. The sponsor can also define other "win-eligible" activities, such as clicking the URL for the sponsor's site, spending a certain amount of time on a particular web page, or the like. Finally, the sponsor can select from a wide variety of prize types, including merchandise, cash, services, discounts, coupons, and points (such as loyalty points). The host embodies the choices in each of the above areas, as well as any other classifications, as parameters that can be selected by the sponsor who is interacting with the incentive builder program; thus, by interacting with a simple graphical user interface, the sponsor can easily build an incentive program having the desired visual effects and having code associated with those effect to execute a running incentive program of the type represented by the visual effects. Once the sponsor has selected all parameters, the incentive builder program can build the incentive program that satisfies all of the parameters, by combining preexisting code for each of the individual components into larger files that embody the entire incentive program.

Referring to FIG. 11, at the step 384 the HTTP server 188 of the host computer 18 also initializes an application program that builds the underlying code for the incentive program. The application program may be programmed in a language for building incentive programs, such as C++. The application program inserts algorithms and generates code to create an incentive program satisfying the parameters entered by the sponsor. The code is a series of statements, such as C++ statements, each statement reflecting the implementation of one of the incentive program parameters defined by the sponsor. For example, a sweepstakes incentive program would include, as a step in the generated code, the generation of a random number, as well as the selection of a winner based on the random number. Once the incentive program is complete, the sponsor may pay for the incentive program by electronic funds transfer, credit card, or the like. Once the payment is confirmed, a file containing the code for the incentive program is transmitted, in the step 388, to the sponsor for downloading on the sponsor's site, whether by electronic mail, an HTTP link, or similar conventional transmission. As with the prepackaged incentive programs bought by the sponsor, the incentive program must be capable of generating a signal indicating that a consumer has won. The "win" signal calls an application program that updates the consumer database 200 to reflect that the consumer has won the prize associated with the incentive program and the application program updates the sponsor database 202 to reflect that the prize associated with the incentive program has been won by the customer. An HTML page is generated for the individual consumer indicating whether a win or loss has occurred and, in the case of a win, identifying the prize and fulfillment option.

The incentive program builder could also be implemented as standalone software, with a front end menu similar to the HTML pages described above for selecting an incentive program or combination of incentive programs, so that the program, which may be a C++ program or similar program, builds code based on the predetermined parameters of the incentive program. Code could then be downloaded into files containing complete incentive programs for installation on a user's site, or stored on the sponsor database of the host system, where upon action by the consumer, a CGI call may be made to the sponsor database to verify parameters and constraints to determine whether a win has occurred.

Additional details regarding an embodiment of the incentive program builder are as follows. The incentive program builder permits the sponsoring company to quickly and efficiently design incentive programs. The incentive program builder is a computer automation tool. The incentive program builder may be provided either as a set of interactive web pages, on the host server, by which a sponsoring company defines an incentive program by going from page to page, or as a stand-alone software application, with menu fields and a substantially empty field where incentive program pieces and objects are placed as the incentive program is built. The incentive program builder may include a graphical user interface through which the sponsor designs the incentive program.

Designing an incentive program entails specifying parameters for the incentive program. When all parameters for the incentive program are specified, the incentive program builder creates a set of files that embody the incentive program. An incentive program in the network embodiment consists of a number of different components, each of which is built by the incentive program builder. First, a series of pages, such as HTML pages, permit the consumer to view the graphics of the incentive program. The HTML pages permit dynamic actions to appear to the consumer. Thus, by flashing a series of HTML pages to the consumer, the appearance of motion can be created. For example, a series of pages depicting a pinball machine can be displayed, with the moving parts of the pinball machine and the pinball itself being positioned slightly differently in each page, creating a sense of dynamic motion as pages are sequentially displayed. This approach is the same as in any conventional Internet computer game that includes moving graphical images. The images are created through a series of GIF or JPG files that are displayed when called by the application program for the incentive program. In addition to including dynamic graphical images, the HTML pages of the incentive program that are viewed by the consumer can include static graphical images, text, and fields for completion of tables, or surveys. That is, the graphical interface for the end consumer can contain any combination of text and images typical of any computer game or incentive program.

An incentive program also includes records in the consumer database 200 and the sponsor database 202. Thus, for each incentive program, information identifying the incentive program, the beginning date of the incentive program, the ending date of the incentive program, and any other information regarding the incentive program may be stored in the appropriate database. The information regarding the incentive program is automatically sent to the appropriate databases upon initial building of an incentive program. In addition, the incentive programs are designed to send a message to update the appropriate databases when an incentive program is played; that is, when the consumer interacts with the front end pieces that appear on the HTML page of the incentive program.

The graphics or text representations of the incentive program may include front end pieces, or objects, that are graphical representations of the objects that are part of the incentive program. Front end objects could include graphics for a scratch-and-win game, a table for completion of a survey, a submit button for entry into a sweepstakes, or the like. By clicking on the appropriate front end pieces, the user can play the game, complete the survey, or otherwise participate in the incentive program that appears on the HTML pages. The sponsor, in using these incentive program builders, can create the graphical objects by clicking and dragging from menus and placing objects in the empty space of the screen.

The front end graphical objects of the incentive program are connected to code. Code, which may be JAVA, CGI script, or other code suitable for running on a web page, defines the function of a given object. For example, the suitable code makes the clicking of a pointer on a particular scratch-and-win game look like the consumer is actually scratching a surface. In addition to programming the appropriate display of HTML pages to reflect dynamic interaction with the incentive program, the code permits instructions to the databases for updating. In a sweepstakes game, for example, clicking the submit button may result in a graphical movement of the submit button that is created by presenting a new HTML page with a slightly different location for the submit button; menu or like, underlying code sends a message to the databases that a consumer has entered the sweepstakes. The code also determines algorithms for determining the winner of an incentive program; that is, the code sends a "win" statement to the databases which leads to the association of the prize or prizes for that incentive program with the consumer's identification in the consumer database 200.

To define an incentive program, the sponsor interacts with the user interface of the incentive program builder. In an embodiment of the invention, the user interface includes a substantially blank screen with a series of buttons or pull down menus that permit the user to build the incentive program. By clicking on the appropriate button or selecting the appropriate item from the menus, the user can define the characteristics of a particular incentive program and click and drag objects to desired places on the screen. When the sponsor has elected to build an incentive program, the incentive program is assigned a unique numeric identification code, which permits retrieval of all information relevant to the incentive program from the databases. Next, the sponsor is permitted to select appropriate objects for participation in the incentive program. The selection of the objects can be made by pull down menus, buttons, or the like. Upon selection of a particular object, a graphical representation of the object is displayed on the formerly substantially blank portion of the screen. Thus, if the sponsor selects a scratch-and-win implementation of an incentive program, the program will display a graphical scratch-and-win game on the screen. The promoter is then able to select by buttons or menus various aspects of the incentive program; for example, the user can select the appropriate icons for the scratch-and-win game, including corporate logos of the user or other companies that provide an advertising function. Similarly, if the sponsor wishes to provide a survey, then selection of a survey type of incentive program from the menu results in a survey table appearing in the substantially blank portion of the screen, and the sponsor is prompted to enter questions to be completed in the survey in the appropriate fields. Once the questions are submitted through the sponsor's input/output device, the questions appear on the screen as they will appear to the consumer.

The objects that the sponsor can select can be of any type, including objects coded by the host, or objects obtained from third parties, such as proprietary computer games. Thus, the user may select a proprietary game, such as TETRIS, or pinball, which would result in the graphical representations of that game appearing in the substantially blank portion of that screen. The graphical representations that appear on the screen are automatically associated with the appropriate code in the case of any objects with which the consumer is expected to interact in playing the incentive program. Thus, in the scratch-and-win example, not only does the graphical representation of a scratch-and-win game appear on the formerly blank portion of the screen, a file is created in which the code for implementing the scratch-and-win game is associated with the graphical representation and the incentive program's unique ID number.

A sponsor can build any combination of incentive programs by including various graphical representations, or objects, on the screen. The sponsor is also permitted to design combinations of incentive programs, so that, for example, successful completion of a given incentive program results in eligibility to participate in another incentive program. The sponsor is also asked to define the beginning and ending dates of the incentive program, so that a single incentive program can be offered in different series of time periods, such as once per month. Many different variations of incentive programs can be envisioned, such as programs in which completion of a questionnaire in each of a series of months results in eligibility for a prize drawing for each month, as well as a grand prize for those who enter an incentive program in all three different months. Other examples would include completion of surveys, successful answering of questionnaires, successful completion of computer games, and any other type of activity that results in a "win" for the consumer.

Any incentive program may be provided, as long as some algorithm for determining a winner is available. Thus, a sweepstakes-style incentive program accumulate entries over a defined period of time and award prizes according to a probability algorithm that relies on a random number generator. Alternatively, incentive programs may be customer loyalty programs in which consumers accumulate points for performing certain actions, and the accumulation of a defined number of points permits eligibility for a prize. Obviously, incentive programs may be combinations of types; thus, successful completion of a customer loyalty program might render a consumer eligible for a sweepstakes prize, or victory in a sweepstakes might provide customer loyalty points for a prize. Incentive programs may also be parallel, in that victory in a sweepstakes might provide an immediate prize, as well as points in a customer loyalty incentive program.

The algorithms for determining successful participation in a program are conventional algorithms such as those in any computer game. These predetermined algorithms are associated with the graphical objects with which the user interacts in playing the incentive program. Thus, by clicking a menu or filling out a table identifying the parameters of the incentive program, and submitting those parameters, the sponsor instructs the incentive program builder to display the type of incentive program that has been selected on the screen and to associate the appropriate code with those programs.

The programs for a given incentive program are also associated with incentive program rules, which define eligibility for participation in the program. For example, an algorithm would provide a requirement that the consumer enters the consumer's age, if the incentive program is offered by a sponsor who can only provide incentive programs to those over a certain age. Any other eligibility rules can be entered by the sponsor in defining the eligibility requirements. The incentive program builder also includes a verification algorithm that determines whether data entered for eligibility requirements by the consumer satisfy the incentive program rules. Thus, the incentive program would include code to display a table in which the user must complete the user's age, and the verification algorithm would automatically be initiated upon entry into the incentive program by the consumer to determine eligibility according to the incentive program rules that are embodied in the algorithms created upon building the incentive program.

The winning rules are also embodied in algorithms that are stored in connection with the incentive programs. Thus, upon completion of an incentive program, a file is created that includes the graphical images that the consumer will see upon playing the incentive program, rules for eligibility for the incentive program, a verification algorithm for determining that the eligibility requirements have been satisfied, algorithms for determining whether the consumer has successfully completed the incentive program, and algorithms for controlling the objects that appear to the user and for updating the various databases to reflect creation of a new incentive program and successful completion of an incentive program. The incentive program builder thus permits the sponsor either through stand alone software or through a series of web pages to select through menus from a library of available incentive program objects, and to build a graphical representation of a incentive program, which is then automatically associated with code that creates the dynamic incentive program.

Figure 19:
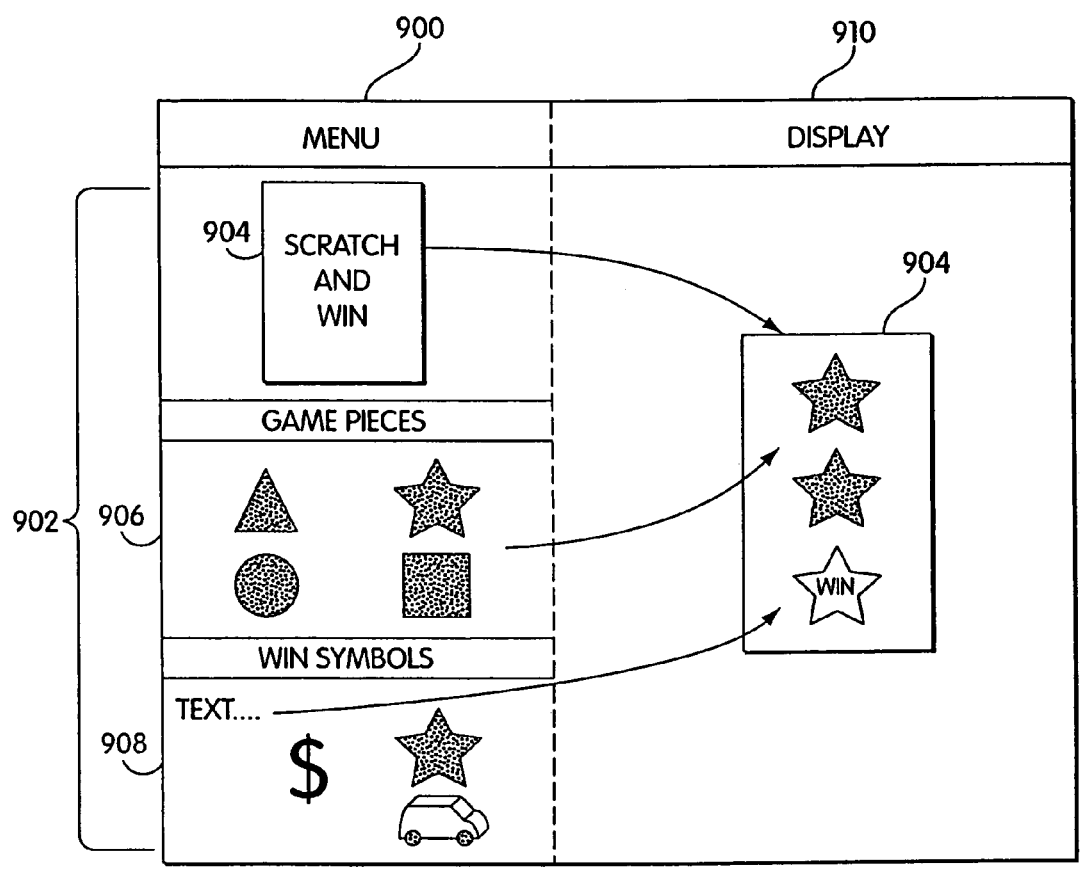
FIG. 19 is a diagram depicting a page displayed by the graphical user interface of the incentive program builder of the present invention.

Referring to FIG. 19, an example of a graphical display of an HTML page from an incentive program builder is depicted. Thus, in a menu 900, the sponsor may click and drag various objects 902. The object could include a background field 904 for a scratch-and-win game, as well as various game pieces 906 and win symbols 908 that can be placed in the game by clicking and dragging on the icons that represent the objects. When an object is clicked or dragged, the object may appear in a display field 910. Thus, a user may select the object 904 for a scratch and win game, select a game piece 906 from the menu, and add the game where desired on the background field 904. The user may similarly select a win symbol 908, which may be text stating "WIN," or may be any other symbol. The game pieces and win symbols, as well as the background, may be or may include graphical branded images, such as trademarks and logos. When the win symbol and the game pieces are in place, the game can be saved, in which case the system generates the necessary code to run a scratch and win game that has the appearance of the game on the display 910.

In an embodiment of the invention the files for an incentive program are stored as conventional graphics and computer code files. In an alternative embodiment of the invention the files that are created upon building an incentive program may be embodied in the form of two different sets of computer code. Thus, an interpreter, typically written in a language such as C, creates a series of numeric tables, with each numeric table representing a logical element of computer code. Thus, the number "77" in a table could represent a logical "if" statement, and a number associated with that number could represent an action to be taken if the "if" statement is true and a different number could be associated with the case in which the "if" statement is false. Thus, any of the logical operators, such as "plus", "minus", "greater-than", "less-than", "not-equal-to", "equal to" or other logical operaters can be represented by numbers. An interpreter program thus permits the logical elements of a computer program, such as if statements, sub-routines, "do while" statements, "while" statements, and the like, to be represented as a table of numbers, where entry of a particular number can connect to other rows or columns of the table with further logical statements. Thus, an entire logical computer program may be reflected in a table of appropriately interconnected numbers.

In addition to an interpreter program which builds tables that reflect logical statements, an executor program may be prepared that executes the underlying computer program by reference to the tables. The combination of the interpreter program and the executor program permits entire incentive programs to be reflected in the numerical tables which can be run as computer programs through object code of the executor program. Thus, incentive programs that are provided as files to sponsor companies may remain proprietary to the host who developed the incentive program; that is, while the sponsor company may run the particular incentive program, the sponsor company does not have access to the code for the underlying incentive program, except in table format, which requires substantial knowledge about the interpreter program so that the incentive program is not easily be copied. The combination of the interpreter program and the executor program is essentially a new computer language for building incentive programs.

Referring again to FIGS. 2, 5 and 13, the apparatus and method that permits a retailer's participation in the host system is described in more detail. In order to participate in the system, the retailer logs on to the retailer computer 16, which may be any "client" computer in a client/server system. The retailer computer 16 may include the typical components of a client computer, as depicted in FIG. 5, including the CPU 92, ROM 94, I/O interface 100, I/O Device 98, RAM 102, modem 124, and storage device 109. The retailer computer 16 further includes the operating system 42, which controls the applications running on the retailer computer 16, such as the data management, storage and retrieval application 44, the web browser 50, the communications application 52 and the other applications. The retailer computer 16 is preferably equipped with a graphical user interface, permitting the user to click on icons, buttons, highlighted text, or the like in order to initiate functions. Thus, the operating system 42 is preferably an operating system capable of supporting such an interface, such as WINDOWS 95, or the MacIntosh. The retailer computer 16 is connected by the modem 124 to the telecommunications connection 38 of a network, which may be the Internet, an intranet, or any other computer network.

In order to participate, the retailer logs onto the retailer computer 16 and initiates the web browser 50, which may be any conventional browser, such as NetScape Navigator, Microsoft Explorer, or the like. Due to the graphical nature of many Incentive program games, the browser is preferably one that supports a graphical user interface.

The browser 50 permits the retailer computer 16 to connect to the host gateway 19 over the telecommunications connection 38. Thus, the retailer may locate the award site 198 by entering the URL for the award site 198 in the browser 50. The browser then transmits a message, in the form of a package of data according to a network protocol, such as the HTTP protocol or the FTP protocol, to the host computer 18. The host gateway 19 of the host computer 18 is capable of receiving messages according to the HTTP protocol. Thus the host gateway 19 may be an HTTP server. The host computer 18 may be an HTTP server, or may be another server linked to an HTTP server. The host computer 18 may thus be any conventional server, such as UNIX server. The host computer 18 and the browser 50 permit communication between the computers in the form of data transmitted according to the HTTP protocol (or other conventional protocol).

The award site 198 is preferably a site located on the World Wide Web. Thus, as are the consumer site 192 and the sponsor site 194, the award site is located as a series of files stored on the HTTP server 188 of the host computer 18. The retailer home page 197 is an HTML document stored on the server 188, which is linked to a network, preferably the Internet. The retailer home page 197 may be reached by message packets from a browser of the retailer computer 16, a hypertext link from the consumer home page 193 or the sponsor home page 195 or other web site, or on-line connection from dedicated terminal, such as a kiosk or ATM. The message may be sent according to standard protocols, such as FTP or HTTP protocols.

The retailer home page 197 displays an HTML page that graphically displays a list or directory of hypertext links, graphical icons, or buttons that represent actions that can be taken or that consist of links to other web pages containing information of the type indicated by the links. The award site 198 may include a series of HTML pages linked by hypertext links in a menu format, so that clicking on a link associated with particular subject matter causes the HTTP server to display HTML pages that have further information or links regarding that subject matter.

Upon entering the award site 198, retailers are prompted to enter a name in an HTML page at the step 454. The HTML page then calls a gateway program, such as a CGI script, to call a database program, such as an Oracle database program, to search the award database 204 for the retailer's name at the step 456. If the name is found, then the HTTP server is instructed by the application program to display an HTML page prompting the retailer to enter the retailer's password at the step 460. Upon entry of the correct password, the user is transmitted to the step 464 at which the retailer may view a directory of options in the form of an HTML page. If the retailer's name is not found at the step 456 in the award database 204, then the HTTP server 188 is instructed by the application program to display an HTML page querying the retailer at a step 462 whether the retailer wishes to register and providing "yes" and "no" icons or buttons permitting the retailer to answer in the affirmative or negative. If the retailer indicates "no" by clicking on the appropriate icon, then the HTTP server 188 is instructed to display an HTML page containing a message to inform the retailer that registration is required and to transfer the retailer to the log-out step 472.

If, at the step 462, the retailer wishes to register and indicates so by clicking the "yes" icon, the HTTP server calls an application program via a CGI script or similar gateway program that displays an HTML page, Java applet, or the like containing a table for input of data necessary for entry as a retailer in the host system, such as retailer name, the contact person, the prizes desired to be listed, prices of prizes and other information relating to the merchandise to be offered as incentive program awards. Completion of the table initiates an application program, such as a Java applet or HTML document, that updates the retailer home page to include any listed prizes among those listed in the site and places a hypertext link to the prizes on the retailer home page 197. Completion of the table also initiates an application program, such as an Oracle program, to update the award database 204, which may be an Oracle database, to reflect the information provided by the retailer.

In an alternative embodiment, the retailer may also register by completing a table generated by an application program supplied on a disk or on-line, in which case the information is downloaded to a disk and sent by electronic mail to the host computer 18 for manual input of the information necessary to list the incentive program in the retailer home page 197.

Once a retailer has entered the retailer's password at the step 460, or a retailer has registered at the step 462 of FIG. 13, the retailer may select various options that are associated with icons or buttons, which may be hypertext links or Java applets, displayed as an HTML page at the step 464.

At a step 465, the retailer may choose to build or update the record for the retailer in the award database 204. If the retailer chooses to build or update the award database 204, the HTTP server 188 causes an HTML page to be displayed that may prompt the retailer to enter data in a table format. Once the data in entered, a CGI script or gateway application calls a database program, such as an Oracle database program, to update the award database to reflect new prizes, prices, fulfillment options and the like that are entered into the table. A CGI script also calls an application to update the award site 198 to add links to the new prizes.

The award database 204 may also be built by a connection, through an electronic data interchange connection 126 custom interface, to the retailer's proprietary inventory system 212. That is, the retailer may permit the HTTP server 188 to query the retailer's inventory system 212 to determine merchandise available for incentive programs, locations of merchandise, or other information. Thus, the award database 204 may be maintained to keep a current list of retailer inventory of prizes associated with the retailer, including the specific location of a product in inventory.

One important item of data entered by the retailer at the step 465 via completion of HTML pages or obtained directly by the HTTP server through the electronic data interchange connection 126 with the retailer inventory system 212 is the geographic location of prizes of specific types. This data assists in award fulfillment, as described below.

Figure 18:
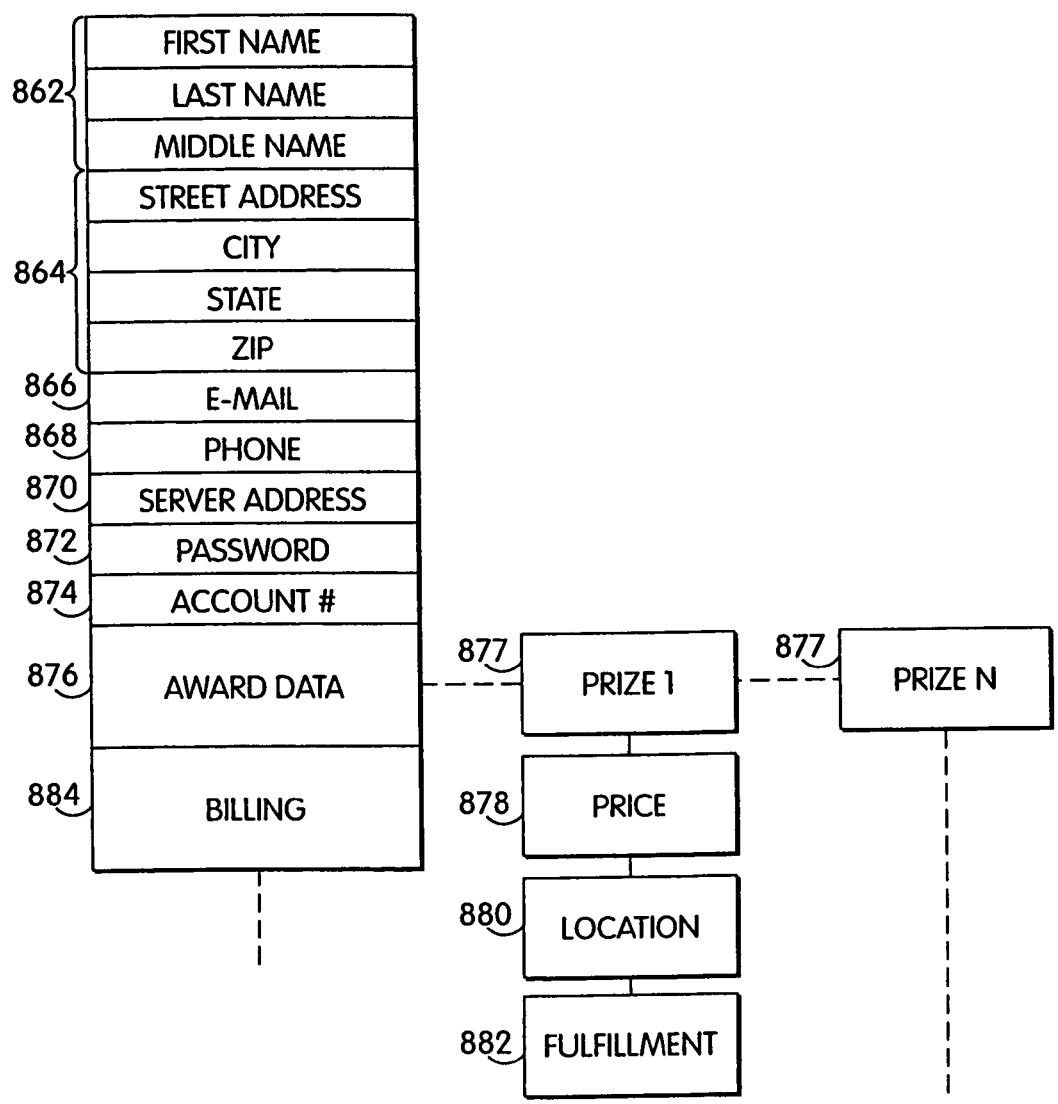
FIG. 18 is a schematic diagram depicting the data structures of the award database.

Referring to FIG. 18, an example of a data structure for the award database 204 may be understood. The data included in the award database 204 for a particular retailer may include various records, such as the name 862, address 864, e-mail address 866, phone number 868, identification address 870 of the HTTP server of the retailer computer 16, password 872, and account number 874. The data included in the award database 204 may further include sub-records associated with each award offered by the retailer. Thus, an award data sub-record 876 may exist for, which may include further sub-records 877 for each award that include the information necessary to identify an award, associate the award with a win-eligible activity of an incentive program, and associate a fulfillment option with the award. Thus, a price sub-record 878 may include the price for the award. A geographic sub-record 880 may identify the geographic locations, such as the ZIP code, at which the award is available. A fulfillment sub-record 882 may include information necessary to identify fulfillment options for the award. A billing sub-record 884 may include further sub-records that include historical billing information for each sponsor who has purchased an award for offering in connection with an incentive program.

In a typical retailer inventory system 212, an in-store intranet connects the inventory system to the point of sale apparatus, such as a computer or cash register. Most retail systems are client/server systems with the point of sale terminals utilizing the same hardware as the cash terminals, the clients, or as stand-alone clients. For individual store inventory database application that is accessed by each of the clients for query for product availability and that is updated based on purchases for inventory replenishment. Most of the in-store systems also have customer database connectivity in order to monitor purchasing behavior as well as perform point of sale direct response campaigns.

Large retailers typically link stores via a frame-relay, leased line or satellite networks. Smaller firms may utilize a local area network infrastructure, whereas all of the terminals are connected and transfer information to a central location, which has a mainframe, which has inventory as well as customer database information stored. In instances where inventory is centrally managed, the server is connected via a secure gateway to a central inventory application stored on mainframe or workstation.

An embodiment of the present invention would include a retail-based information management and inventory system that consists of data communications equipment and a central server based on open systems technology. The server would perform gateway switching to outside third parties (such as credit card issuers or fulfillment card issuers, check verification services, EDI services, and the like) as well as enterprise users (host, server or client-based users) for in-house applications, including those that access customer databases. The inventory system in question would be enterprise-wide and would allow for the basic inventory tracking (stock keeping unit, SKU, availability) and replenishment applications as well as newer consumer purchasing pattern databases. The central server could perform gateway switching to outside third parties including credit card or check authorization as well as electronic fulfillment companies.

The award site 198 may also include hypertext links permitting the retailer to view information in the form of HTML documents in the step 466, to link to the consumer site 192 in the step 467, and to link to the sponsor site 194 in the step 469. The award site may also permit the retailer to query the award database 204 via a gateway program, such as a CGI script, that calls a database program, such as an Oracle database program. Thus, the retailer may determine what prizes are in the database, the prices or locations of such prizes, and other information.

Referring to FIG. 14, the system for awarding prizes is more particularly described. When a consumer wins an incentive program, a "win" message is sent at the step 422 by the application program for the incentive program. A database program, such as an Oracle program, then updates the consumer database 200 in the step 426, to reflect that the consumer has won the incentive program. The database program also updates the sponsor database 202 at the step 428 to reflect that the incentive program has been won. The database program also updates the award database 204 to reflect that the particular consumer has won the incentive program. The application program then queries the award database to determine the closest geographic location of the retailer to the consumer's address from the consumer database 200. The consumer is then sent a message by the application program, in the form of an HTML page, indicating the prize won and the location of the retail store at which the consumer can pick up the prize by displaying the card 11.

The retail redemption method of fulfillment is further described. The primary components of the fulfillment portion of the process may be the retailer data input into the award database, identification of winner at the point of sale terminal via the use of a fulfillment card and billing of the incentive card company via the card issuer.

Figure 22:
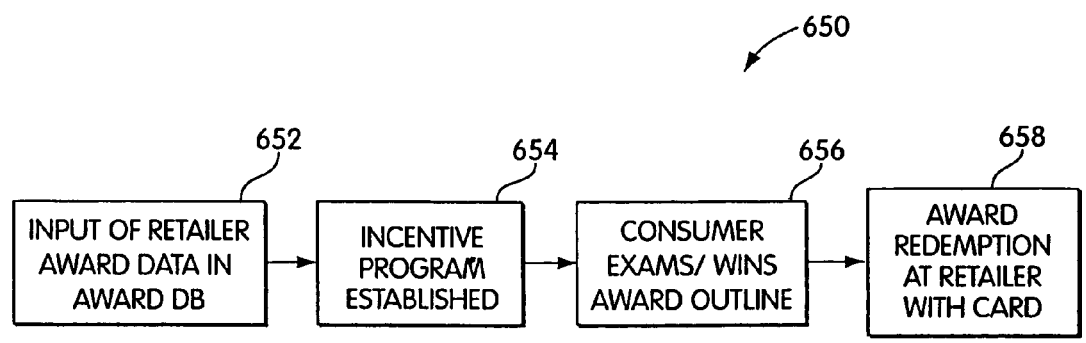
FIG. 22 is a flow chart depicting the steps of the present invention leading to award fulfillment.

It should be understood that the award database is a collection of rewards and prizes that are a part of the incentive program of the present invention. These prizes (for promotional programs) or rewards (for incentive programs) can be products, services, discounts, points or other prizes or rewards. FIG. 22 is a flow chart 650 depicting the basic steps of award fulfillment. At a step 652, for each award or reward several important pieces of data may be stored in the award database. At a step 654 an incentive program is established, as described above. At a step 656, the consumer wins an award, and at a step 658, the award is redeemed at a retailer using a card. The details of the award database and the retail fulfillment are more particularly described below.

The items stored in the award database may include the method of fulfillment (i.e. by a third party, by a sponsor or by a retailer), identification numbers of the item, which may be accomplished by utilizing the retailer's inventory identifying data, a description of the item and the number of items available. In the case of retailer redemption, additional items could include a number assigned to the merchant, the merchant's store number, and the geographic location of the award or reward items, which may be sorted by zip code or area code. The prize or reward and all of the corresponding identifying or classifying information can be characterized as an award unit. An understanding of the award unit is important, because consumers may win award units, not just awards. The award unit information can be input and stored in the award database via traditional methods such as manual input via a keyboard or mouse or other automated methods such as electronic data interchange or transfer/upload from a retailer network. In each case, a filtering and verification procedure could ensure that award or prize identification data is complete and accurate. All prizes or promotion awards could be paid for in advance by the sponsoring firm.

As described above, via an interface (and after selection or design of an incentive program) a sponsor could select an award unit to be associated with a particular sponsor incentive program, and the subsequent association will be stored in the sponsor database 202. Also included in the sponsor database is a collection of the parameters and constraints that define winning conditions for a given incentive program participant. The sponsor could also input its own awards and associated information (description, fulfillment method, etc.) in order to define the award units to be associated with the sponsor's incentive program or programs.

Figure 16:
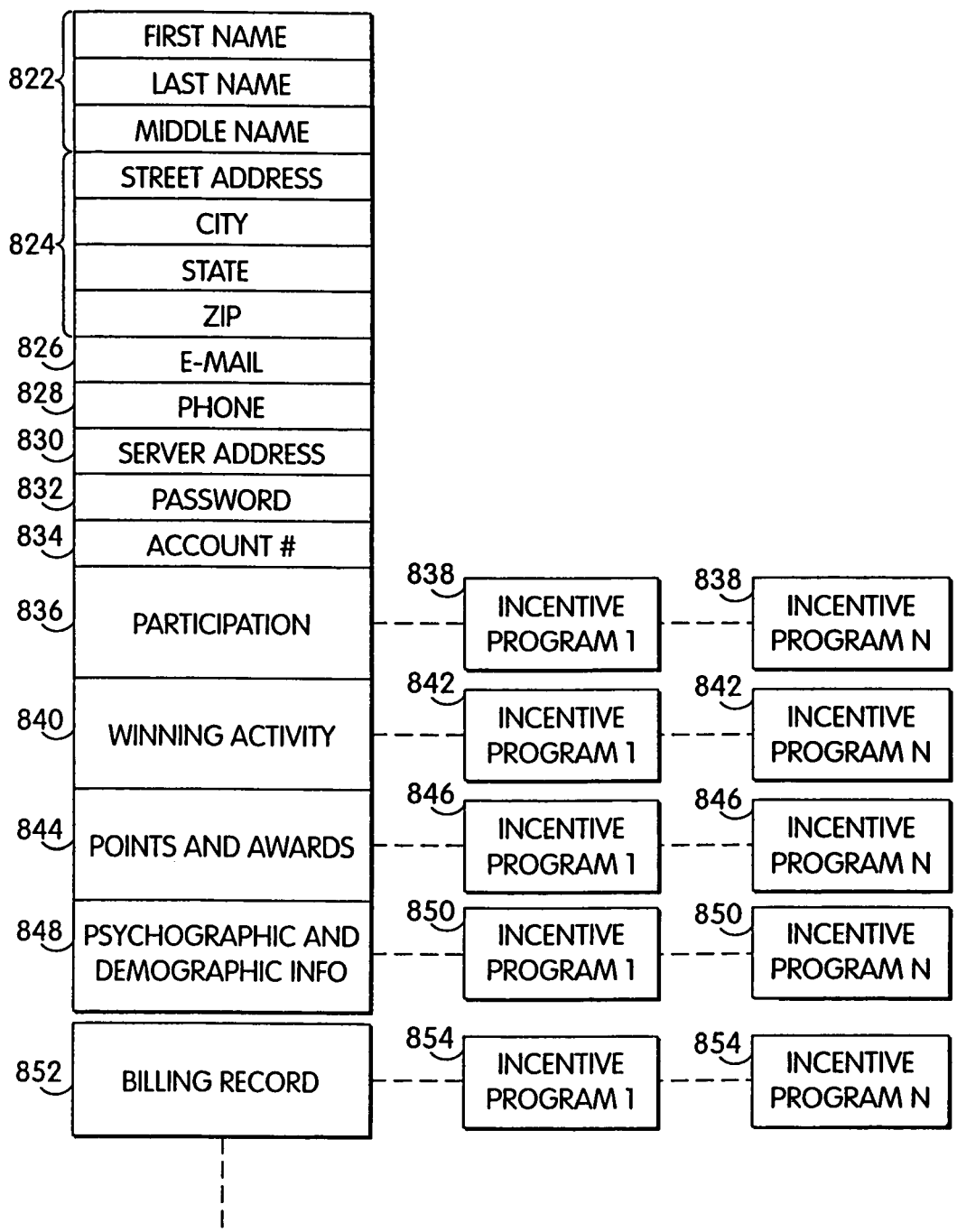
FIG. 16 is a schematic diagram of the data structures of the sponsor database of the present invention.

An example of a data structure for the sponsor database 202 may be understood by reference to FIG. 16. The data included in the sponsor database 202 for a particular sponsor may include various records, such as the name 822, address 824, e-mail address 826, phone number 828, identification address 830 of the HTTP server of the sponsor computer 14, password 832, and account number 834. The data included in the sponsor database 202 may further include sub-records associated with each incentive program for the sponsor. Thus, an incentive program data sub-record 836 may include additional sub-records 838 that include the defining algorithms and parameters for each incentive program offered by the sponsor. A winning sub-record 840 may include further sub-records 842 that include information regarding win-eligible activities by consumers in each of the sponsor's incentive programs. An award sub-record 844 may include sub-records 846 that record awards or loyalty points won or earned through consumer participation in each of the sponsor's incentive programs. A demographic and psychographic sub-record 848 may include sub-records 850 that include information obtained from consumer's through the consumer's participation in each of the sponsor's incentive programs, such as survey-completion and question-and-answer incentive programs. A billing sub-record 852 may include further sub-records 854 that include historical billing information for the sponsor for each of the sponsor's incentive programs.

A key component of the retail based redemption process is the electronic card 11 for redemption of specific prepaid products and services. The electronic card 11 may use magnetic strip technology for encoding and reading of information, or similar functionality may be achieved with a bar code, chip, smart card or other electronic card-based technology. The primary function of the card is to provide an electronic identification procedure at the check-out counter or point of sale (POS) whereby the identification information can be compared with an award winner's award information in order to authorize payment by the incentive company (via an issuer) for a particular product or service. The winning consumer's award information may include the name, identification number of the consumer and the identification of the award, e.g., the stock keeping unit, or SKU.

The electronic card 11 may carry only one-half of the data desired to authorize fulfillment, namely, the information for verifying the winning consumer. Re-loadable card technology may include both the consumer identification, the particular item to be redeemed, the monetary credit for the item and other information. Where part of the information is stored on the electronic card 11, the other part of the information desired for authorization, verifying that the particular items or items that have been retrieved are the same items to be awarded to the cardholder, may required interaction with the retailer inventory system. Matching or verification of both pieces of information may trigger authorization and subsequent payment by the incentive company via the card issuer.

A record of the fulfilled transaction in the form of a transaction record can be aggregated for transfer to the issuer for settlement. The card issuer may be traditional issuers such as financial institutions or dining and entertainment card companies such as Discover or American Express.

A number of benefits are derived in comparison to current fulfillment procedures, as follows. The system still does not require substantial sums of working capital tied up with inventory or capital expenditures for property to house the inventory. Sponsors are able to target awards for giveaway by demographic preferences or geography. Sponsors able to incent with multiple products of various price points efficiently. The systems provides a natural paper trail for auditing purposes. The system creates increased traffic to retail outlets, even though the promotion may begin in cyberspace. The card is not necessarily a credit card and thus misuse or fraud should be kept to a minimum. The card is not necessarily a debit card as there may be no value on the card. It is potentially more functional than an in-store card because it may be acceptable across several chains or merchants or restaurants, etc., but it is similar in that it tags a purchase in order to store information about consumer purchasing behavior. The system provides more flexibility than normal discount or membership cards because it is for specific use. The system provides added benefits for merchants by card institution. Also, for fulfillment of specific items (including discounts), the system can replace some forms of regular product fulfillment, lessening the need and often saving time over shipping, etc. Further, manufacturers could launch promotions across multiple store networks with a single fulfillment card. Also, the card could enable smaller merchants to offer in-store promotions, sharing the cost to support a customer card program. A benefit of the present system over other applications such as ATM networks is that the present system can build promotions that are more powerful than just an instant win opportunity for swiping a card; the system can actually promote particular actions, such as opening of a particular account type, for example. Also, for example, the host company can launch a promotion over a supermarket intranet launched from the internet.

Figure 24:
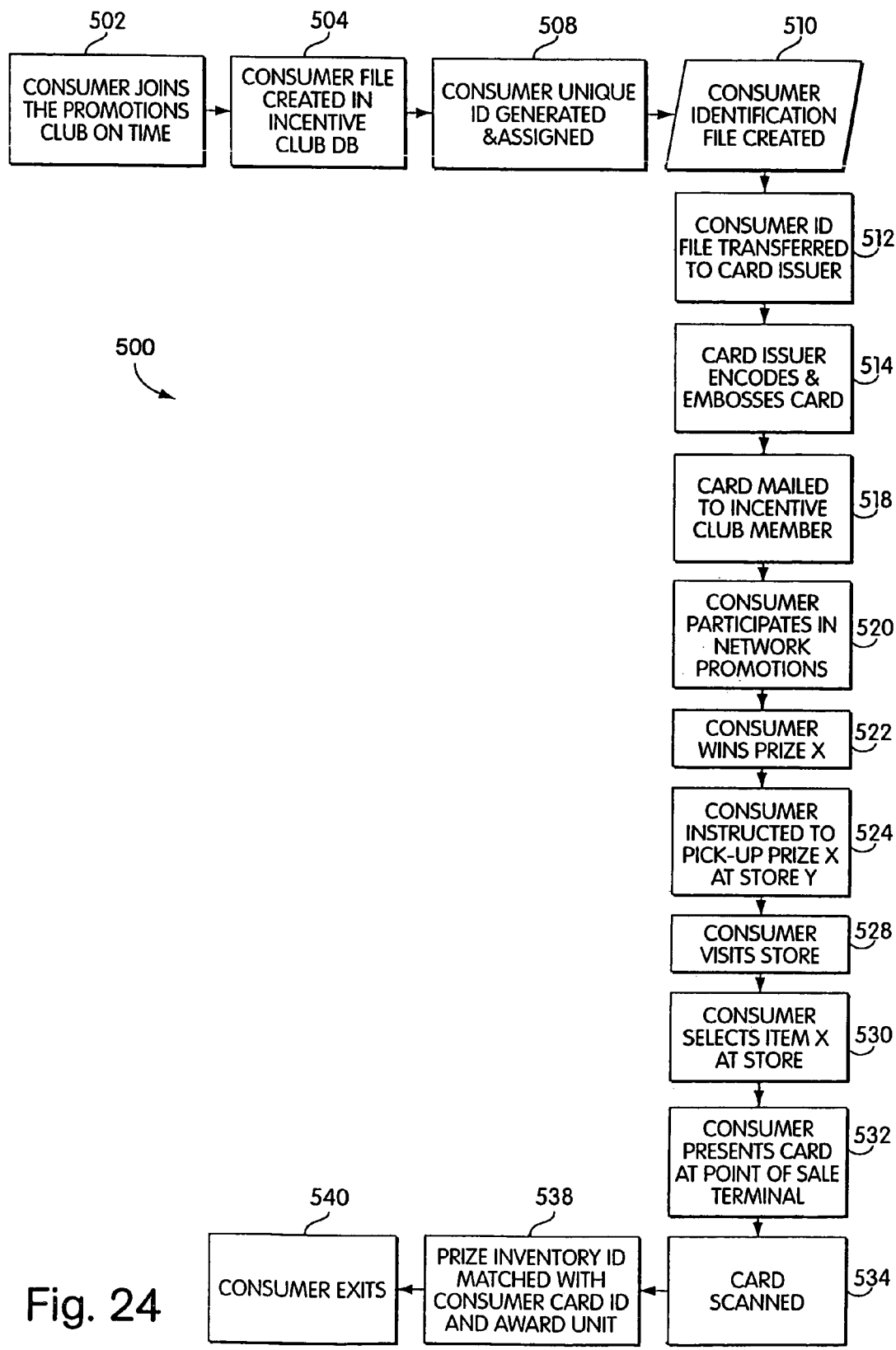
FIG. 24 is a flow chart disclosing the overall steps of a consumer participation in the present system and method.

Referring to FIG. 24, a flow chart 500 is provided. At a step 502 a consumer joins the host system online. Upon registering online, by phone, by mail or by other means, a consumer file is generated and stored in the consumer database at a step 504. The consumer is assigned a unique identification number at a step 508. Consumer account information would include name, age, address, chosen password, zip code, area code, home phone number, work number and e-mail address. All of the database information would be stored in a file behind a secure firewall in a step 510. Upon receipt and verification of the information the incentive firm assigns a consumer account number. The name address and account number of the consumer/member is forwarded to card issuer in a step 512 for encoding and embossing with an assigned card number. The card issuer generates card numbers and the incentive firm keeps a copy of the card numbers associated with particular members. While membership numbers are to be permanent, a particular card number is associated with membership numbers. The electronic card 11 is encoded and embossed at a step 514 and mailed to the consumer along with other information on the club, including rules and regulations at a step 518.

A registered consumer participates in an incentive program online at a step 520. The consumer may win at a step 522, in which case the consumer is instructed at a step 524 to go to store Y located a given distance from the consumer's home to pick up the award unit. (The host system uses an application program to match geographic information of an award with the geographic information of a consumer winner. If a consumer wins and no prizes are located nearby, a substitute method or prize may occur for the approximate value of the original award.) The consumer may then visit the store at a step 528. Once in the store, the participant locates the item that is described at a step 530 and proceeds with the item and several others to the check-out counter (point of sale). All of the items that have been purchased have been scanned in as well. The consumer may present the electronic card 11 to the cashier at a step 532, after which the cashier may scan the card 11 at a step 534.

Having presented the card 11, a dual matching of authorization process commences at a step 538. Card data is used to search a table of award units and winning consumer ID numbers. Having matched the consumer D with a winning ID, the final part of the match search is checking the items scanned to see if it matches the award unit. If both the consumer ID and the award unit is a match, the product is authorized to be claimed according the prize rules in the table. If it is a winner's redemption, the award is deducted from the bill of the consumer, to be paid for by the incentive company; if a discount, the discount is taken on the amount of a particular item(s) or for the entire purchase as appropriate. Finally, all of the winning transactions and the name and ID's of the consumers that came to pick up the prizes are uploaded or presented (paper) in a batch for payment by the issuer. The funds may be paid by the issuer or directly from the incentive company via an electronic transfer or funds or other means. Once a consumer's award is authorized, the consumer may exit with the award at a step 540.

Figure 25:
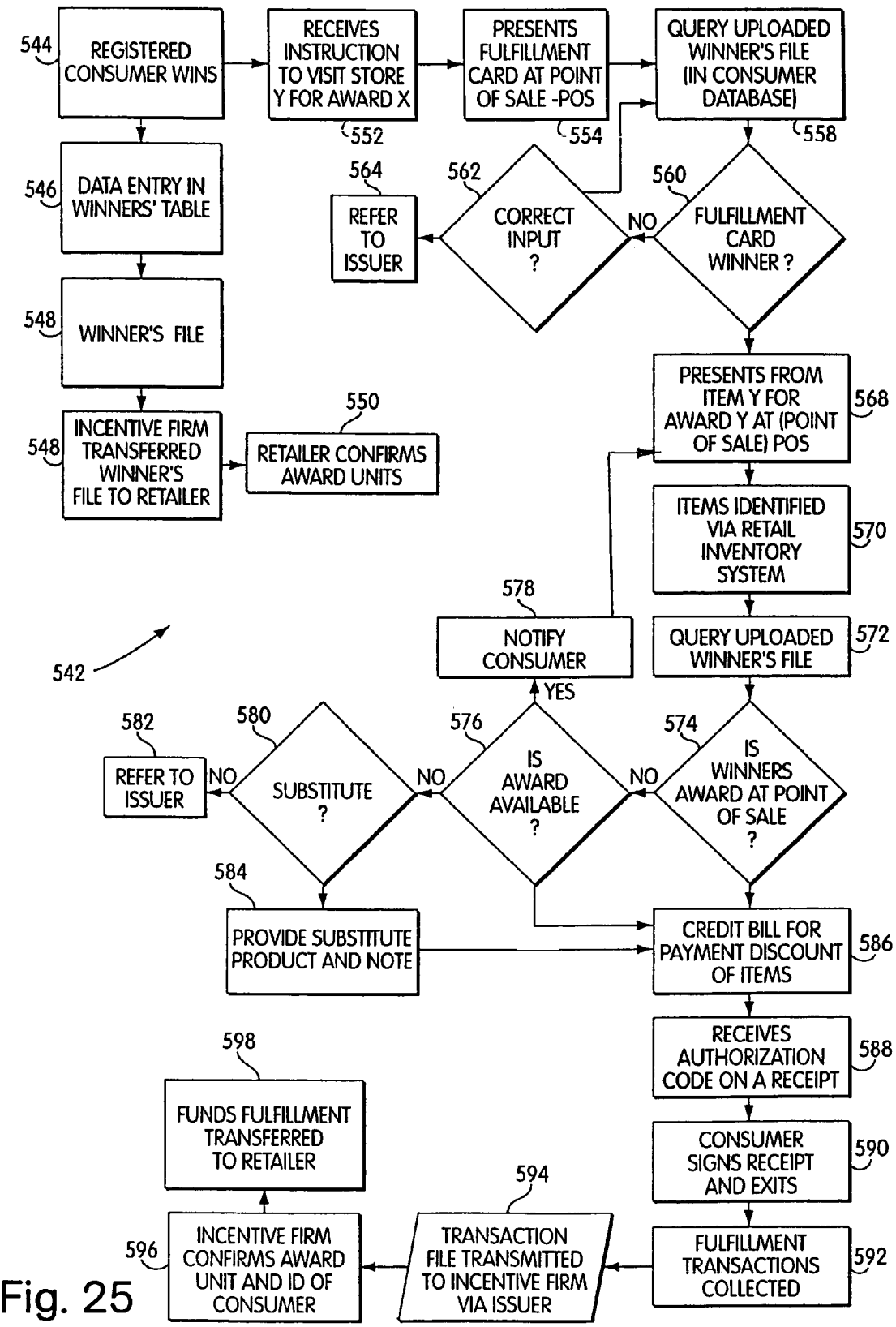
FIG. 25 is a flow chart disclosing the steps of award fulfillment for a retailer using an electronic inventory tracking and consumer database.

In an embodiment of the invention, a retailer, restaurateur or other merchant with an electronic inventory tracking and consumer database keeping capabilities is assumed, as depicted in the flow chart 542 of FIG. 25. In this case, after the consumer wins at a step 544 a data entry is made in the winner's file at a step 546 and the incentive firm uploads the winner's file to the retail system's customer database at a step 548; thus, incentive firms give the retailer a customer. The incentive firm confirms the award units versus the award units submitted previously inputted to the award database, particularly in case of a need for substitution on the retail level and to avoid consumer-merchant dispute.

Next, the consumer receives instructions at a step 552 to visit a retail store, and the consumer presents the card 11 at a point-of-sale terminal at a step 554. When the card is scanned, the retail system software locates and confirms that the consumer is a pre-registered fulfillment card customer at a step 558. Then it checks to match any item (product or service) that was scanned via the point of sale terminal with the pre-paid item in their consumer database record at a step 560. If the consumer does not appear in the database, then a check is made of the input at a step 562. If the input was correct, but the item was not found, the consumer is referred to the issuer at a step 564. If the consumer is registered as a winner, then the consumer presents the card 11 for the given promotion at a step 568. The system then identifies the prize in the retailer inventory system 212 at a step 570. A query is made to the winner's file at a step 572 to match the prize to the winner. At a step 574 a check is made to determine if the award is at the point of sale. If at a step 576 the award is available, the consumer is notified at a step 578 and the consumer is given the prize. If the award is not available at the step 576, the system checks for an equivalent substitute at a step 580. If no equivalent is available, the consumer is referred to the issuer at a step 582. Otherwise, the consumer is provided a substitute at a step 584. If the award is available, or a substitute is available, then the retailer credits the consumer's bill for the amount of the award or applies a discount at a step 586. The consumer receives an authorization code on a receipt at a step 588. The consumer may then exit with the award at a step 590. If the item has been presented by the time of the total, the system deducts full amount for prize won or applies a discount as appropriate. The winner's file has the specification. The winner's file is a consumer database record and indicates the availability of in-store credit for a particular item or items or a discount.

If the consumer is a winner, but failed to retrieve the winning item, the transaction printout will provide the note for the product to be retrieved. The fulfilled transactions data, including the incentive firm ID, number of the persons, the name of the persons, and products or services won will collected at a step 592 and uploaded at a step 594 periodically via a batch file to the incentive firm via the issuer for remittance of funds, less any transaction costs as contracted. The incentive firm may then confirm the award at a step 596 and fulfill funds to the retailer at a step 598.

Figure 26:
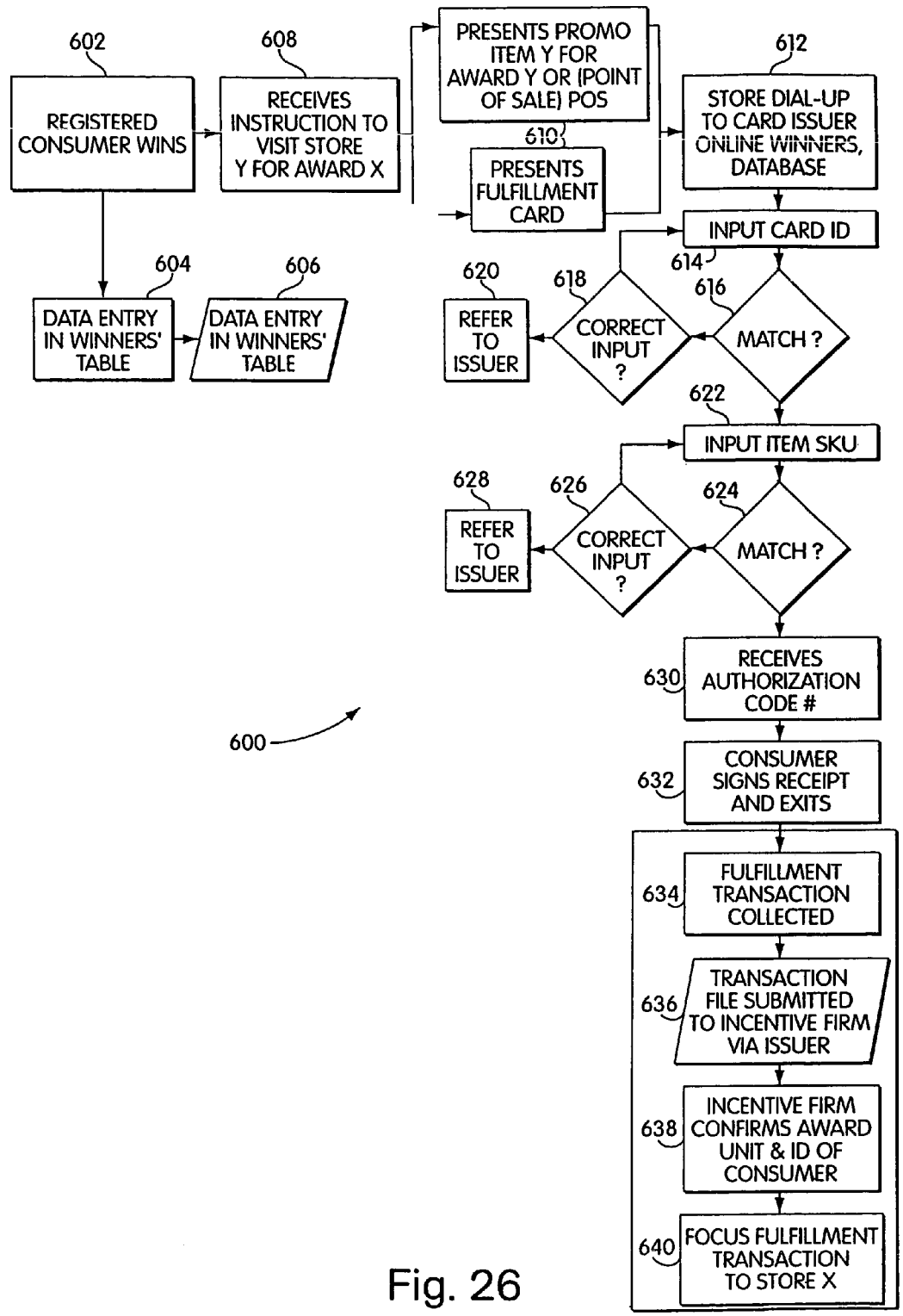
FIG. 26 is a flow chart disclosing steps of award fulfillment for a retailer implementing manual inventory tracking procedures.

The same can be accomplished with varying degrees of merchant sophistication, including single store merchants with manual inventory tracking procedures. The system for a less sophisticated merchant may be seen in a flow chart 600 at FIG. 26. When the consumer wins at a step 602, a data entry is created in a winner's table at a step 604 in the consumer database and the winner's table is updated online at a step 606. In the case of these less sophisticated merchants, upon presentation of an item at check-out they would be able to access the award database by dedicated line dial-up, or phone call, and after inputting the store's password, would have online access to a winner's file that have items to redeem in their store as well as the card numbers and individuals that have won the information.

At a step 608 the consumer is instructed to visit a retailer to obtain a prize. The consumer presents the card 11 or a promotional item at a step 610. The retailer dials the winner's database at a step 612, inputs the card ID number at a step 614, and determines a match at a step 616. In the absence of a match at the step 616, the retailer checks the input at a step 618 and, still falling a match, refers the consumer to the issuer at a step 620. If a match occurs at the step 616, the retailer inputs the stock keeping unit number, or SKU at a step 622 and queries the consumer database for a match at a step 624. Absent a match after checking for correct input at a step 626, the retailer refers the consumer to the issuer at a step 628. If a match occurs, the retailer receives an authorization code online or by phone from the host system at a step 630. The retailer then provides a receipt at a step 632 that is signed by the consumer, in which case the consumer may then exit the store with the award.

Next, at a step 634 award transactions are collected, and at a step 636 are sent to the incentive firm by the issuer. The issuer confirms the award units and ID numbers at a step 638 and pays the funds to the retailer at a step 640.

If after inputting the particular product or service ID of the item presented and the card identification number for the consumer, there is a match with the winning consumer and award unit information, an authorization number will be given for the merchant. A picture ID of the cardholder may also be required by the less sophisticated inventory system in the case of a lack of electronic verification procedures. The merchant will then present all of the transaction records with the authorization codes to the issuer for payment.

A further depiction of the databases of the current invention may be accomplished by reference to FIG. 15. The consumer database 200 may be a conventional database, such as an Oracle database. An application program, such as an Oracle Program controls the input of data into the database, the structure of data records in the database, and the modification of or addition to data in the database. The consumer database 200 consists of records for each registered consumer. Thus, a record is initially added to the database upon registration by a consumer. The database is then updated as new consumers are added, and the record for each customer is updated upon the occurrence of specific events, including participation in an incentive program, winning an incentive program, completion of a survey, and the like. Each event that requires an update of the consumer database 200 calls the application program necessary to modify the relevant records in the consumer database 200. The data structures of the consumer database 200 are dynamic; that is, the structures permit different incentive programs to access different data. Thus, the sponsor may customize an incentive program by requiring the consumer to complete a survey of information desired by the sponsor and the consumer database 200 will store and permit manipulation and retrieval of such information.

The sponsor database 202 may also be a conventional database, such as an Oracle database. An application program, such as an Oracle Program, controls the input of data into the database, the structure of data records in the database, and the modification of or addition to data in the database. The sponsor database 202 consists of records for each registered sponsor, as well as associated records for each incentive program of the sponsor, and each prize purchased by the sponsor and associated with each incentive program. Thus, a record is initially added to the database upon registration by a sponsor. The database is then updated as new sponsors are added, and the record for each sponsor is updated upon the occurrence of specific events, including consumer participation in an incentive program, consumer's winning an incentive program, purchase of an incentive program, building of an incentive program, selection of a prize, selection of a fulfillment option, and the like. Each event that requires an update of the sponsor database calls the application program necessary to modify the relevant records in the sponsor database.

The award database 204 is also a conventional database, such as an Oracle database. An application program, such as an Oracle Program controls the input of data into the database, the structure of data records in the database, and the modification of or addition to data in the database. The award database consists of records for each registered retailer, as well as associated records for the retailer, including the prizes offered by the retailer, the prices of such prizes, the geographic location of the prizes, and any other information entered by the retailer, including information directly provided to the award database 204 through an electronic data interchange 126 connected by a custom interface with the inventory system 212 of the retailer. An application program connects the award database to the retailer's inventory system, so that each prize recorded in the award database can be tied, by an inventory number or SKU, to the exact item, or type of items, in the inventory of the retailer. In particular, the award database 204 can identify the geographic location of the prize, so that an application program can determine the closest geographic location of the retailer to the location of the consumer who has won a particular prize. The database is then updated as new retailers are added, and the record for each retailer is updated upon the occurrence of specific events, including a retailer's adding a new prize, purchase of a prize, a consumer winning a prize, selection of a fulfillment option, and the like. Each event that requires an update of the award database calls the application program, such as an Oracle program, necessary to modify the relevant records in the award database.

Figure 21:
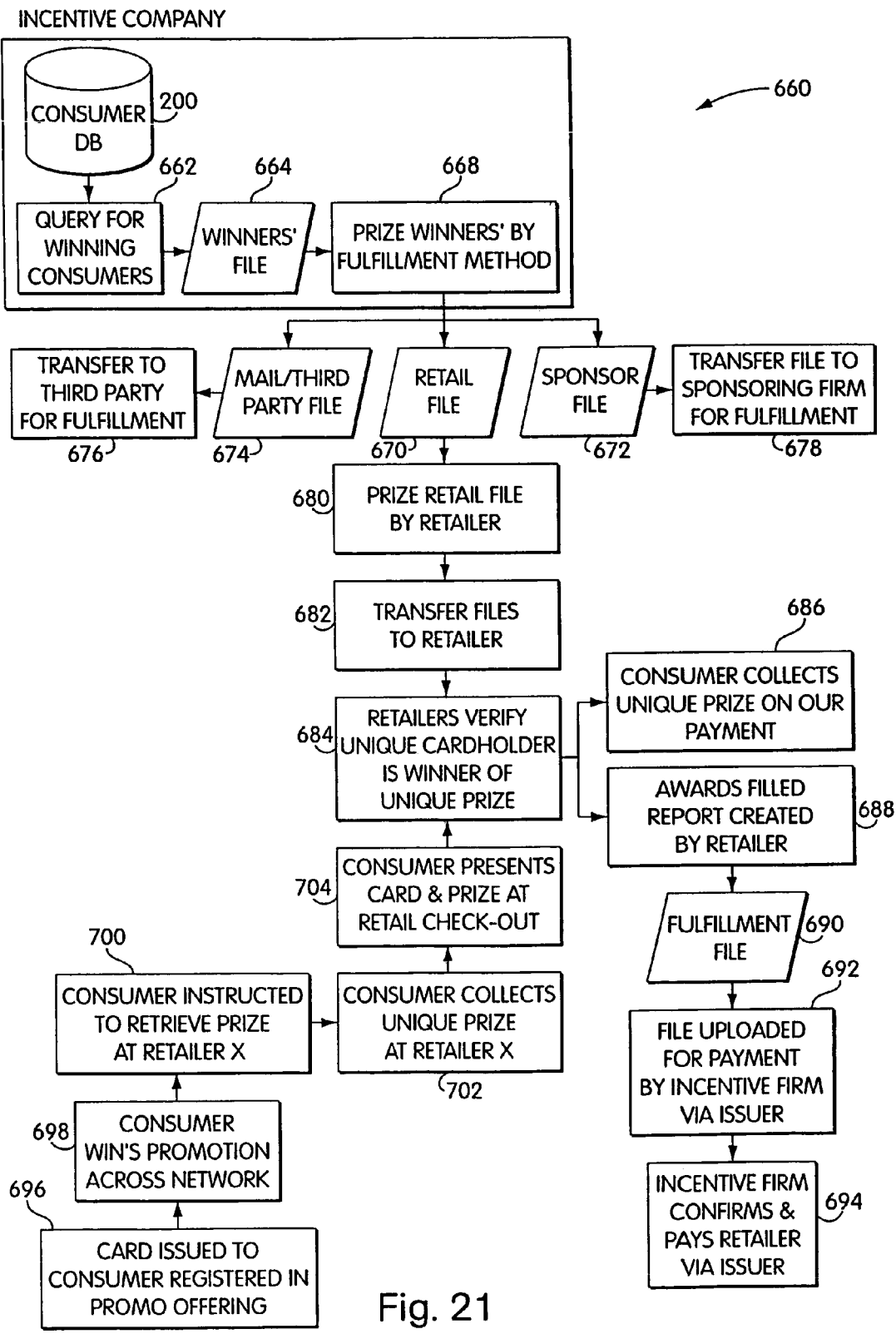
FIG. 21 is a flow chart that depicts the flow of information among the components of the present invention.

Referring to FIG. 21, a flow chart 660 depicts the flow of information among the components of the present invention. The consumer database 200 permits a query at a step 662 to determine whether a consumer has won a prize. The consumer database accesses the winner's file at a step 664 and identifies the fulfillment method associated with the winner at a step 668. Next, at steps 670, 672 and 674, the host system creates a file of the information obtained in the query for a retailer, a sponsor, or a third party. If the fulfillment is to be by a third party, the information is mailed at a step 676 to the third party for fulfillment. If the sponsoring firm is to fulfill the prize, the file is mailed at a step 678 to the sponsor. Otherwise, the retail database 204 is parsed by retailer at a step 680 and the file is transferred to the appropriate retailer at a step 682. The retailer verifies that the cardholder is the winner of the prize at a step 684, and the consumer collects the prize at a step 686. At a step 688, the retailer completes a report. At a step 690, the retailer creates a file of information regarding prizes fulfilled. At a step 692, the retailer uploads the file and supplies it to the incentive firm. At a step 694 the incentive firm verifies the information and pays the retailer.

From the consumer perspective, at a step 696, the consumer is issued a card. The consumer wins a promotion at a step 698 and is instructed, at a step 700 to retrieve the prize. At a step 702, the consumer collects the prize and, at a step

704, presents the prize to the retailer for fulfillment, at which point the retailer verifies and awards the prize at the steps 684 and 686.

While the invention has been disclosed in connection with the preferred embodiments shown and described in detail, various modifications and improvements thereon will become readily apparent to those skilled in the art. Accordingly, the spirit and scope of the present invention is to be limited only by the claims.

What is claimed is:

1. A system for incentive program participation and automated award fulfillment, comprising:
   a host computer coupled to a network;
   a first database accessible from said host computer; and
   an automated award fulfillment application program executed on said host computer for participation in incentive programs of a plurality of providers in communication with an inventory management system associated with each of said plurality of providers wherein said automated award fulfillment application program provides sponsor-selected fulfillment, said automated award fulfillment application program comprising:
      code adapted to provide a sponsor-selected specific award unit item, said sponsor-selected specific award unit item being tailored to demographic and psychographic preferences of a sponsor-selected consumer user, and
      code adapted to provide a sponsor-selected geographic location for fulfillment.

2. The system of claim 1, wherein said plurality of providers comprise at least one of a host, a retailer, a merchant, and a sponsor.

3. The system of claim 1, further comprising:
   a client computer of said consumer user coupled to the network;
   a server coupled to said host computer; and
   a browser executing on said client computer for accessing content located on said server
      wherein the consumer user participates in said incentive programs of the plurality of providers via interaction with said browser.

4. The system of claim 3, further comprising:
   a redemption workstation associated with each of said plurality of providers coupled to the network;
   at least one of
      a member management database, coupled to the network, for adding a member record for a new member, or
      said inventory management system associated with each of said plurality of providers coupled to said redemption workstation; and
   wherein said automated award fulfillment application program is adapted to allow designation of redemption of an award including access to any inventory management system of any of said plurality of providers and access to any member databases; wherein said automated award fulfillment application program is adapted to allow a sponsor to select said award tailored to demographic and psychographic preferences of the consumer user stored in at least one of any of said member management databases or said first database accessible from said host computer, and wherein said automated award fulfillment application program is adapted to allow sponsor-designation of redemption of said award at a geographic location of one of said plurality of providers; and a sponsor computer, coupled to the network, adapted to allow a sponsor of one of said incentive programs to designate said geographic location of redemption by the consumer user of said award.

5. The system of claim 3, wherein said system further comprises at least one of an internet browser, an automated teller machine, a kiosk, a gasoline pump, a wireless device, a personal digital assistant, and a communication device.

6. A method for allowing participation in incentive programs and automating award fulfillment, comprising:
   providing a host computer, the host computer having a database and an automated award fulfillment application program in communication with an inventory management system associated with each of a plurality of providers;
   said automated award fulfillment application program adapted to
      provide sponsor-selected fulfillment, said automated award fulfillment application program comprising:
         code to provide a sponsor-selected specific award unit item,
         code to provide said sponsor-selected specific award unit item tailored according to demographic and psychographic preferences of a sponsor-selected consumer user, and
         code to provide a sponsor-selected geographic location for fulfillment; and
   permitting access to said database via a network, including allowing participation in incentive programs of said plurality of providers.

7. The method of claim 6, further comprising:
   providing another network coupling said host computer to a workstation for transferring electronic data between said workstation and said host computer;
   providing each of said host computer and said workstation with an application program for responding to input from said host computer or said workstation;
   allowing a user of said host computer to operate said automated award fulfillment application program to generate an incentive program and to store said incentive program on said host computer;
   transferring a stored incentive program to said workstation; and
   providing an address for said stored incentive program to permit access to said stored incentive program from said another network.

8. The method of claim 7, further comprising:
   providing at least one of an award association application program that associates an award with said incentive program, and an award fulfillment association application program that associates a fulfillment option with said award.

9. The system of claim 8, wherein said fulfillment option comprises at least one of:
   receiving fulfillment at a sponsor designated geographic location;
   receiving online fulfillment;
   receiving offline fulfillment;
   receiving fulfillment at a merchant;
   receiving fulfillment at a retailer; or
   receiving fulfillment at point of sale (POS).

10. The system of claim 6, wherein said permitting access comprises:
   providing for registration and interaction with content of said database and said automated award fulfillment application program.

11. A system for automating award fulfillment, comprising:
- a network;
- a host computer, coupled to said network;
- a first database of said host computer;
- a browser operative to browse content of said host computer, wherein a consumer user participates in an incentive program;
- an awards database of awards associated with said incentive program; and
- an automated award fulfillment application program for automating fulfillment of awards for said incentive program, in communication with an inventory management system associated with each of a plurality of providers wherein said automated award fulfillment application program provides sponsor-selected fulfillment for providing a sponsor-selected specific award unit item, providing said sponsor-selected specific award unit item tailored to demographic and psychographic preferences of a sponsor-selected consumer user, and
- providing a sponsor-selected geographic location for fulfillment.

12. The system of claim 11, further comprising:
- a card for fulfillment of awards won in said incentive program.

13. The system of claim 11, further comprising:
- a memory for storing at least a personal identification number associated with said sponsor-selected consumer user for use in performing fulfillment.

14. The system of claim 11, further comprising:
- memory for storing information relating to participation of said sponsor-selected consumer user in said incentive program.

15. The system of claim 11, further comprising:
- said browser, coupled to said host computer, wherein said consumer user participates in incentive programs of at least two providers via said browser.

16. The system of claim 11, further comprising:
- a redemption computer associated with each of said plurality of providers coupled to said network; and
- at least one of:
  - a member database, coupled to said network, for adding a member record for a new member, or
  - said inventory management system associated with said each of said plurality of providers coupled to said network; and
- wherein said automated award fulfillment application program is adapted to allow designation of redemption of an award including accessing any inventory management system of any of said plurality of providers, accessing said awards database and accessing at least one of any member databases and said first database of said host computer.

17. The system of claim 16, wherein said automated award fulfillment application program selecting said award tailored to any demographic and psychographic preferences known of said consumer user stored in at least one of any of said member databases, and said first database of said host computer, and allowing for designation of redemption of said award at a geographic location of one of said plurality of providers.

18. The system of claim 7, further comprising:
- a sponsor computer coupled to the network for allowing a sponsor of one of a plurality of incentive programs to designate said geographic location of redemption by said consumer user of said award.

19. A method for providing an incentive programs and automating award fulfillment, comprising:
- providing a host computer;
- providing an incentive program on the host computer, wherein a participant may participate in said incentive program;
- providing a database of awards on the host computer associated with the incentive program; and
- providing automated award fulfillment of said awards to participants, including providing communication with an inventory management system associated with each of a plurality of providers wherein said automated award fulfillment comprises
  - providing sponsor-selected fulfillment comprising
    - providing a sponsor-selected specific award unit item,
    - providing said sponsor-selected specific award unit item tailored according to demographic and psychographic preferences of a sponsor-selected consumer user, and
    - providing a sponsor-selected geographic location for fulfillment.

20. The method of claim 19, wherein said database of awards includes awards from a plurality of sponsors.

21. The method of claim 19, wherein said providing automated award fulfillment further comprises:
- associating an award with the incentive program; and
- associating a fulfillment method with the award.

22. The method of claim 21, wherein said associating a fulfillment method comprises:
- providing an optimization application program that identifies an award based on the geographic proximity of an award winner to a redemption location of an award in the database of awards.

23. The method of claim 19, wherein said providing automated award fulfillment further comprises:
- providing a card comprising memory for storing data associated with a user.

24. The method of claim 23, wherein said data is a personal identification number.

25. The method of claim 23, wherein said data is information relating to a user's participation in said incentive program.

26. A system for building an incentive program having automated fulfillment, comprising:
- a computer coupled to a network;
- an incentive program generation application program for generating the incentive program in response to input of parameters by a user;
- an award association application program for associating an award with the incentive program; and
- an automated fulfillment application program for associating a fulfillment method with said award wherein said automated fulfillment program is in communication with an inventory management system associated with each of a plurality of providers wherein said automated fulfillment application program is operative to provide sponsor-selected fulfillment for
- providing a sponsor-selected specific award unit item,
- providing said sponsor-selected specific award unit item tailored to demographic and psychographic preferences of a sponsor-selected consumer user, and
- providing a sponsor-selected geographic location for fulfillment.

27. A method of providing for generation of an incentive program having automated fulfillment over a network, comprising:

providing a computer coupled to the network;
generating the incentive program in response to input from a user;
associating an award with the incentive program;
associating a fulfillment method with the award;
providing an automated fulfillment application program, wherein said automated fulfillment application program is adapted to provide at least one of said generating the incentive program, said associating the award, or said associating the fulfillment method, wherein said automated fulfillment application program is in communication with an inventory management system associated with each of a plurality of providers for providing sponsor-selected fulfillment comprising:
providing a sponsor-selected specific award unit item,
providing said sponsor-selected specific award unit item tailored according to demographic and psychographic preferences of a sponsor-selected consumer user, and
providing a sponsor-selected geographic location for fulfillment.

28. A method of automatically fulfilling an award comprising:
 (a) receiving a sponsor designation of redemption of an award for a sponsor-selected consumer user comprising
  receiving a sponsor-selected fulfillment award designation comprising:
   receiving a sponsor-selected specific award unit item selected from an inventory management system associated with a plurality of providers,
   receiving said sponsor-selected specific award unit item tailored according to demographic and psychographic preferences of said sponsor-selected consumer user, and
   receiving a sponsor-selected geographic location for fulfillment; and
 (b) automating fulfillment of said award in accordance with said sponsor designation of redemption.

29. The method according to claim 28, wherein said step (a) comprises:
 (1) receiving a sponsor designated geographic location for redemption of said award comprising at least one of:
  (A) providing interactive access to a fulfillment network database having information about said plurality of providers; and
  (B) receiving a sponsor designated consumer user-tailored geographical location selection from said fulfillment network.

30. The method according to claim 29, wherein said step (b) comprises:
 (1) fulfilling said award at said sponsor designated geographic location for redemption.

31. The method according to claim 28, where said step (b) comprises at least one of:
 (1) automating fulfillment comprising:
  (A) providing fulfillment using a fulfillment option comprising at least one of:
   (i) receiving fulfillment at a sponsor designated geographic location;
   (ii) receiving online fulfillment;
   (iii) receiving offline fulfillment;
   (iv) receiving fulfillment at a merchant;
   (v) receiving fulfillment at a retailer; or
   (vi) receiving fulfillment at point of sale (POS); or
 (2) providing a validation of an award recipient of said award to at least one of a host, one of said plurality of providers, a sponsor, a retailer, or a merchant.

32. The method according to claim 28, wherein said step (a)
 (1) receiving a sponsor designated award selection comprising at least one of:
  (A) providing interactive access to at least one consumer database of at least one of a host, a provider, a sponsor, a retailer, and a merchant, having information about said sponsor-selected consumer user;
  (B) providing said interactive access to said inventory management system wherein said plurality of providers includes at least one of a host, a provider, a sponsor, a retailer, and a merchant, said inventory management system having information about award availability; and
  (C) receiving said sponsor designated award selection said sponsor designated award selection being selected from an award pool.

33. The method according to claim 32, wherein said sponsor designated award selection comprises an award unit.

34. The method according to claim 32, wherein said step (a) (1) (C) comprises at least one of:
 (i) receiving said sponsor designated award selection wherein said award pool comprises a group of awards selected from an awards database;
 (ii) receiving said sponsor designated award selection wherein said award pool comprises available awards from a plurality of sponsors as long as quantities of awards are available;
 (iii) receiving said sponsor designated award selection including a user demographically tailored selection of said sponsor designated award selection including being tailored to at least one of demographic and psychographic preferences of said sponsor-selected consumer user stored in any of said at least one consumer database;
 (iv) receiving said sponsor designated award selection comprising:
  determining availability of said sponsor designated award selection in said inventory management system; and
 (v) providing an award recipient to at least one of said at least one consumer database.

35. The method according to claim 34, wherein said step (a) (1) (C) further comprises:
 (vi) validating said award recipient of said award to at least one of said host, said provider, said sponsor, said merchant, and said retailer when said award recipient attempts to fulfill said award.

36. The method according to claim 34, wherein said step (a) further comprises:
 (1) receiving a sponsor designated geographic location for redemption of said award comprising at least one of:
  (A) providing interactive access to a fulfillment network database having information about said plurality of providers; and
  (B) receiving a sponsor designated consumer user-tailored geographical location selection from said fulfillment network.

37. The method according to claim 36, wherein said step (b) comnprises:
 (1) fulfilling said award at said sponsor designated geographic location for redemption.

* * * * *